(12) United States Patent
Butler et al.

(10) Patent No.: US 10,632,642 B2
(45) Date of Patent: Apr. 28, 2020

(54) TABLE SAW WITH TABLE SENSOR FOR SENSING CHARACTERISTIC OF WORKPIECE

(71) Applicant: Power Tool Institute, Cleveland, OH (US)

(72) Inventors: Andy Butler, Palo Alto, CA (US); Brian Lamb, Belmont, CA (US); Chris Tacklind, Menlo Park, CA (US); Clinton Lazzari, Mountain View, CA (US); Edward Cooper, Lafayette, CA (US); Eric Edward Schultz, Los Altos Hills, CA (US); Frank Buhrmann, San Francisco, CA (US); John Gilbert, Applegate, OR (US); David Titzler, Palo Alto, CA (US); William Scott, Palo Alto, CA (US); Peter Domeny, Peachtree City, GA (US)

(73) Assignee: POWER TOOL INSTITUTE, Cleveland, OH (US)

( * ) Notice: Subject to any disclaimer, the term of this patent is extended or adjusted under 35 U.S.C. 154(b) by 186 days.

(21) Appl. No.: 15/497,932

(22) Filed: Apr. 26, 2017

(65) Prior Publication Data
US 2017/0225351 A1    Aug. 10, 2017

Related U.S. Application Data

(62) Division of application No. 14/495,311, filed on Sep. 24, 2014, now abandoned, which is a division of
(Continued)

(51) Int. Cl.
*B27B 5/38* (2006.01)
*B23D 45/06* (2006.01)
(Continued)

(52) U.S. Cl.
CPC ............. *B27B 5/38* (2013.01); *B23D 45/067* (2013.01); *B23D 47/10* (2013.01); *B27B 5/222* (2013.01);
(Continued)

(58) Field of Classification Search
CPC ......... B27B 5/38; B27B 5/243; B26D 45/067; B23D 47/10; B23D 59/001; Y10T 83/088;
(Continued)

(56) References Cited

U.S. PATENT DOCUMENTS 2,772,394 A * 11/1956 Bradley .................. G01V 3/15
324/611
3,371,272 A * 2/1968 Stanton .................. G01V 3/107
219/124.34
(Continued)

OTHER PUBLICATIONS

"Cut Stop" by Institute for Machine Tools of the University of Stutgart, 2007, pp. 62-65 and 70-73.

*Primary Examiner* — Ghassem Alie
(74) *Attorney, Agent, or Firm* — K&L Gates LLP

(57) ABSTRACT

Various safety systems for power tools, and in particular table saws include detection systems for detecting a dangerous condition relative to a blade of the power tool, reaction systems for taking mitigation action in response to detection of a dangerous condition. The safety system may detect, prevent, and/or mitigate a dangerous condition associated with the power tool.

22 Claims, 33 Drawing Sheets

Related U.S. Application Data application No. 13/129,948, filed as application No. PCT/US2009/065083 on Nov. 19, 2009, now Pat. No. 8,919,231.

(60) Provisional application No. 61/116,098, filed on Nov. 19, 2008.

(51) Int. Cl.
*B23D 47/10* (2006.01)
*B27B 5/24* (2006.01)
*B27B 5/22* (2006.01)

(52) U.S. Cl.
CPC ............. *B27B 5/243* (2013.01); *Y10T 83/081* (2015.04); *Y10T 83/088* (2015.04); *Y10T 83/089* (2015.04); *Y10T 83/141* (2015.04); *Y10T 83/613* (2015.04); *Y10T 83/7697* (2015.04); *Y10T 83/773* (2015.04); *Y10T 83/7788* (2015.04); *Y10T 83/8773* (2015.04)

(58) Field of Classification Search
CPC . Y10T 83/773; Y10T 83/8773; Y10T 83/141; Y10T 83/613; Y10T 83/7697; Y10T 83/7788; Y10T 83/081; Y10T 83/089; B27G 19/02; H01H 27/00
USPC ............ 83/58, 62.1, 477.2, 490, 581, 471.3, 83/397.1, 488, 477.1, DIG. 1, 32.1, 471.1, 83/666, 72, 473, 76.7, 481, 471.2, 478, 83/485, 487, 489, 574, 821, 823, 827, 83/828, 954, 665, 522, 11, 22, 544, 476, 83/491, 526, 76.8; 340/686.5, 686.6, 562, 340/686.1
See application file for complete search history.

(56) References Cited

U.S. PATENT DOCUMENTS

| | | | |
|---|---|---|---|
| 4,145,940 A | 3/1979 | Woloveke et al. | |
| 4,267,914 A | 5/1981 | Saar | |
| 4,920,495 A | 4/1990 | Pilkington | |
| 5,758,561 A | 6/1998 | Curtsinger et al. | |
| 5,816,372 A | 10/1998 | Carlson et al. | |
| 5,905,440 A | 5/1999 | Julian et al. | |
| 5,942,975 A | 8/1999 | Sorensen | |
| 6,234,060 B1 | 5/2001 | Jolly | |
| 6,302,249 B1 | 10/2001 | Jolly et al. | |
| 6,536,536 B1 | 3/2003 | Gass et al. | |
| 6,668,692 B1 | 12/2003 | Thiele et al. | |
| 6,813,983 B2 | 11/2004 | Gass et al. | |
| 6,834,730 B2 | 12/2004 | Gass et al. | |
| 6,922,153 B2 | 7/2005 | Pierga et al. | |
| 6,950,814 B2 | 7/2005 | Gass et al. | |
| 6,945,149 B2 | 9/2005 | Gass et al. | |
| 6,959,631 B2 | 11/2005 | Sako | |
| 6,994,004 B2 | 2/2006 | Gass et al. | |
| 6,997,090 B2 | 2/2006 | Gass et al. | |
| 7,000,514 B2 | 2/2006 | Gass et al. | |
| 7,009,552 B2 | 3/2006 | Sako | |
| 7,024,975 B2 | 4/2006 | Gass et al. | |
| 7,047,854 B2 | 5/2006 | Sako | |
| 7,055,417 B1 | 6/2006 | Gass | |
| 7,077,037 B2 | 7/2006 | Gass et al. | |
| 7,093,668 B2 | 8/2006 | Gass et al. | |
| 7,098,800 B2 | 8/2006 | Gass | |
| 7,100,483 B2 | 9/2006 | Gass et al. | |
| 7,121,358 B2 | 10/2006 | Gass et al. | |
| 7,171,879 B2 | 2/2007 | Gass et al. | |
| 7,173,537 B2 | 2/2007 | Voigtlaender | |
| 7,197,969 B2 | 4/2007 | Gass et al. | |
| 7,210,383 B2 | 5/2007 | Gass et al. | |
| 7,225,712 B2 | 6/2007 | Gass et al. | |
| 7,231,856 B2 | 6/2007 | Gass et al. | |
| 7,284,467 B2 | 10/2007 | Gass et al. | |
| 7,308,843 B2 | 12/2007 | Gass et al. | |
| 7,328,752 B2 | 2/2008 | Gass et al. | |
| 7,350,444 B2 | 4/2008 | Gass et al. | |
| 7,357,056 B2 | 4/2008 | Gass et al. | |
| 7,359,174 B2 | 4/2008 | Gass | |
| 7,377,199 B2 | 5/2008 | Gass et al. | |
| 7,421,315 B2 | 9/2008 | Gass et al. | |
| 7,421,932 B1 | 9/2008 | Heinzmann et al. | |
| 7,481,140 B2 | 1/2009 | Gass et al. | |
| 7,509,899 B2 | 3/2009 | Gass et al. | |
| 7,525,055 B2 | 4/2009 | Gass et al. | |
| 7,536,238 B2 | 5/2009 | Gass | |
| 7,540,334 B2 | 6/2009 | Gass et al. | |
| 7,591,210 B2 | 9/2009 | Gass et al. | |
| 7,600,455 B2 | 10/2009 | Gass et al. | |
| 7,617,752 B2 | 11/2009 | Gass et al. | |
| 7,621,205 B2 | 11/2009 | Gass | |
| 7,628,101 B1 | 12/2009 | Knapp et al. | |
| 7,640,835 B2 | 1/2010 | Gass | |
| 7,640,837 B2 | 1/2010 | Gass et al. | |
| 7,644,645 B2 | 1/2010 | Gass et al. | |
| 7,681,479 B2 | 3/2010 | Gass et al. | |
| 7,698,975 B2 | 4/2010 | Peot et al. | |
| 7,707,918 B2 | 5/2010 | Gass et al. | |
| 7,707,920 B2 | 5/2010 | Gass et al. | |
| 7,712,403 B2 | 5/2010 | Gass et al. | |
| 7,739,934 B2 | 6/2010 | Tetelbaum et al. | |
| 7,784,507 B2 | 8/2010 | Gass | |
| 7,789,002 B2 | 9/2010 | Gass et al. | |
| 7,804,204 B1 | 9/2010 | Shafer et al. | |
| 7,827,890 B2 | 11/2010 | Gass et al. | |
| 7,866,239 B2 | 1/2011 | Gass et al. | |
| 7,888,826 B1 | 2/2011 | Shafer et al. | |
| 7,895,927 B2 | 3/2011 | Gass | |
| 7,900,541 B2 | 3/2011 | Gass et al. | |
| 7,908,950 B2 | 3/2011 | Gass et al. | |
| 7,971,613 B2 | 7/2011 | Gass et al. | |
| 7,991,503 B2 | 8/2011 | Gass | |
| 7,997,176 B2 | 8/2011 | Gass et al. | |
| 8,006,595 B2 | 8/2011 | Gass | |
| 8,018,769 B2 | 9/2011 | Tu et al. | |
| 8,051,759 B2 | 11/2011 | Gass et al. | |
| 8,061,245 B2 | 11/2011 | Gass | |
| 8,079,292 B2 | 12/2011 | Gass et al. | |
| 8,082,825 B2 | 12/2011 | Butler | |
| 8,087,438 B2 | 1/2012 | Gass | |
| 8,091,456 B2 | 1/2012 | Keller et al. | |
| 8,122,807 B2 | 2/2012 | Gass et al. | |
| 8,186,255 B2 | 5/2012 | Gass et al. | |
| 8,191,450 B2 | 6/2012 | Gass | |
| 8,196,499 B2 | 6/2012 | Gass | |
| 8,291,797 B2 | 10/2012 | Gass et al. | |
| 8,402,869 B2 | 3/2013 | Gass et al. | |
| 8,616,100 B2 | 12/2013 | Winkler | |
| 8,640,583 B2 | 2/2014 | Pierga et al. | |
| 8,919,231 B2 | 12/2014 | Butler et al. | |
| 9,522,476 B2 | 12/2016 | Gass | |
| 2002/0050198 A1 | 5/2002 | Kuchler | |
| 2002/0170399 A1 * | 11/2002 | Gass | B23D 59/001 83/62.1 |
| 2002/0170400 A1 | 11/2002 | Gass | |
| 2003/0037651 A1 | 2/2003 | Gass et al. | |
| 2003/0131703 A1 | 7/2003 | Gass et al. | |
| 2004/0040426 A1 | 3/2004 | Gass et al. | |
| 2004/0194594 A1 | 10/2004 | Dils et al. | |
| 2005/0041359 A1 | 2/2005 | Gass | |
| 2005/0139459 A1 | 6/2005 | Gass et al. | |
| 2006/0123960 A1 | 6/2006 | Gass et al. | |
| 2006/0123964 A1 | 6/2006 | Gass et al. | |
| 2006/0219076 A1 | 10/2006 | Gass et al. | |
| 2006/0225551 A1 | 10/2006 | Gass | |
| 2006/0254401 A1 * | 11/2006 | Gass | B23D 59/005 83/13 |
| 2006/0280575 A1 | 12/2006 | Ruettiger | |
| 2006/0288992 A1 | 12/2006 | Baratta | |
| 2007/0028733 A1 | 2/2007 | Gass | |
| 2007/0176035 A1 | 8/2007 | Campbell | |
| 2008/0016998 A1 | 1/2008 | Keller | |

(56) References Cited

U.S. PATENT DOCUMENTS

| | | |
|---|---|---|
| 2008/0178722 A1 | 7/2008 | Gass et al. |
| 2009/0084240 A1 | 4/2009 | Gass et al. |
| 2009/0114070 A1 | 5/2009 | Gass |
| 2009/0241745 A1 | 10/2009 | Keller et al. |
| 2010/0083804 A1 | 4/2010 | Gass et al. |
| 2010/0180741 A1 | 7/2010 | Gass et al. |
| 2010/0307308 A1 | 12/2010 | Butler |
| 2015/0075343 A1 | 3/2015 | Butler et al. |

* cited by examiner

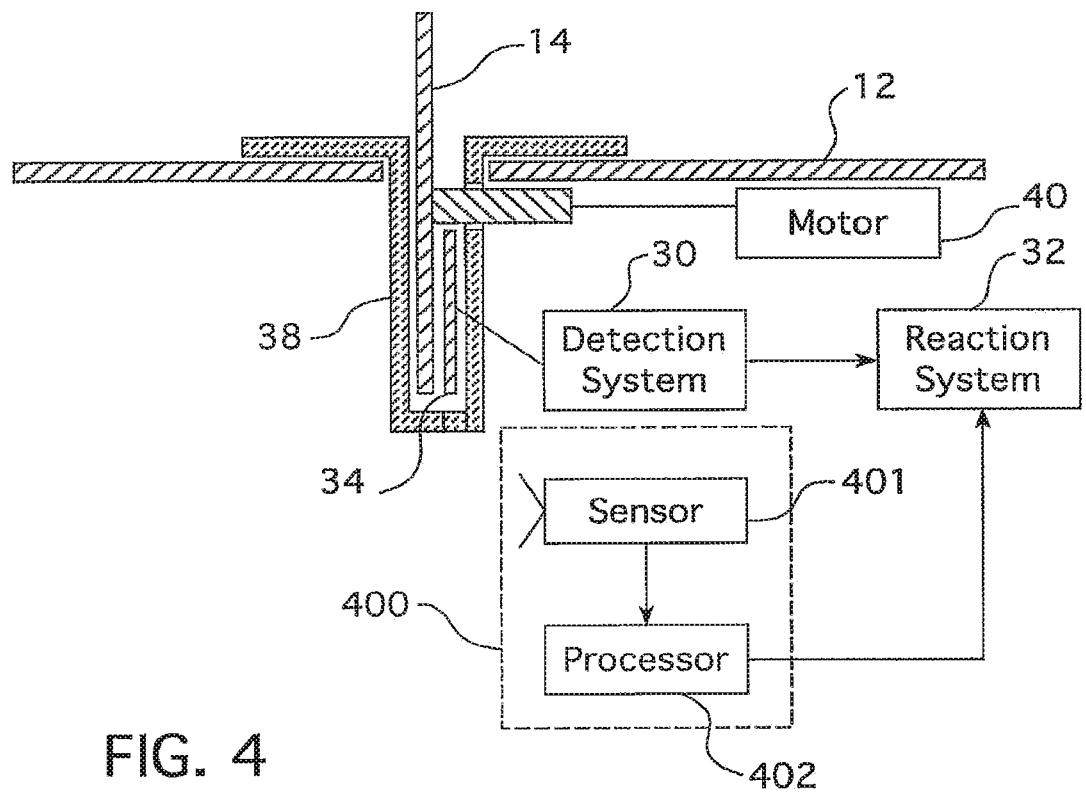
FIG. 4
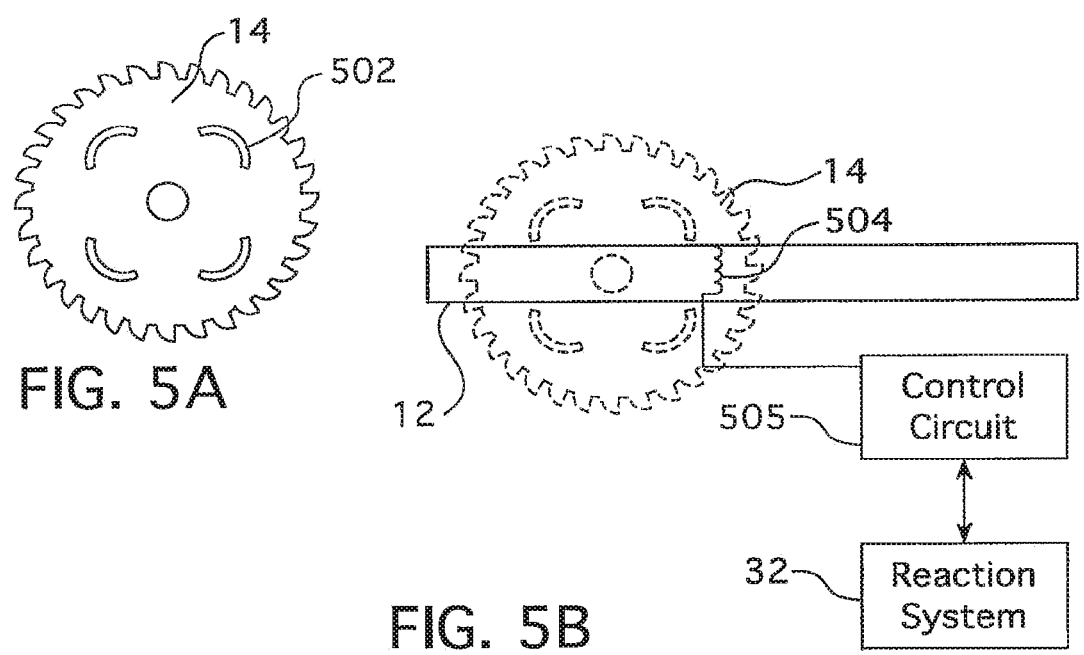
FIG. 5A
FIG. 5B

TABLE SAW WITH TABLE SENSOR FOR SENSING CHARACTERISTIC OF WORKPIECE

PRIORITY CLAIMS

The present application claims priority as a divisional under 35 U.S.C. §§ 120-121 to U.S. nonprovisional patent application Ser. No. 14/495,311, filed Sep. 24, 2014, which is a divisional of U.S. application Ser. No. 13/129,948, filed May 18, 2011, now U.S. Pat. No. 8,919,231, which claims priority to PCT application PCT/US09/65083, filed Nov. 19, 2009, which claims priority to U.S. provisional application Ser. No. 61/116,098, filed Nov. 19, 2008, all of which are incorporated herein by reference in their entirety.

BACKGROUND

Many types of power tools have exposed blades, such as table saws and other cutting tools. Contact between the blade and an object other than the workpiece can be dangerous. Safety systems to mitigate potentially dangerous conditions are continually being developed.

SUMMARY

Various new and improved safety systems for power tools, such as table saws, are disclosed herein. The disclosed safety systems include detection systems for detecting a dangerous condition relative to a blade of the power tool, reaction systems for taking mitigating action in response to detection of a dangerous condition, systems for detecting whether the blade is spinning, systems for detecting kickback of the workpiece, and others. Generally, the embodiments described herein may detect, prevent, and/or mitigate a dangerous condition associated with the power tool.

In one general aspect, embodiments of the present invention are directed to a table saw that comprises a cutting surface and a motor-driven, rotatable blade for cutting a workpiece on the cutting surface. In one embodiment, the table saw comprises a kickback detection system for detecting kickback of the workpiece during cutting of the workpiece. In addition, the table saw comprises reaction means in communication with the kickback detection system for taking a mitigating reaction in response to detection of kickback of the workpiece during cutting of the workpiece by the kickback detection system. According to various implementations, the kickback detection system comprises an acoustic sensor and a processor in communication with the acoustic sensor. The processor is programmed to recognize a condition indicative of kickback of the workpiece during cutting of the workpiece based on input from the acoustic sensor. In another implementation, the kickback detection system comprises a torque sensor mounted on the rotatable blade shaft and a processor in communication with the torque sensor, where the processor is programmed to recognize a condition indicative of kickback of the workpiece during cutting of the workpiece based on input from the torque sensor.

In another general aspect of the present invention, the table saw comprises a blade-spin detection system for detecting whether the blade is rotating based on energy from the blade. The blade-spin detection system may be in communication with the reaction means and may provide an output to arm the reaction means when the blade-spin detection system detects that the blade is spinning. According to various implementations, the blade-spin detection system comprises a static electricity charge sensor in proximity to the blade for sensing the static electricity build-up on the blade. In another implementation, the blade-spin detection system comprises: (i) a transmitter proximate to the blade for transmitting radio signals; (ii) a passive electronic circuit on the blade that transmits responsive radio signals when passively energized by the radio signals transmitted by the transmitter; and (iii) a receiver, proximate to the blade, for detecting the responsive radio signals from the passive electronic circuit on the blade. In another implementation, the blade-spin detection system comprises an acoustic sensor and a processor, where the processor is programmed to determine whether the blade is rotating based on input from the acoustic sensor.

In another general aspect of the present invention, the table saw comprises a sensor connected to the cutting surface for sensing a characteristic of the workpiece during, prior to, and/or after cutting of the workpiece. In various implementations, the sensor comprises a height sensor for sensing a height of the workpiece relative to the cutting surface. In such an embodiment, the table saw further comprises a height adjustment circuit that receives an input signal from the height sensor indicative of the height of the workpiece relative to the cutting surface and outputs a signal to a blade height adjustment mechanism to adjust the height of the blade based on the height of the workpiece as sensed by the height sensor. In another embodiment, the sensor comprises a workpiece conductivity sensor on the cutting surface that detects electrical conductivity of the workpiece. In such an embodiment, the table saw further comprises contact detection means for detecting contact with the blade by an object other than the workpiece. The contact detection means receives an input from the workpiece conductivity sensor, which input is used to determine when to trigger the mitigating reaction means.

In another general aspect of the present invention, the blade comprises a first electrically conductive blade portion, a second electrically conductive blade portion, and a dielectric between the first and second electrically conductive blade portions. In such an embodiment, the table saw may comprise a contact detection system for detecting contact with the blade by an object other than the workpiece. The contact detection system may be connected to the first electrically conductive blade portion and drive the first electrically conductive blade portion with an electrical drive signal. The processor of the contact detection system may detect contact with the blade by a foreign object based on an electrical signal from either the first or second blade portions. For example, the processor may detect contact with the blade by a foreign object based on an electrical signal from the first electrically conductive blade portion.

In yet another general aspect of the present invention, the table saw comprises a reaction system for taking a mitigating reaction in response to detection of a dangerous condition relative to the blade when detected by the detection system. In various embodiments, the reaction system comprises a magnetorheological rotary brake connected to the blade shaft that brakes the shaft to thereby brake the blade in response to detection of the dangerous condition by the detection system.

These and other advantageous safety systems for power cutting tools will be apparent from the description below.

FIGURES

Various embodiments of the present invention are described herein by way of example in conjunction with FIGS. 1 to 54, wherein:

FIGS. 3 and 4 are block diagrams of table saws with blade-spin detection sensors according to various embodiments of the present invention;

FIGS. 5A and 5B illustrate a table saw blade with magnets according to various embodiments of the present invention;

Figure 21A:
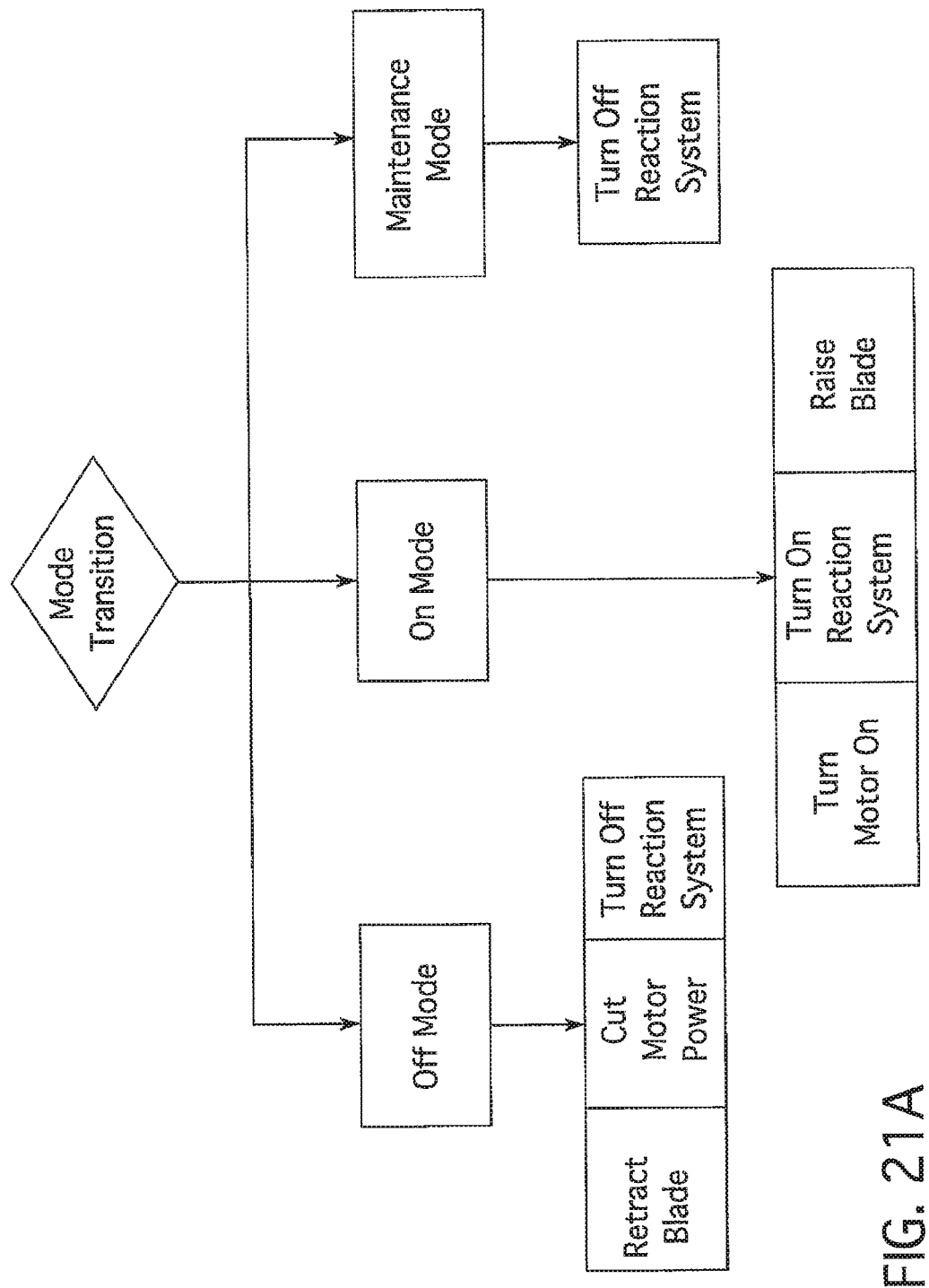
Figure 21B:
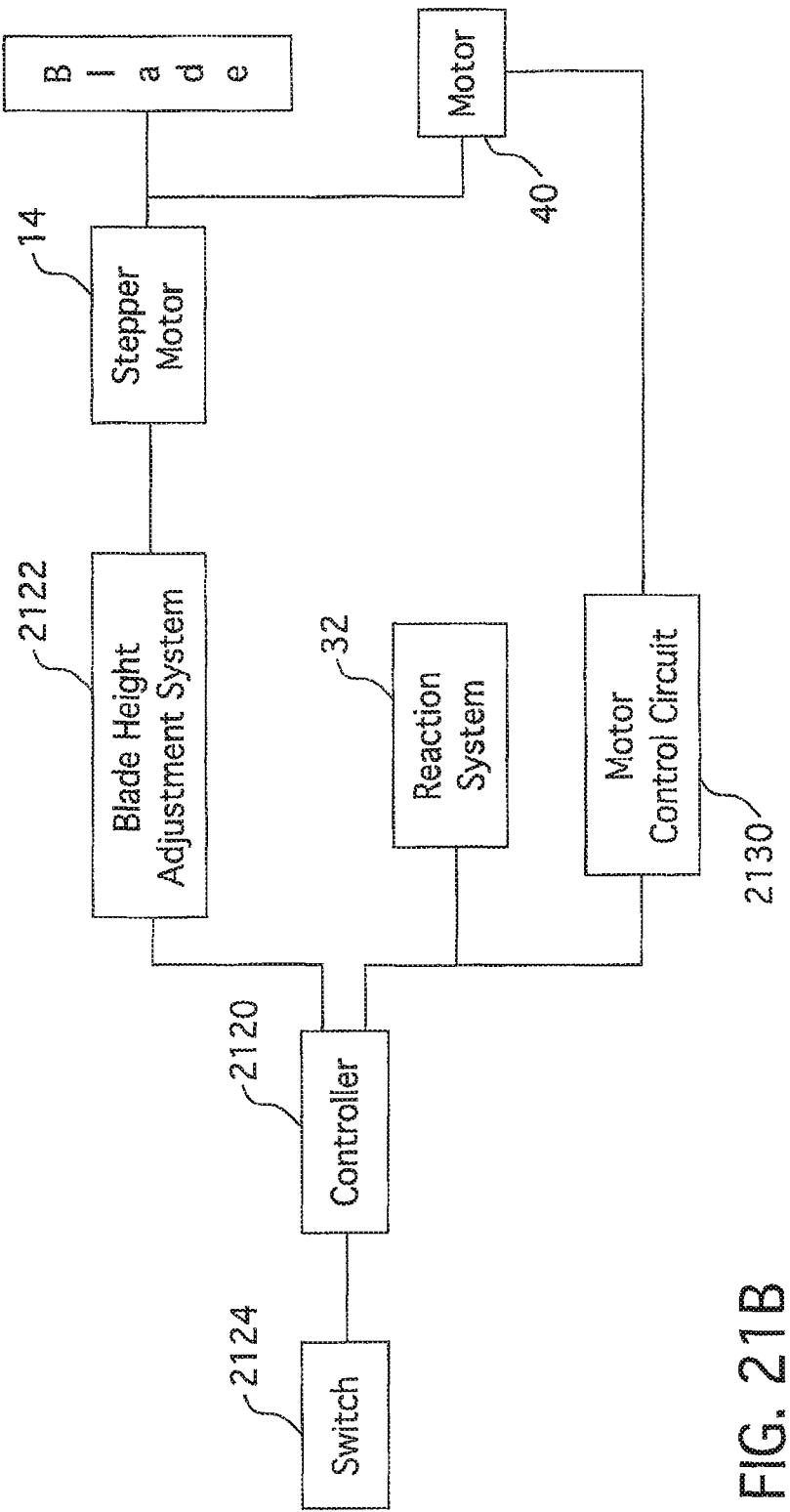
Figure 22:
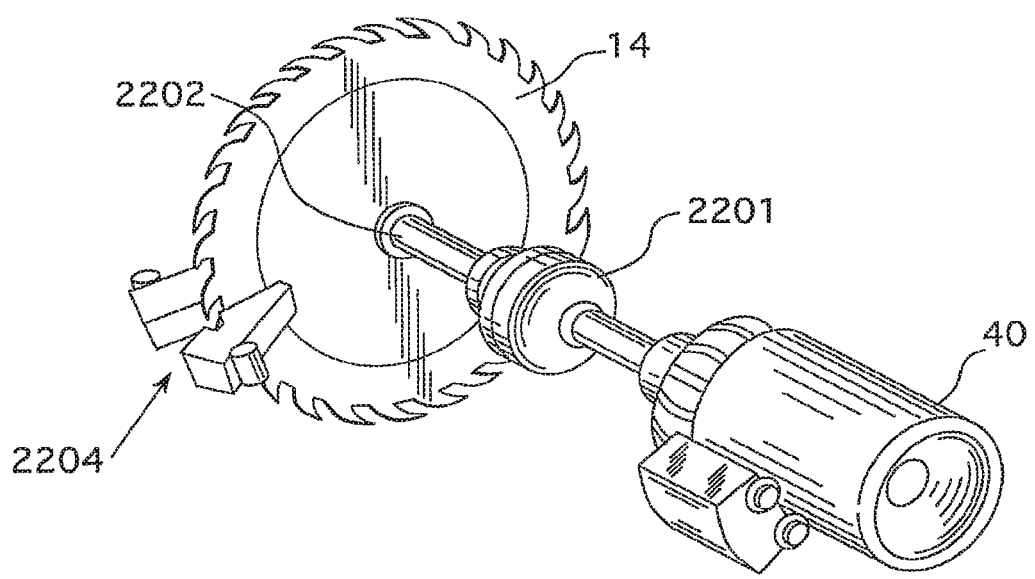
Figure 23:
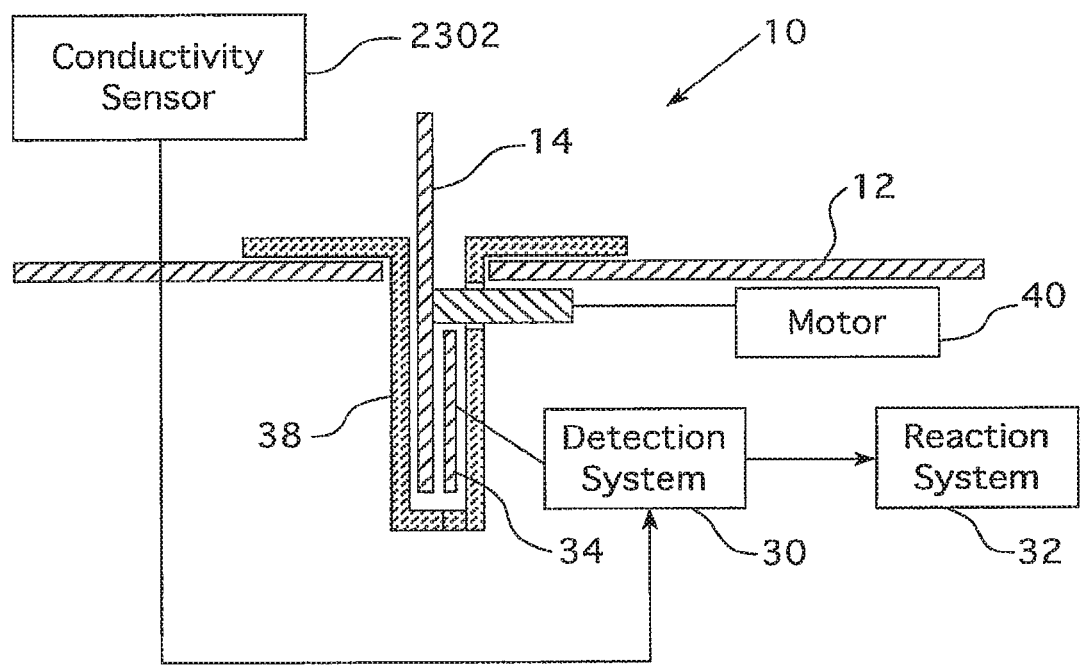
Figure 24:
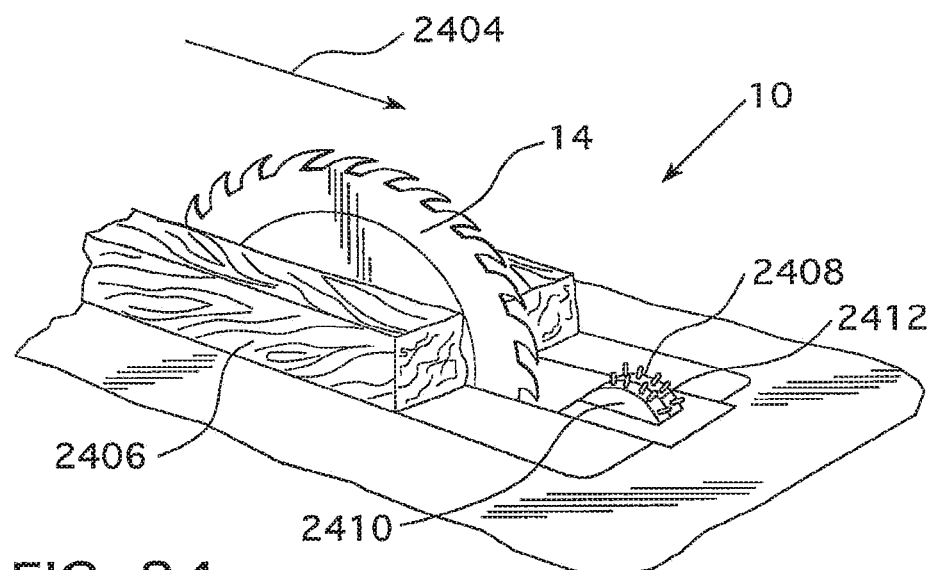
Figure 25:
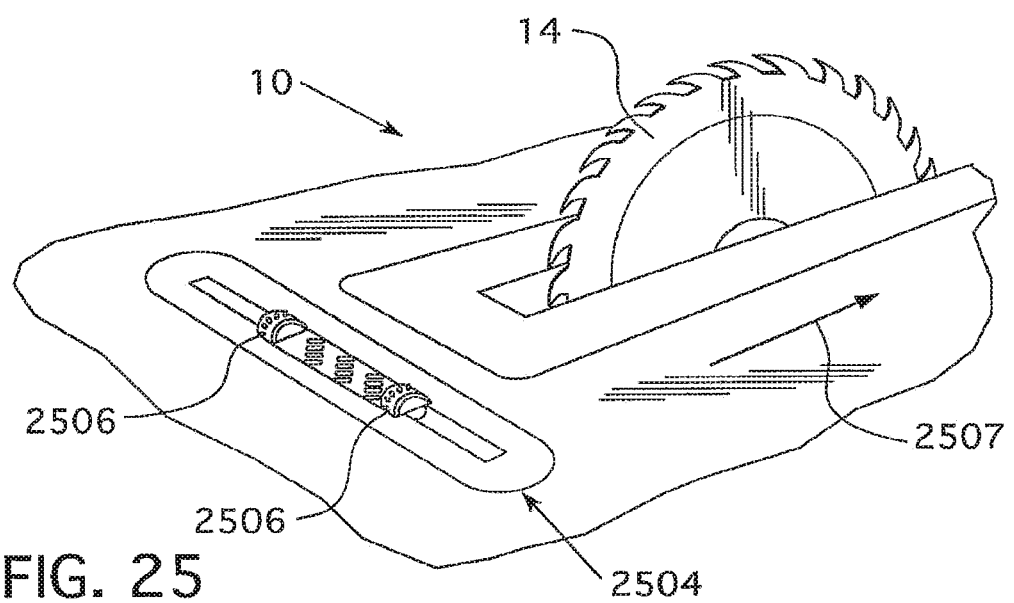
Figure 26:
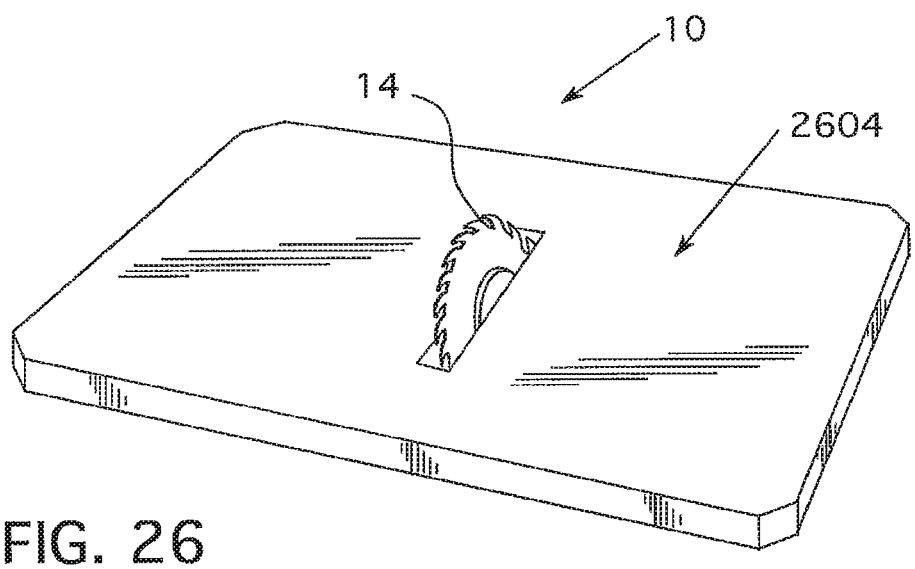
Figure 27:
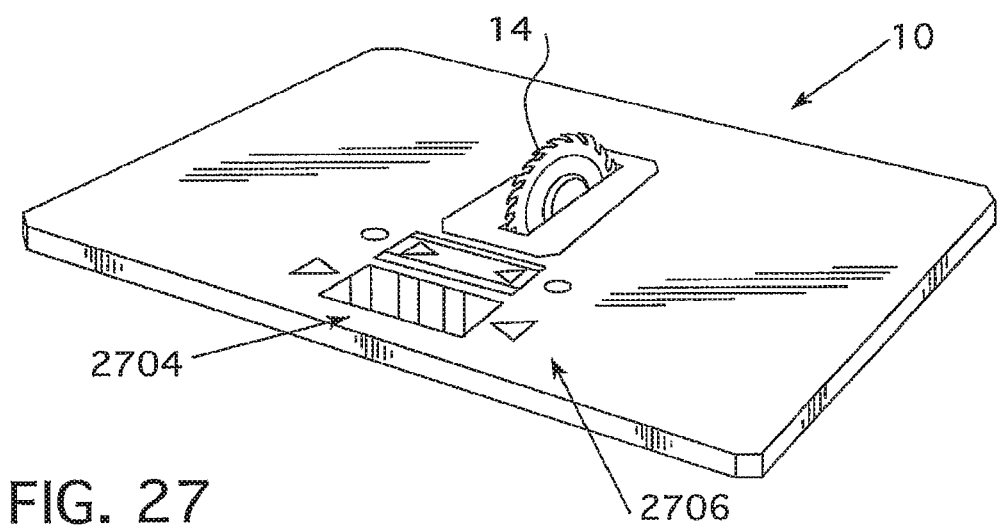
Figure 28:
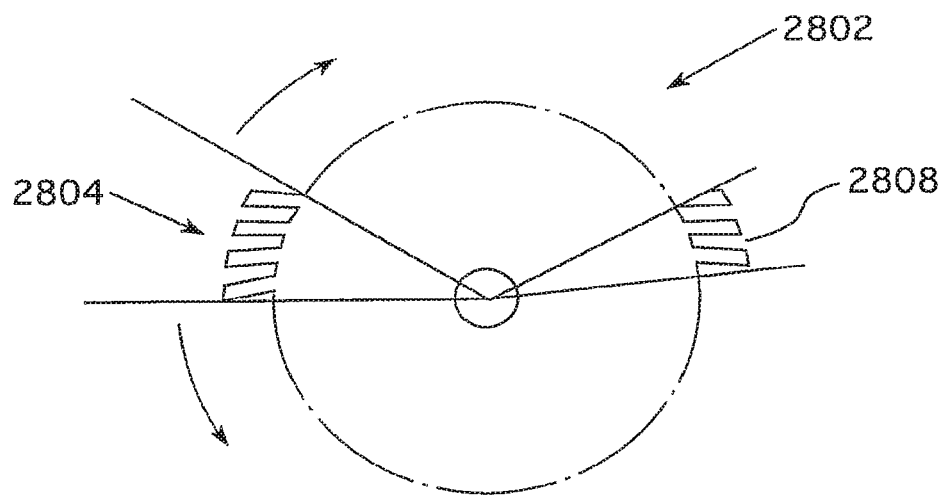
Figure 29:
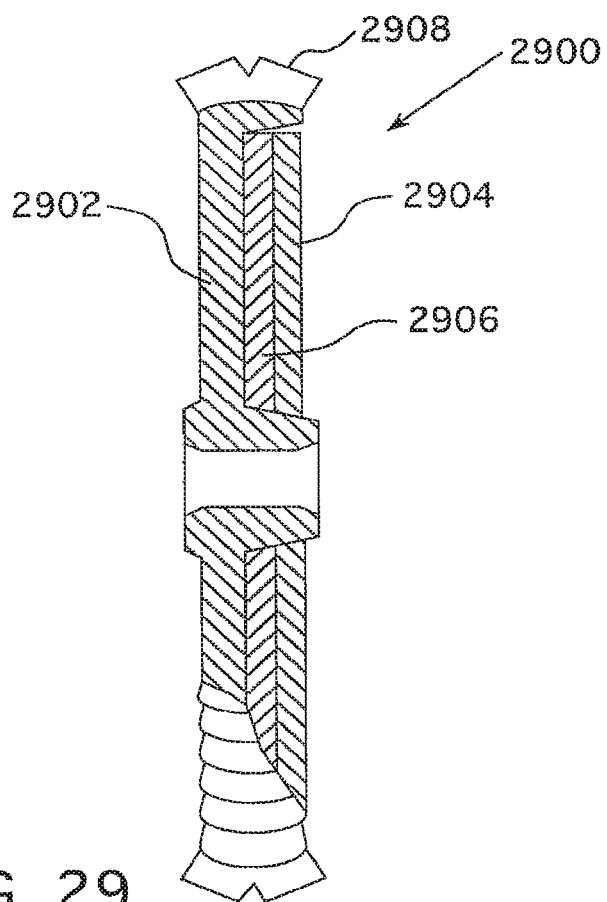
Figure 30:
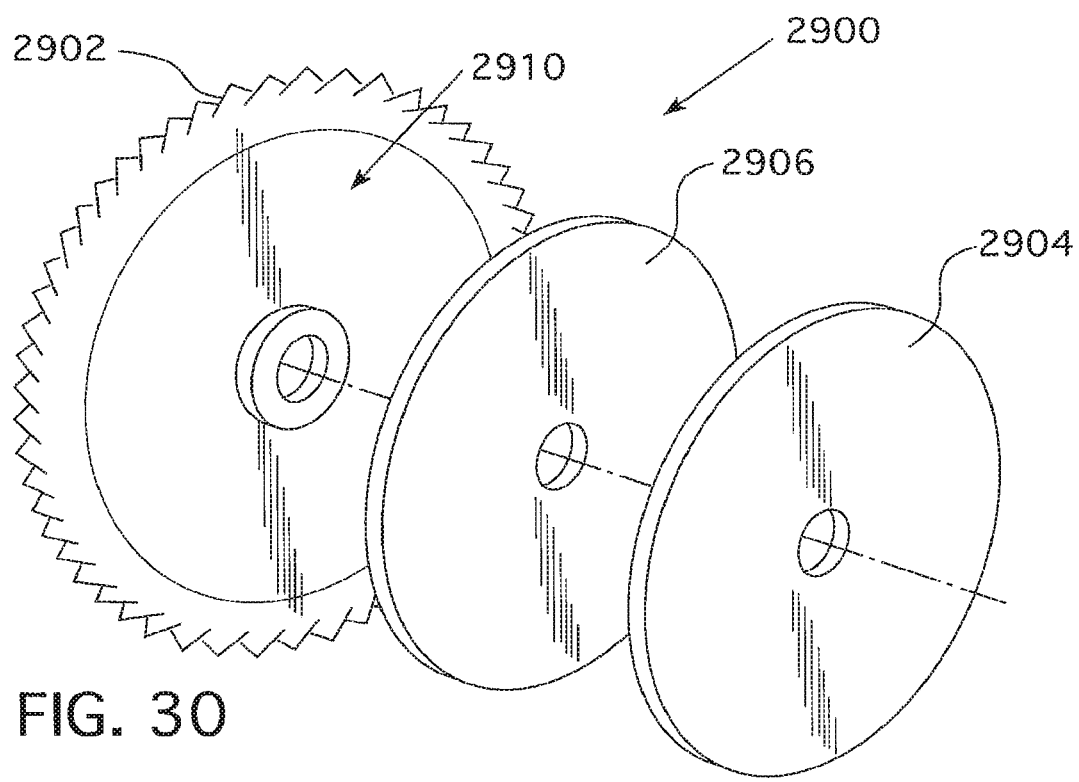
Figure 31:
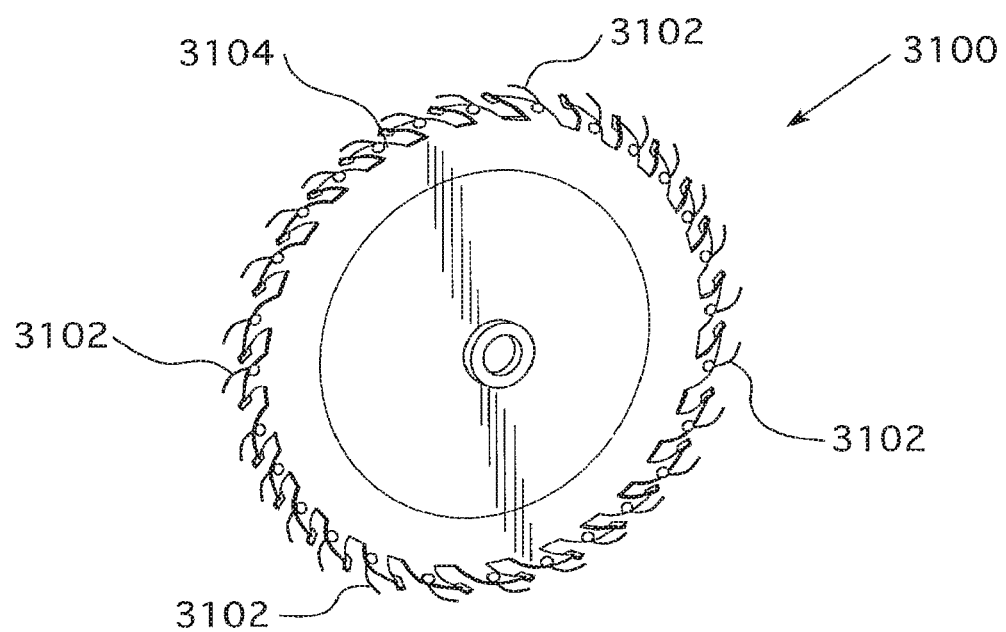
Figure 32:
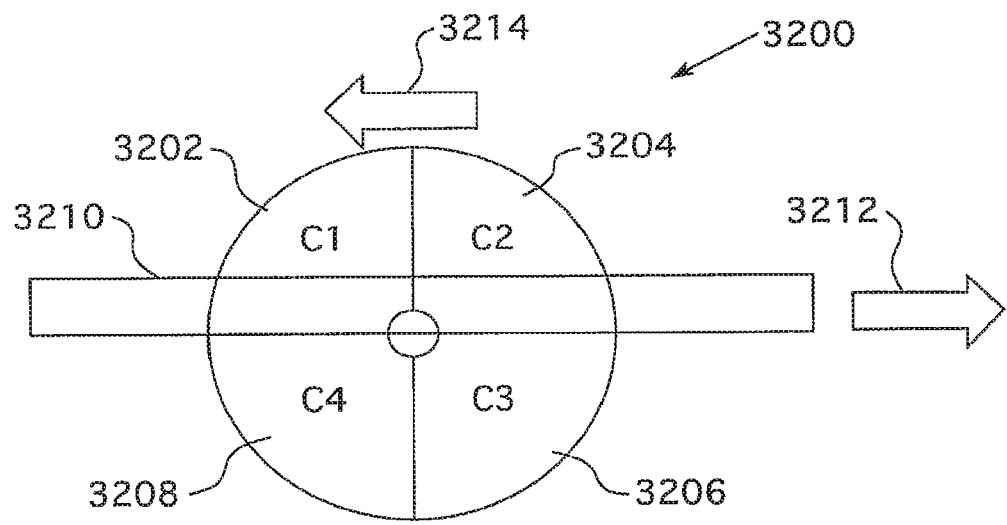
Figure 33:
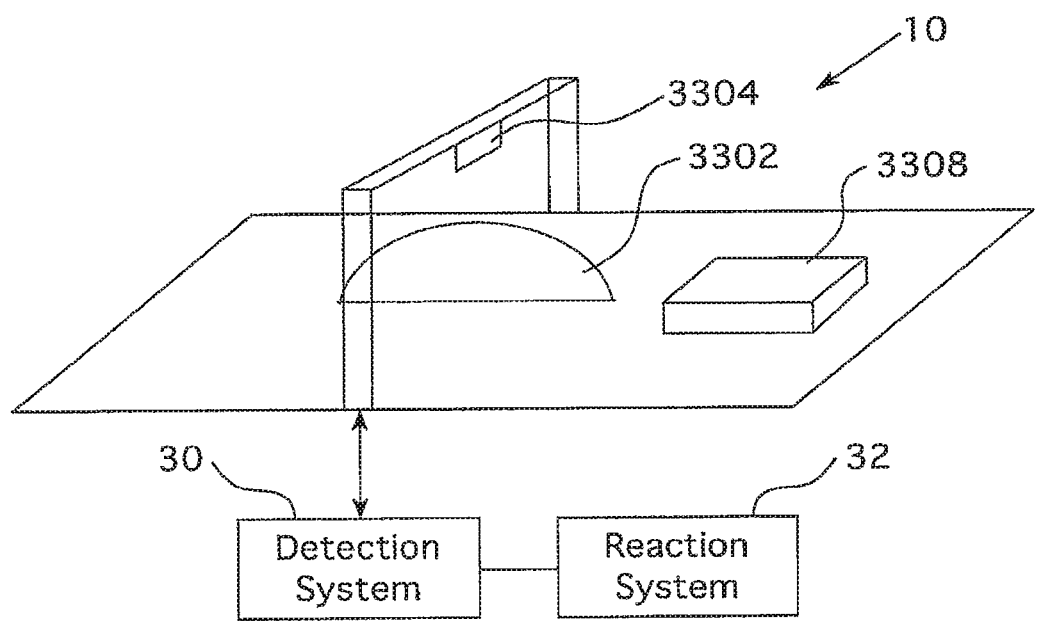
Figure 43:
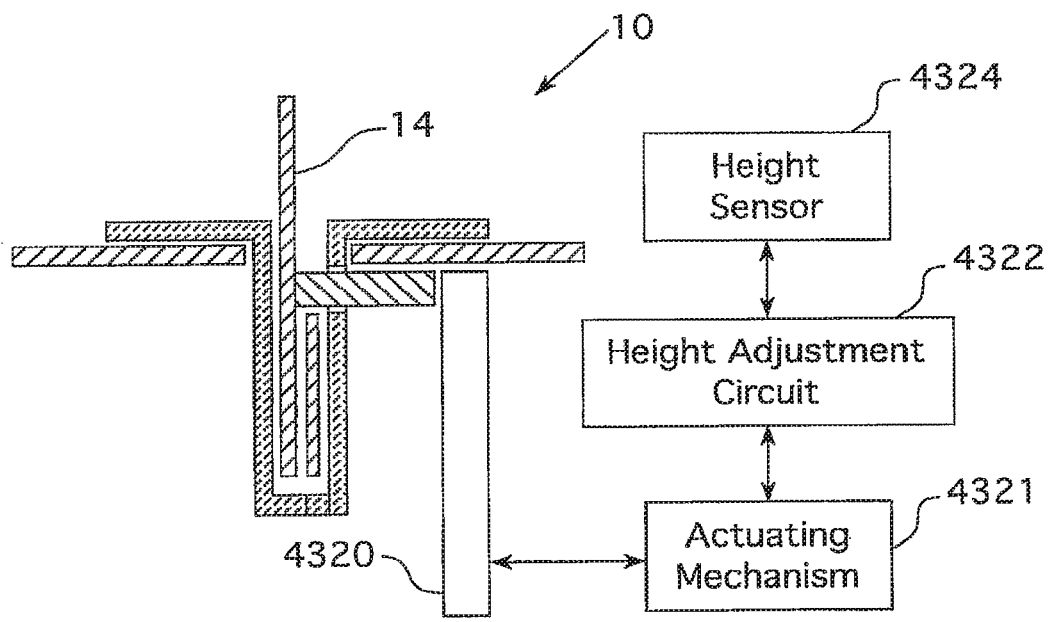
Figure 44:
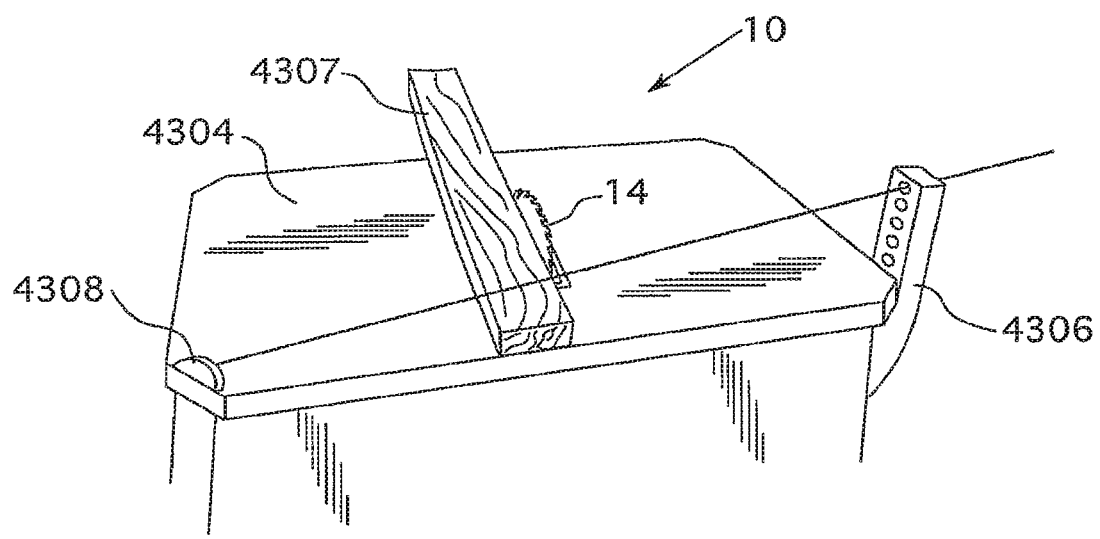
Figure 45:
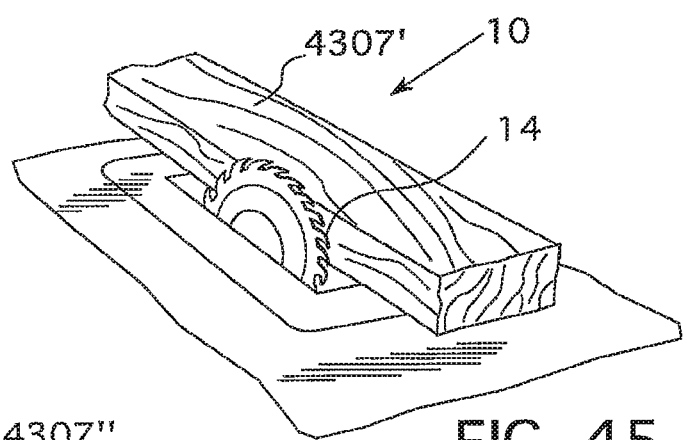
Figure 46:
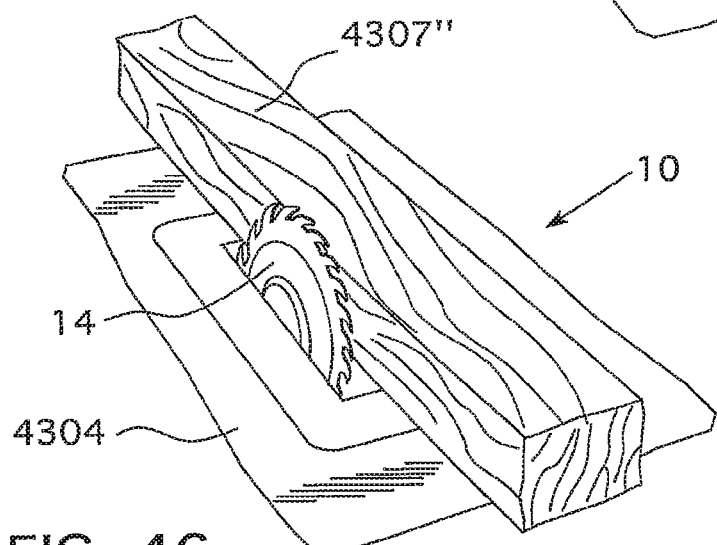
Figure 47:
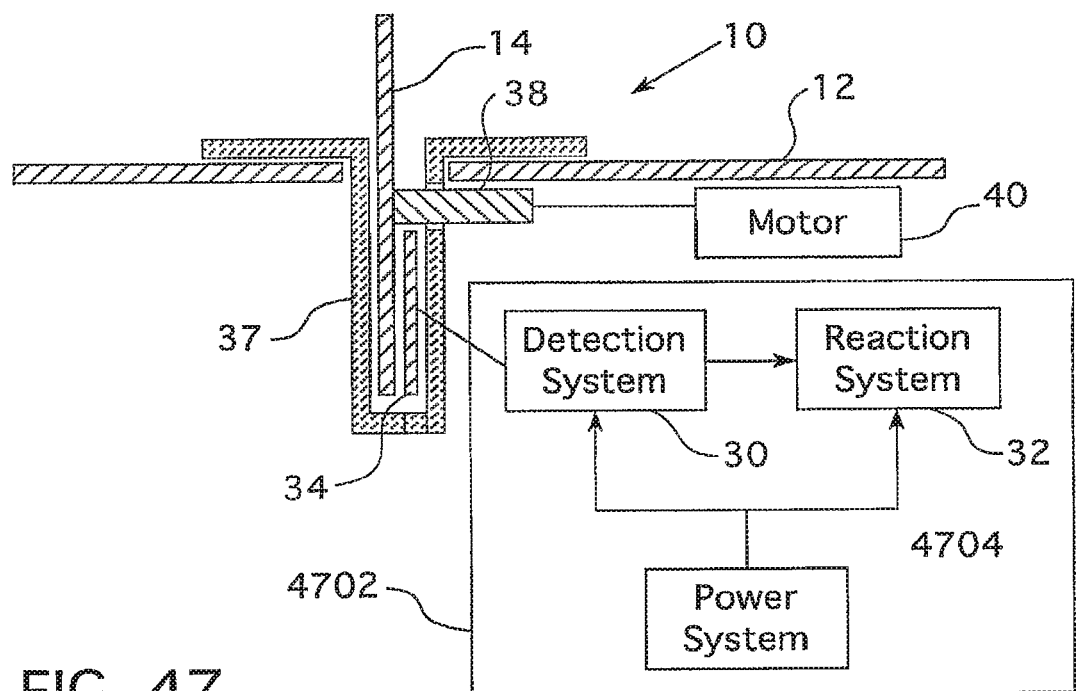
Figure 48:
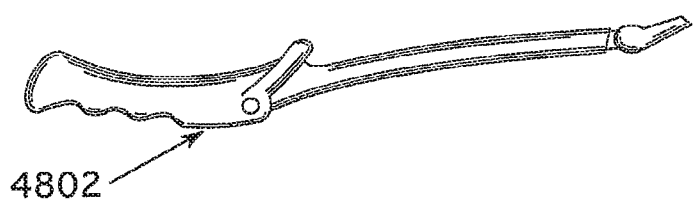
Figure 49:
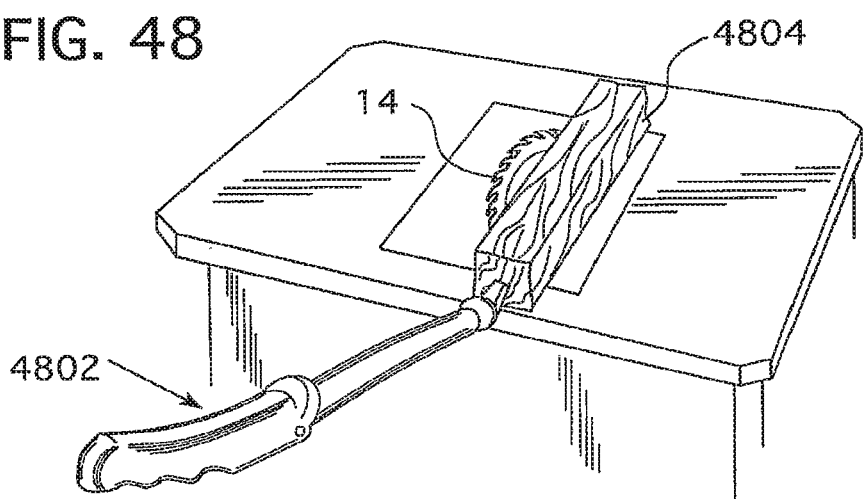
Figure 50:
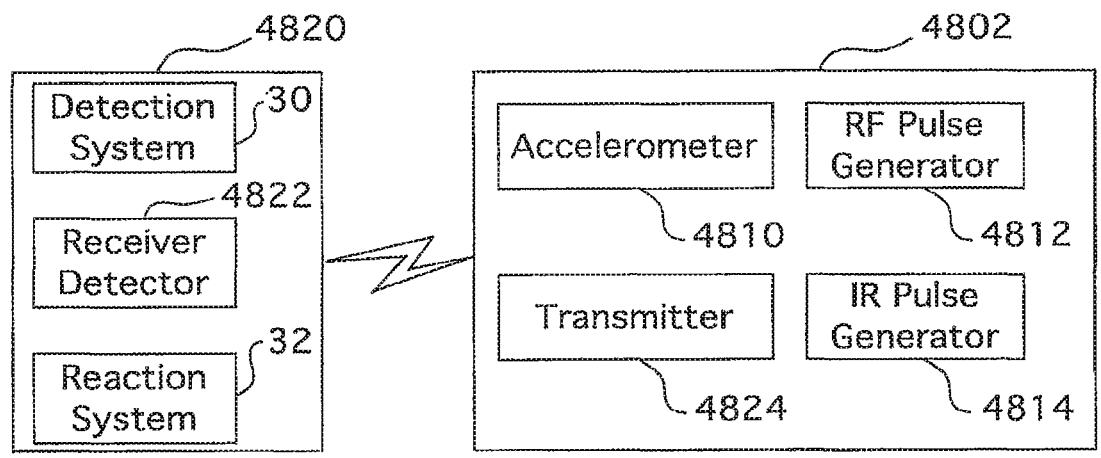
Figure 51:
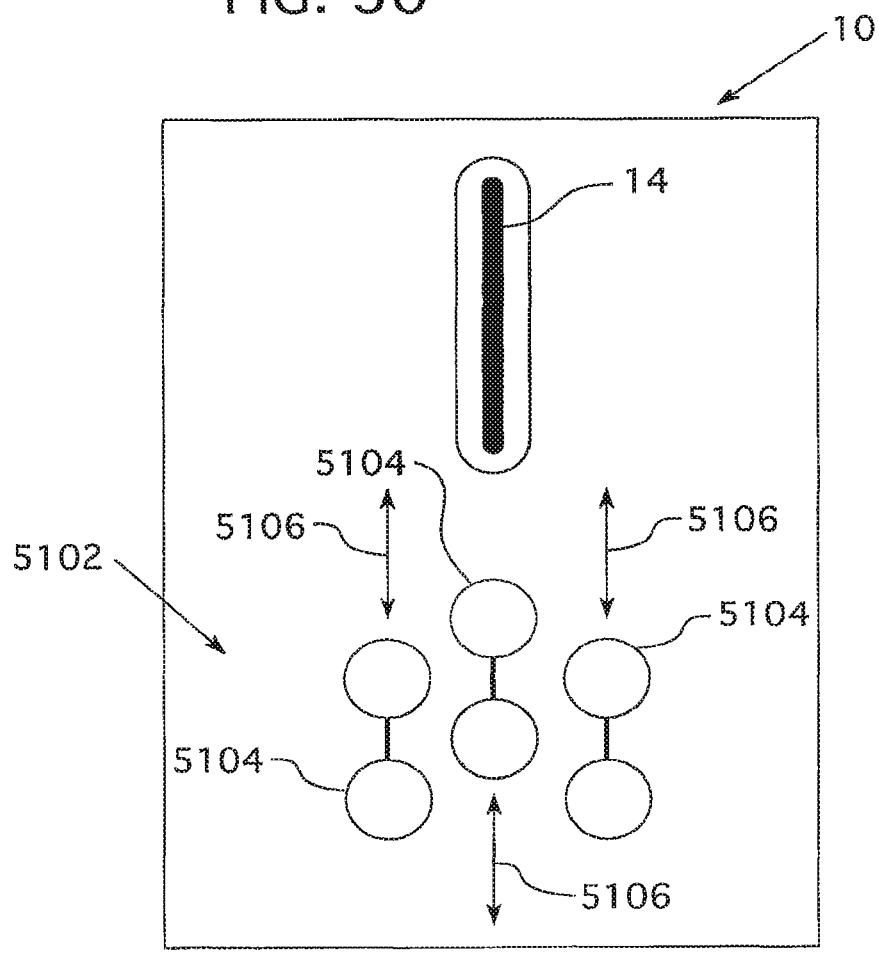
Figure 52:
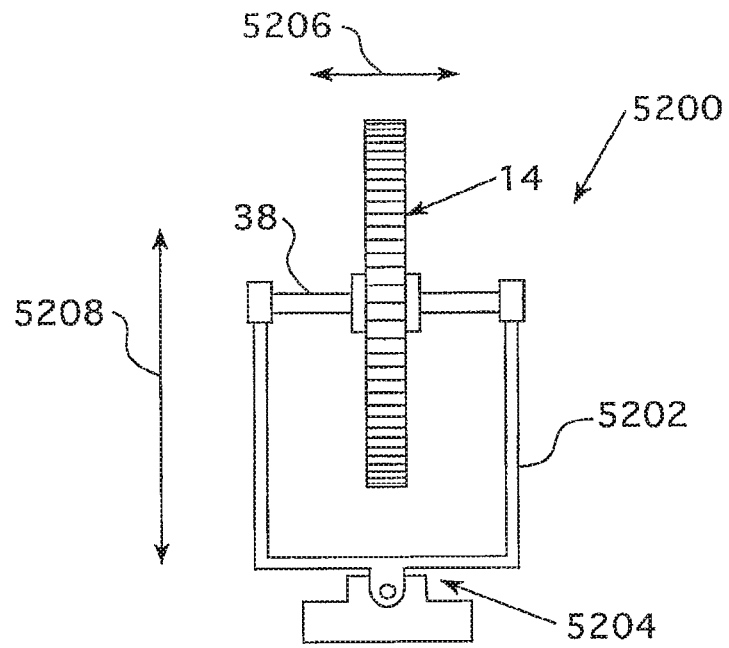
Figure 53:
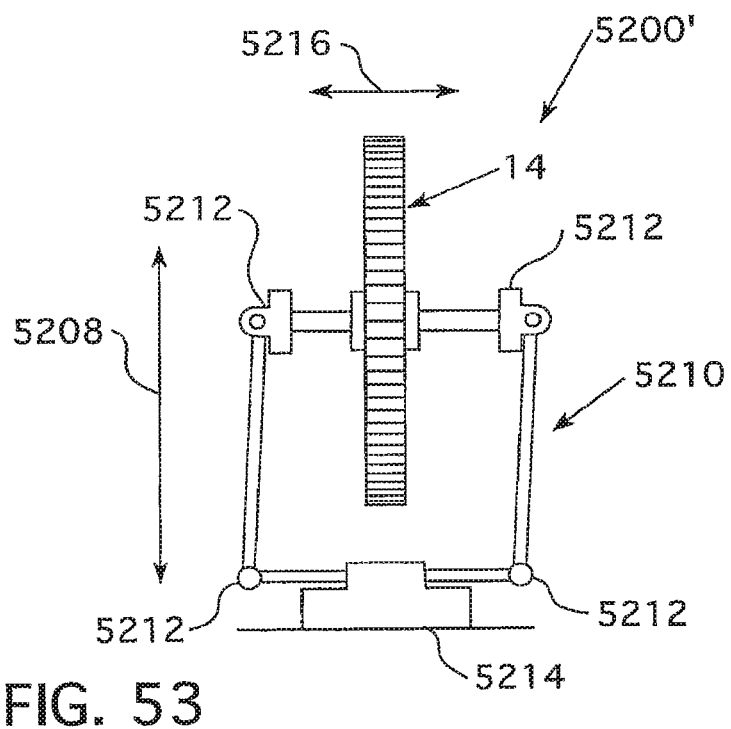
Figure 54:
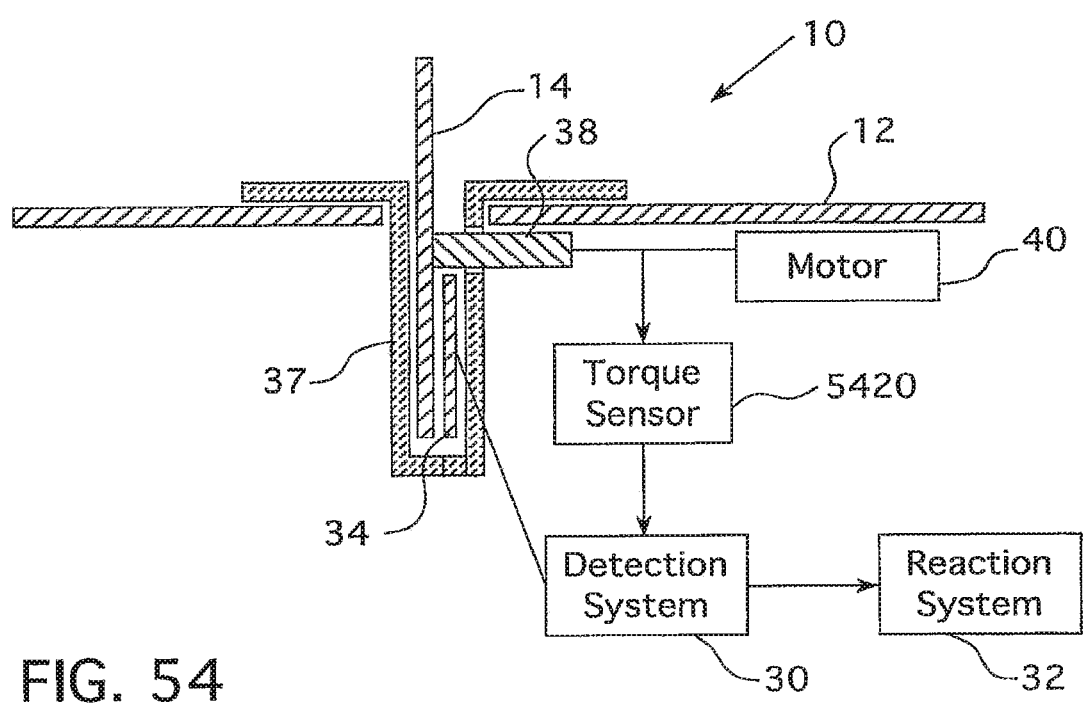

FIGS. 21A-B are flowcharts of a process according to various embodiments of the present invention;

FIG. 22 is a diagram of a table saw blade and motor with a clutch and brake system according to various embodiments of the present invention;

FIG. 23 is a block diagram of a table saw according to various embodiments of the present invention;

FIG. 24 is a diagram of a table saw with a trailing edge sensor assembly according to various embodiments of the present invention;

FIG. 25 is a diagram of a table saw with a conductivity sensor according to various embodiments of the present invention;

FIGS. 26 and 27 are diagrams of table saws with a sensing table top surface according to various embodiments of the present invention;

FIG. 28 is a diagram of a segmented table saw blade according to various embodiments of the present invention;

FIGS. 29 and 30 are diagrams of a table saw blade capacitor according to various embodiments of the present invention;

FIG. 31 is a diagram of a table saw blade with whiskers according to various embodiments of the present invention;

FIG. 32 is a diagram of a segmented table saw blade according to various embodiments of the present invention;

FIG. 33 is a diagram of a table saw with a overhead sensor assembly according to various embodiments of the present invention;

FIGS. 34-42 are diagrams of table saws with downstream safety members according to various embodiments of the present invention;

FIG. 43 is a block diagram of a table saw with a height sensor and blade height adjustment circuit according to various embodiments of the present invention;

FIGS. 44-46 are diagrams of table saws with a workpiece height sensor assembly according to various embodiments of the present invention;

FIG. 47 is a block diagram of a table saw with an installed retrofit package according to various embodiments of the present invention;

FIGS. 48, 49 and 50 are diagrams of a push stick that can be used with a table saw according to various embodiments of the present invention;

FIG. 51 is a top view of a table saw with a suction feed assembly according to various embodiments of the present invention;

FIGS. 52 and 53 are diagrams of a kick back detection mechanism according to various embodiments of the present invention; and FIG. 54 is a block diagram of a table saw with a torque sensor according to various embodiments of the present invention.

DESCRIPTION

Figure 1:
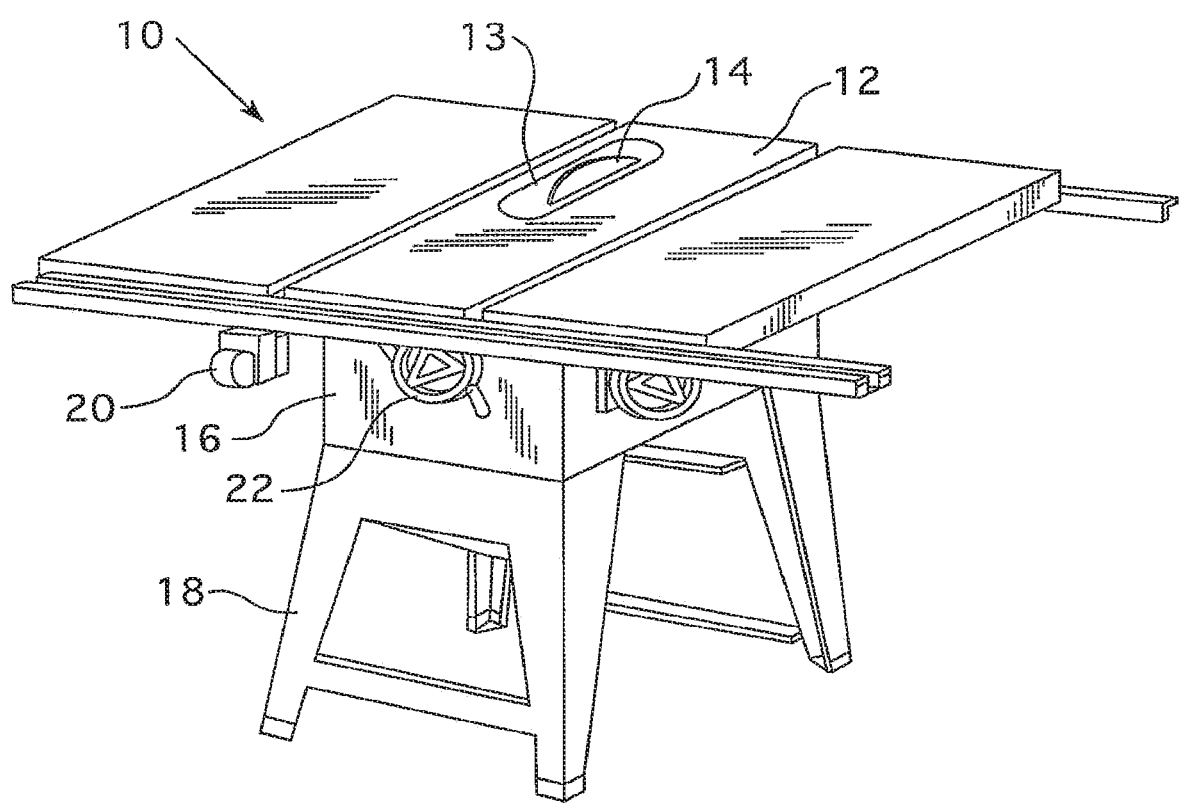
FIG. 1 is a diagram of a table saw.

The embodiments of the present invention relate generally to safety systems for power tools having an exposed, moving cutting instrument or blade, such as a table saw. Before describing the various new safety features, an example table saw is described. FIG. 1 shows one type of exemplary table saw 10. It includes a table (or tabletop) 12 through which a circular blade 14 extends from beneath the table. The table 12 includes a throat plate 13, which includes an elongated slot through which a portion of the circular blade 14 extends. A workpiece (not shown) may be placed on the cutting surface of the tabletop 12 and be cut by the portion of the blade 14 extending above the cutting surface. The table 12 and blade 14 are supported by a housing 16 and legs 18. The housing 16 may enclose the mechanics that support, position, and drive the blade 16. The housing 16 may also comprise processor-based systems for detecting a dangerous condition relative to the blade, as described below, and/or processor-based systems for detecting the condition of the blade (e.g., whether it is spinning). A motor to drive the blade can be positioned in or outside of the housing. A switch 20 may be used to turn the saw on and off, causing blade 14 to spin when turned on. A handle 22 may be used to adjust manually the position of the blade 14 relative to the table 12. For example, using the handle 22, an operator of the saw 10 may adjust how far the blade 14 extends above the table 12 or how the blade 14 tilts relative to the top (or cutting surface) of the table 12. A user places a workpiece on the table 12 and slides it into the blade 14 to cut the workpiece. Of course, table saws take many different configurations, from large saws sized for industrial use to small saws that can be placed on a bench top or counter, and table saws come with various types of tables and housings. The safety and other mechanism described below may be employed in most any type of table saw, as will be apparent from the description below.

Figure 2:
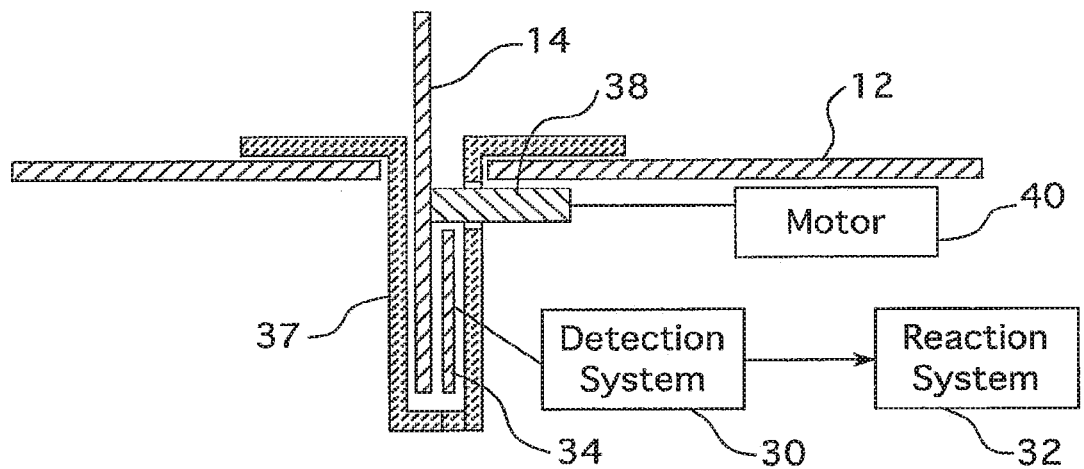
FIG. 2 is a block diagram of a table saw according to various embodiments of the present invention.

FIG. 2 is a diagram showing certain features of a table saw 10 according to various embodiments of the present invention. FIG. 2 shows that the table saw 10 may comprise a detection system 30 that may be used to detect a potentially dangerous condition with respect to the blade 14. In the illustrated embodiment, the detection system 30 may be a processor-based capacitive contact sensing system that detects contact of a foreign object with the blade 14 based on a change in an electrical signal on the blade 14 due to the change in capacitance when the foreign object contacts the blade 14. The processor of the detection system 30 may be, for example, a digital signal processor, a microprocessor, a microcontroller, or some other type of processor. In such an embodiment, the detection system 30 operates by driving an excitation voltage onto the blade 14 and detecting the current drawn from the blade 14. This current and/or excitation voltage may show changes in amplitude and phase when the blade 14 comes into contact with an electrically conductive foreign object (such as an operator's hand or finger, as well as work pieces). The characteristics of these changes can be used to trigger selectively the operation of a reaction system 32, which takes one or more actions to mitigate the detected dangerous condition. The excitation voltage may be driven onto the blade 14 via an excitation plate 34, which is capacitively coupled to the blade 14. In such an embodiment, a shield 37 may guard the blade 14 from outside electrical interference, including the tabletop 12.

More details regarding such capacitive contact sensing detection systems 30 may be found in U.S. patent application Ser. No. 11,481/549, entitled "Capacitive sensing system for power cutting tool," filed Jul. 6, 2006, and U.S. patent application Ser. No. 12/244,994 entitled "DETECTION SYSTEM FOR POWER TOOL," filed Oct. 3, 2008, both of which are incorporated herein in their entirety. In other embodiments, the detection system 30 may comprise two electrodes capacitively coupled to the blade 14. In such embodiments, the drive signal may be copied to one of the electrodes. Contact by an object with the blade may be detected by analyzing the signal from one or both of the electrodes. The detection system 30 may also be a proximity sensing system that detects when a foreign object comes near (or proximate) to the exposed blade 14. Examples of proximity sensing systems are disclosed in U.S. Pat. No. 7,421,932, issued Sep. 9, 2008, and U.S. patent application Ser. No. 11/444,712, both of which are incorporated herein by reference in their entireties. Other types of detection systems may also be used, and this application discloses other types of detection systems.

The blade 14 may be mounted to an arbor or rotatable blade shaft 38. A motor 40 may drive the arbor 38 to spin the blade 14. The motor 40 may drive the arbor 38 via one or more belts or gears, or it may use a direct drive.

The blade 14 may be directly driven by the motor or indirectly driven through the use of one or more drive belts or gears. The saw 10 may also comprise (under the table 12) a bevel adjustment mechanism (not shown) to adjust the angular orientation of the blade 14 relative to the table top 12 by pivoting the saw blade 14 and motor. The saw 10 may also comprise a height adjustment mechanism (not shown) to adjust the cutting depth of the saw blade 14 by vertical movement of the saw blade 14 and motor. Example embodiments of the bevel adjustment mechanism and the height adjustment mechanism are provided in U.S. Pat. No. 6,595,096, which is incorporated herein by reference in its entirety.

The reaction system 32 may serve to mitigate the potentially dangerous condition detected by the detection system 30 by, for example, braking the blade 14, dropping the blade 14 below the tabletop 12, or any other suitable reaction, several of which are described in more detail below. One example reaction system 32 may use an explosive charge to drive a stopper (or brake) (not shown) into the blade 14, arresting its motion. In addition, or instead, an example reaction system 32 may drop or collapse a blade support member (not shown) causing the blade 14 to fall below the surface of the table 12. An example blade-drop reaction system is described in U.S. patent application Ser. No. 11/374,319, filed 13 Mar. 2006, which is incorporated herein by reference in its entirety.

Figure 3:
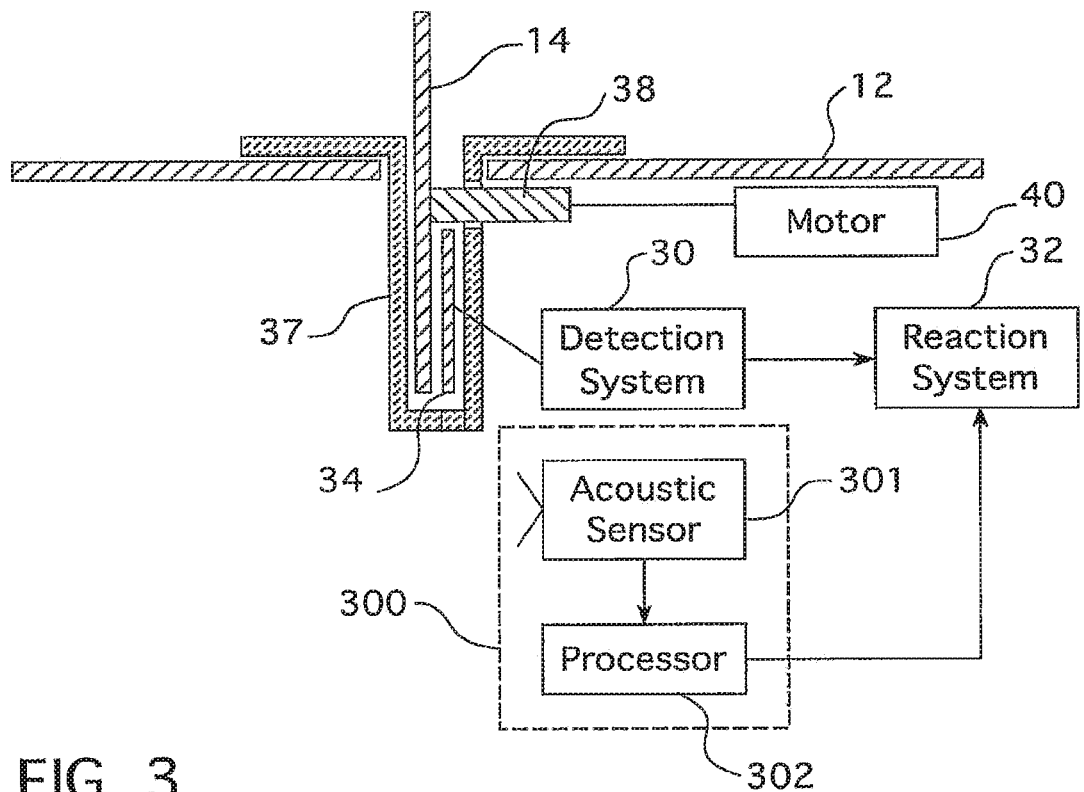

In a table saw having a reaction system 32, it is often important to keep the reaction system 32 operative when the motor 40 powering the blade 14 is turned off, but the blade 14 is still spinning. This is because the spinning blade 14, even though the motor is turned off, still represents a potentially dangerous condition. In one embodiment, as shown in FIG. 3, the table saw 10 may comprise an acoustic sensing system 300, comprising an acoustic sensor 301, such as a microphone, and a processor 302 (e.g., a DSP or microprocessor). The output of the acoustic sensor 301 may be connected to the processor 302, which may characterize the audible and inaudible acoustic energy picked up by the acoustic sensor 301 to detect various operating conditions of the table saw. For example, the acoustic sensor 301 could be positioned near, but spaced from, the blade 14, preferably under the tabletop 12 as shown in FIG. 3, to detect whether the blade 14 is spinning. The acoustic sensing system 300 may be in communication with the reaction system 32. In operation, the processor 302 may compare the acoustic waveforms detected by the sensor 301 to a database of signature waveforms indicative of various conditions of the table saw 10 in order to detect various states or conditions of the table saw, such as whether the blade 14 is spinning or not. If, for example, the acoustic sensing system 300 determines that the blade 14 is still spinning based on the comparison of the signals from the acoustic sensor of the database of signature waveforms, the acoustic sensing system 300 may signal the reaction system 32 to remain powered on and operative (e.g., armed). On the other hand, if the acoustic sensing system 300 detects that the blade 14 is spinning slowly, slowing down, or no longer spinning, or if it detects that the blade 14 is about to come to a complete stop, the acoustic sensing system 300 may signal the reaction system 32 to disarm.

The acoustic sensing system 300 also may be used to detect other conditions, such as potentially dangerous conditions. If the acoustic sensing system 300 detects such a dangerous condition, the acoustic sensing system 300 may send a signal to the reaction system 32 to cause the reaction system to take its mitigating action. Again, the processor 302 may compare the input waveforms from the acoustic sensor 301 to a database of signature waveforms to detect a dangerous condition. For example, the acoustic sensing system 300 may be programmed to detect kickback conditions involving the workpiece being cut by the blade 14. If it detects a kickback condition, the acoustic sensing system 300 may output a signal to the reaction system 32 that triggers the mitigating reaction of the reaction system 32.

The acoustic sensing system 300, based on the output from the sensor 301, could also be programmed to detect various other conditions, such as: (i) motor on with no load; (ii) cutting various types of material (e.g., wood, metal, plastic); and (iii) motor off. The detection of these various states could be used to control different systems of the table saw 10. For example, if the acoustic sensing system 300 detects that the motor is off and the blade is not spinning, the acoustic sensing system 300 may disarm the reaction system 32 so that, for example, maintenance of the table saw 10 may be performed without activating the reaction system 32. Of course, in various embodiments, the acoustic sensing system 300 may comprise a number of acoustic sensors 301 that supply input to the processor 302. The data base of the signature waveforms (for blade spin and/or kickback or the other conditions) may be stored in a memory unit that is in communication with the processor 302. The memory unit may be, for example, a read-only memory (ROM). In various embodiments the ROM may be integrated with the processor 302.

In another embodiment, as shown in FIG. 4, the table saw 10 may comprise a blade-generated airflow sensing system 400 to detect whether the blade 14 is spinning or not. The blade-generated airflow sensing system 400, as shown in FIG. 4, may comprise one or more sensors 401 and a processor 402 in communication with the sensors 401. The sensor 401 may include one or more airflow detection sensors, such as, for example, pressure sensors or hot wire anemometers, that detect airflow generated by the blade 14. To enhance the airflow from the blade 14, the blade 14 may comprise a number of off-center holes therethrough (i.e., holes that are not in the center of the blade and that are not used for the blade shaft). The sensors 401 may detect the airflow generated by the blade teeth and/or the holes in the blade. The processor 402 may be programmed to detect conditions based on the output signals from the sensors 401, such as whether the blade 14 is spinning or not. If the blade 14 is spinning, the blade-generated airflow sensing system 400 may signal the reaction system 32 to remain armed. If the blade-generated airflow sensing system 400 determines that the blade 14 is not spinning, it may signal the reaction system 32 to disarm. Again, the processor 302 may detect whether the blade is spinning by comparing the signals from the airflow sensors 401 to a database of signature waveforms that are indicative of whether the blade is spinning or not.

In another embodiment, one or more vibration sensors (e.g., accelerometers) may be used to detect whether the blade is spinning. Such vibration sensor may be mounted to the saw 10 in a position relative to the blade so that they vibrate in a detectable manner when the blade spins.

In another embodiment, as shown in FIGS. 5A-B, one or more magnets 502 may be embedded in or placed on the exterior of the blade 14. In addition, an inductor 504 may be positioned near the blade 14, such as in the tabletop 12 or under the tabletop 12. As the blade 14 spins, the spinning magnets 502 will induce a voltage across the inductor 504. The level of the voltage across the inductor 504 may be used to control whether the reaction system 32 is armed or not. For example, the inductor voltage may be coupled to a control circuit 505 (analog or digital) that controls whether the reaction system 32 is armed based on the inductor voltage. If the inductor voltage level exceeds a threshold level, the reaction system 32 may be armed. If the inductor voltage level does not exceed the threshold level, the reaction system 32 may be disarmed.

In another embodiment, the inductor voltage may directly power the detection system 30 and/or the reaction system 32 with a power converter (not shown) that converts the inductor voltage to input voltage for the detection system 30 and/or the reaction system 32. That way, the detection system 30 and/or the reaction system 32 are only powered on so long as the blade 14 is spinning. In such embodiments, the detection system 30 and/or the reaction system 32 may comprise their own, respective, energy storage device to maintain sufficient continuous power levels.

Figure 6:
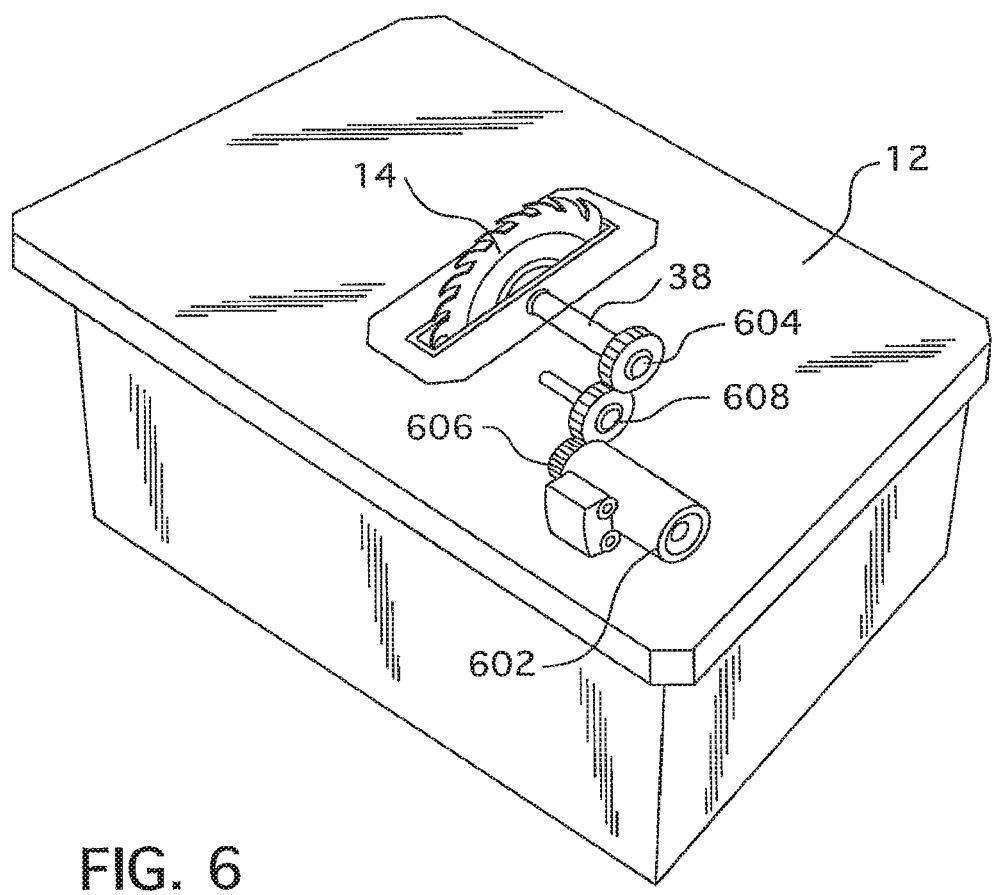
FIG. 6 is a diagram of a table saw with an electric generator according to various embodiments of the present invention.

In another embodiment, as shown in FIG. 6, an electric generator 602 may be positioned under the tabletop 12 and mechanically powered by the spinning blade 14. The generator 602 may convert this mechanical energy to electricity, which may be used to power the detection system 30 and/or reaction system 32. As shown in the embodiment of FIG. 6, the arbor 38 may include a gear 604, which is geared into a gear 606 for the generator 602. As shown in FIG. 6, there may be one or more intermediary gears 608 between the arbor 38 and the generator 602. When the arbor rotates the armature of the generator 602 is rotated (via the gears 604-608) to thereby generate electricity. The electricity generated by the generator 602 may be used to electrically power the detection system 30 and/or the reaction system 32. By using such a generator 602, the detection system 30 and/or reaction system 32 would be powered when the blade 14 is spinning. That way, the detection system 30 and/or reaction system 32 could be powered independently of the motor 40 used to spin the blade 14. As such, the detection system 30 and/or reaction system 32 could be powered even when the motor 40 used to rotate the blade 14 is turned off, as long as the blade/arbor is spinning. This would keep the detection system 30 and/or reaction system 32 enabled even when the power to the blade 14 is turned off. Also, the detection system 30 and/or reaction system 32 would not be enabled when maintenance is being performed on the saw 10 and/or blade 14, as the blade/arbor would not be spinning in such a mode. In other embodiments, the generator 602 may not be geared to the arbor, but may use a drive belt or some other drive mechanism to drive the generator 602 when the arbor rotates.

Figure 7:
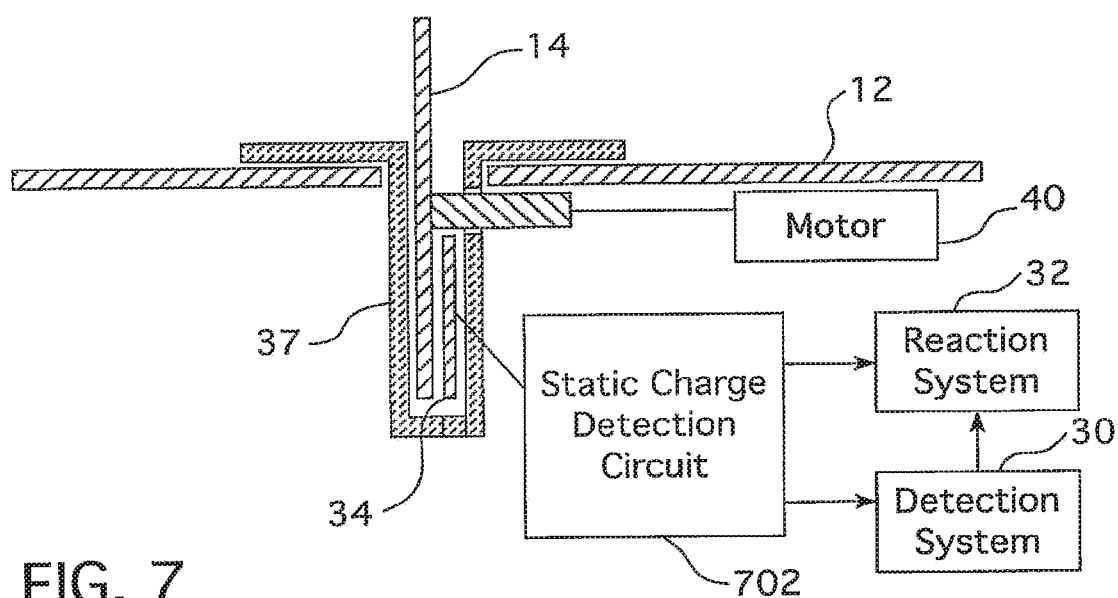
FIG. 7 is a block diagram of a table saw with a static charge detection circuit according to various embodiments of the present invention.

In another embodiment, as shown in FIG. 7, the static electricity that accumulates on the blade 14 may be used to detect a spinning condition for the blade 14. The static electricity build-up on the blade may also be used to detect contact between the blade 14 and foreign objects. As shown in the embodiment of FIG. 7, a static charge detection circuit 702 may be coupled to, and receive as an input a signal from, the excitation plate 34 that is capacitively coupled to the blade 14. As the blade 14 spins, static charge is generated and accumulated on the blade 14. The static charge detection circuit 702 may monitor the static charge on the blade 14, via the excitation plate 34, to detect various conditions pertaining to the blade 14. For example, as the blade 14 slows down, the static charge decreases. The static charge detection circuit 702 may interpret the decrease in the static charge as an indication that the blade 14 is slowing down. Similarly, by monitoring the static charge on the blade 14, the static charge detection circuit 702 can detect when the blade 14 stops spinning. The detection system 30 and/or reaction system 32 may be enabled (e.g., powered on) based on the determination by the static charge detection circuit 702 of whether the blade 14 is still spinning. For example, the static charge detection circuit 702 may be in communication with a controller circuit (not shown) that outputs control signals to arm or disarm the detection and/or reaction systems based on the output from the static charge detection circuit 702 regarding the static charge build-up on the blade 14. In addition, as contact between the blade 14 and foreign objects (such as the material to be cut by the blade) will affect the static charge on the blade 14, the static charge detection circuit 702 can be used to detect contact between the blade 14 and a foreign object. The detection system 30 may use this information from the static charge detection circuit 702 to determine whether there exists a dangerous condition that warrants triggering of the reaction system 32. The static charge detection circuit 702 may be implemented with analog circuitry, and may also include digital circuitry in various implementations.

Figure 8A:
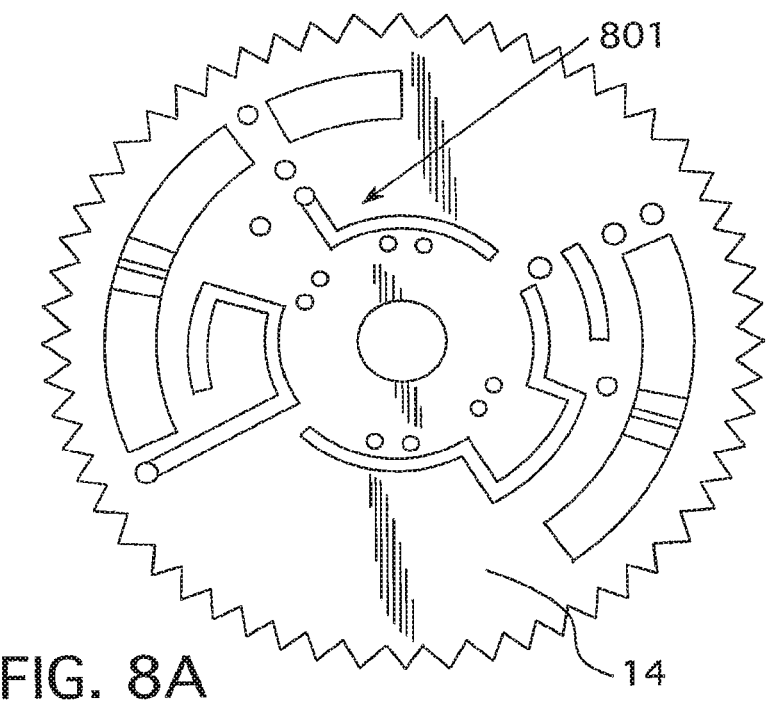
FIGS. 8A and 8B are diagrams illustrating a table saw blade with passive electronic components according to various embodiments of the present invention.
Figure 8B:
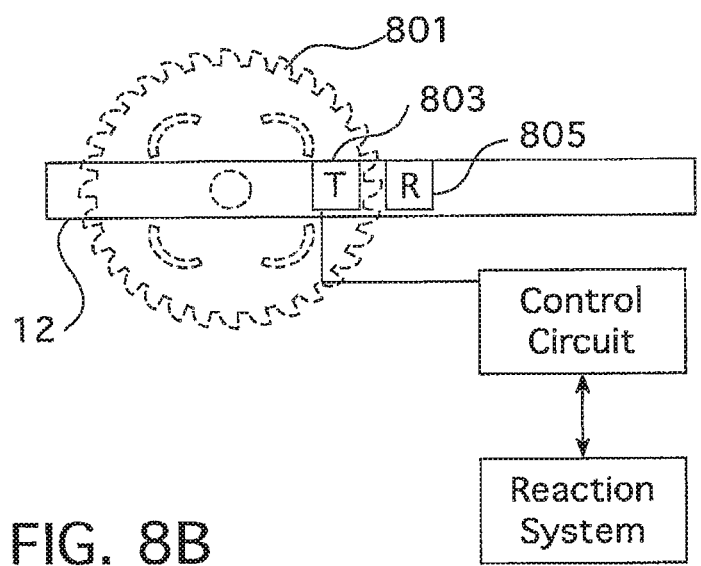

In another embodiment, as shown in FIGS. 8A-B, the blade 14 may comprise one or more embedded passive electronic components or circuits 801. The passive circuit components 801 may be embedded in or positioned on one or both of the sides of the blade 14. In one embodiment, the electronic component 801 may be powered passively by incoming radio frequency signals from a transmitter 803 near the blade 14, such as embedded in the tabletop 12, under the tabletop 12, etc. The emitted signals from the transmitter 803 may be at a relatively low power so that the passive circuit components 801 are only passively powered when the circuits 801 rotate past the transmitter 803. In one embodiment, the electronic component 801 may comprise a burst RF circuit that, when energized passively, emits a burst RF signal to a receiver 805, that may, like the transmitter 803, be near the blade 14. The output signal from the circuit component 801 may indicate that the RF circuit 801 is "on" due to the fact that the RF circuit is powered due to the fact that the blade 14 is spinning. Based on the signal received from the RF circuit 801, the receiver 805 may output a signal to the detection system 30 and/or the reaction system 32 to remain enabled. In addition, the receiver 805 may be able to determine the speed of the rotating blade 14 based on the number of burst signals received per time period (e.g., minute or second). That way, the receiver 805 can detect whether the blade 14 is speeding up or slowing down. In other embodiments, the circuit 801 may comprise a passively powered accelerometer or other motion sensor, with a transmitter (e.g., an RF transmitter) for transmitting sensor data to the receiver 805. That way, based on the sensor data, the receiver 805 may determine whether the blade 14 is spinning or not.

Figure 9:
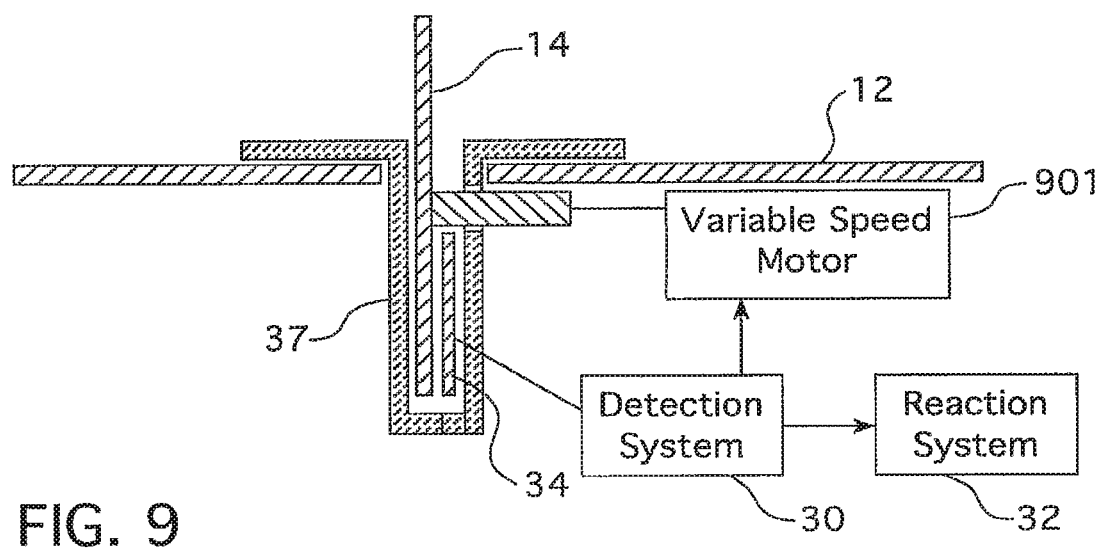
FIG. 9 is a block diagram of a table saw with a variable speed motor according to various embodiments of the present invention.

In another embodiment, as shown in FIG. 9, the saw 10 may include a variable speed motor 901 for powering the blade 14. In such an embodiment, when the detection system 30 detects a condition that approaches the threshold level that triggers the reaction system 32, the detection system 30 may output a signal to the variable speed motor 901 to reduce the speed of the motor 901, to thereby reduce the rate at which the blade 14 is spinning. That way, the motor speed may be at a reduced level if and when the reaction system 32 is triggered. In such an embodiment, therefore, the detection system 30 may have at least two trigger levels: a first trigger level that causes the motor speed of the variable speed motor 901 to reduce and a second trigger level that triggers the reaction system 32. The second trigger may be dropping or braking the blade 14, or some other mitigating reaction as described herein. Some time after the condition returns below the first trigger level, the motor 901 may be returned to full speed. The detection system 30 may be a proximity-based or contact-based detection system. An advantage of using a variable speed motor 901 is that the speed of the motor may provide feedback to the user regarding potentially dangerous conditions. For example, the reduction in motor speed may provide the user with advanced warning of a dangerous condition, and the user could react to the advanced warning, to thereby potentially avoid the mitigating reaction of the reaction system 32.

Figure 10A:
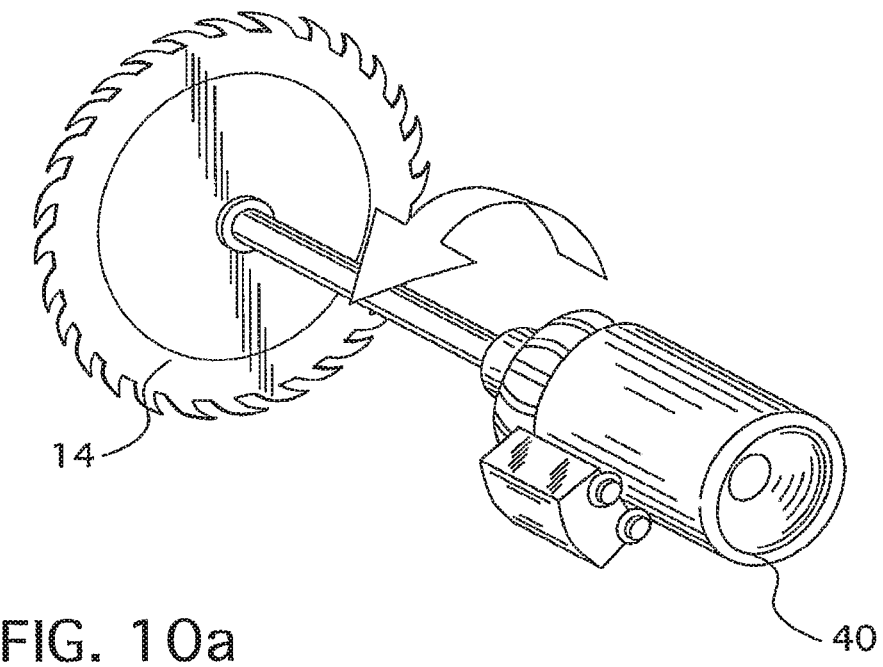
FIGS. 10A and 10B are diagrams illustrating a table saw blade connected to a motor.
Figure 10B:
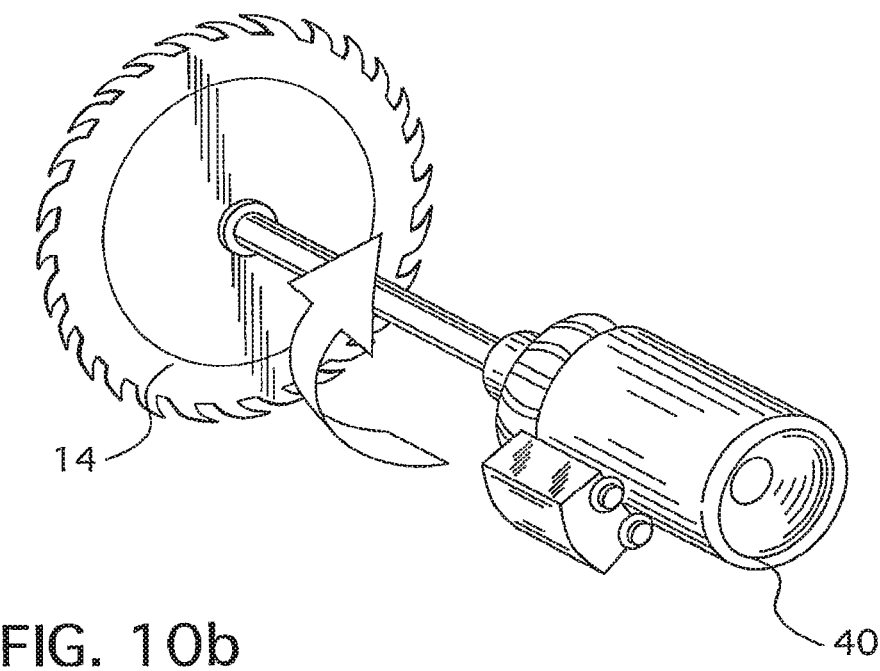

In another embodiment, as shown in FIGS. 10A and 10B, when a dangerous condition is detected, the detection system 30 may output a signal to change, or reverse, the direction of the motor 40. Such a mitigating reaction to a detected dangerous condition may be combined with other reaction systems 32, such as a braking reaction system (see, e.g. U.S. Pat. No. 6,920,814, which is incorporated herein by reference in its entirety), a drop mechanism (see, e.g., U.S. patent application Ser. No. 11/589,344, which is incorporated herein in its entirety), or other types of reaction systems, such as described herein. In particular, for a drop reaction system, the change in angular momentum of the blade 14 due to the change in motor direction could be leveraged to increase the rate at which the blade 14 drops beneath the tabletop 12.

Figure 11:
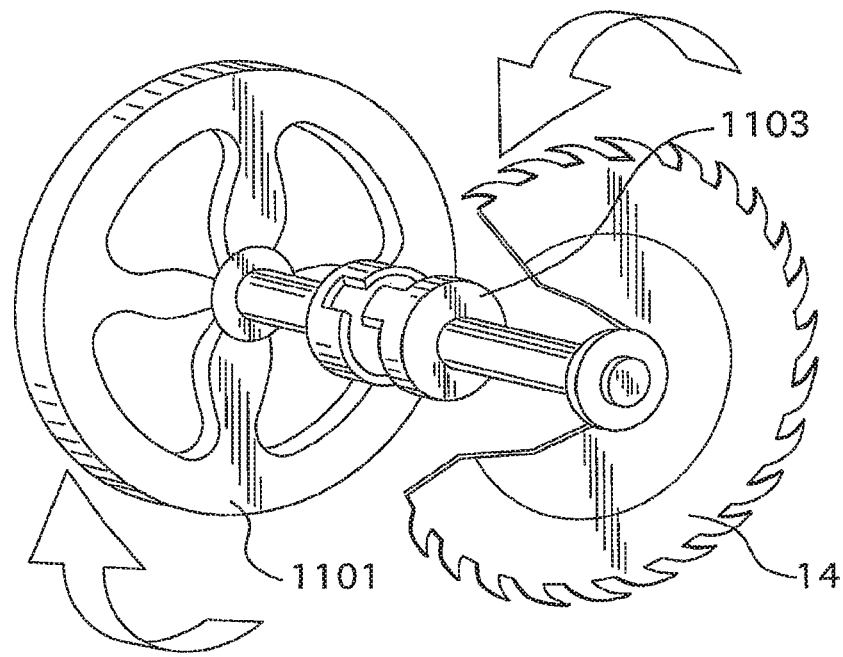
FIG. 11 is a diagram illustrating a table saw with a counter-rotating flywheel according to various embodiments of the present invention.

As another type of reaction system, as shown in FIG. 11, the saw 10 may comprise a counter-rotating flywheel 1101, which may rotate in a direction opposite the rotational direction of the blade 14. When the dangerous condition is detected by the detection system 30, the reaction system 32 may cause a clutch 1103 to engage the flywheel 1101 with the drive for the blade 14. Preferably, the flywheel 1101 has a mass and speed such that the angular momentum of the flywheel is equal to the angular momentum of the blade 14. That way, the stored energy of the flywheel 1101 may stop the blade 14 from spinning when the clutch 1103 is engaged. If the angular momentum of the flywheel 1101 is greater than the angular momentum of the blade 14, the blade 14 may reverse direction when the clutch 1103 is engaged. In such an embodiment, a blade-braking system may be used to stop the blade 14 from reverse spinning. If the angular momentum of the flywheel 1101 is less than the angular momentum of the blade 14, the blade 14 may slow down when the clutch 1103 is engaged. Similarly, a blade-braking system may be used in such an embodiment to completely stop the blade 14 from spinning. In one embodiment, the motor 40 may power both the blade 14 and the flywheel 1101, with a transmission being used to provide the reverse rotational direction for the flywheel 1101. In another embodiment, a second motor may be used to power the flywheel 1101. The flywheel 1101 may be located below the tabletop 12.

Figure 12:
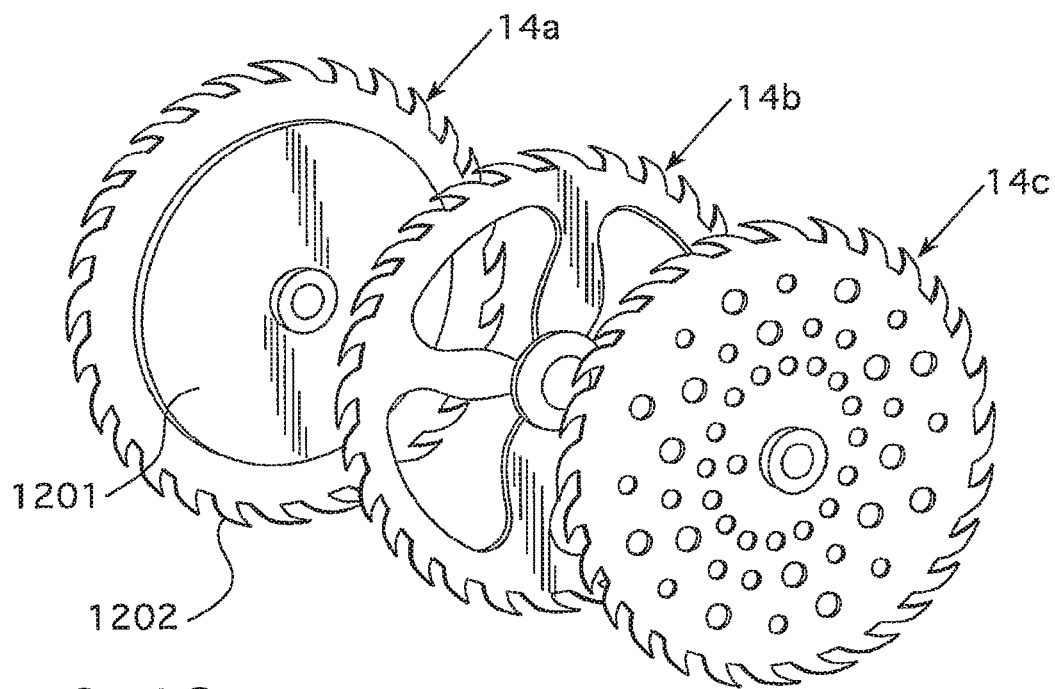
FIG. 12 is a diagram illustrating a table saw blade comprising multiple pieces with different masses according to various embodiments of the present invention.

In another embodiment, the blade 14 may be made out of less massive materials and/or the blade 14 may have a geometry that lessens the mass of the blade 14 (while still providing sufficient structural strength). Using a less massive blade reduces the stored energy in the blade when spinning, thus allowing the lightweight blade to be stopped or braked faster in response to the detection of a dangerous condition. FIG. 12 shows three such exemplary blades 14*a-c*. In the first embodiment, the blade 14*a* comprises an interior portion 1201 and a peripheral portion 1202. The interior portion 1201 may be made from a material that is less dense than the peripheral portion 1202, yet still sufficiently strong and durable. For example, the interior portion 1201 may comprise lightweight, strong metals, such as magnesium or titanium, or composite materials. Suitable composite materials include, but are not limited to, fiber reinforced polymers, carbon-fiber reinforced plastic, glass reinforced plastic, metal matrix composites, ceramic matrix composites, organic matrix/ceramic aggregate composites, thermoplastic composite materials, or any other suitable composite material. In addition, other lightweight, strong materials could be used. The peripheral portion 1202 of the blade 14 may comprise, for example, conventional blade materials, such as steel, and the material of the peripheral portion 1202 may be more dense than the interior portion 1201.

In other embodiments, the blade may comprise one or more off-center holes or openings, as shown in blades 14*b-c*, to reduce the mass of the blade. The holes/openings 1207 shown in the example blades 14*b-c* are off-center in the sense that they are not the blade center-hole through which the blade 14 is mounted to its rotatable shaft. In addition, the teeth of the blades 14*a-c* could comprise less massive materials, such as carbide, titanium, aluminum, composite plastics, etc. Blades of the type shown in FIG. 12 may be used in saws having an airflow-based blade-spin detection system 400 (See FIG. 4).

Figure 13:
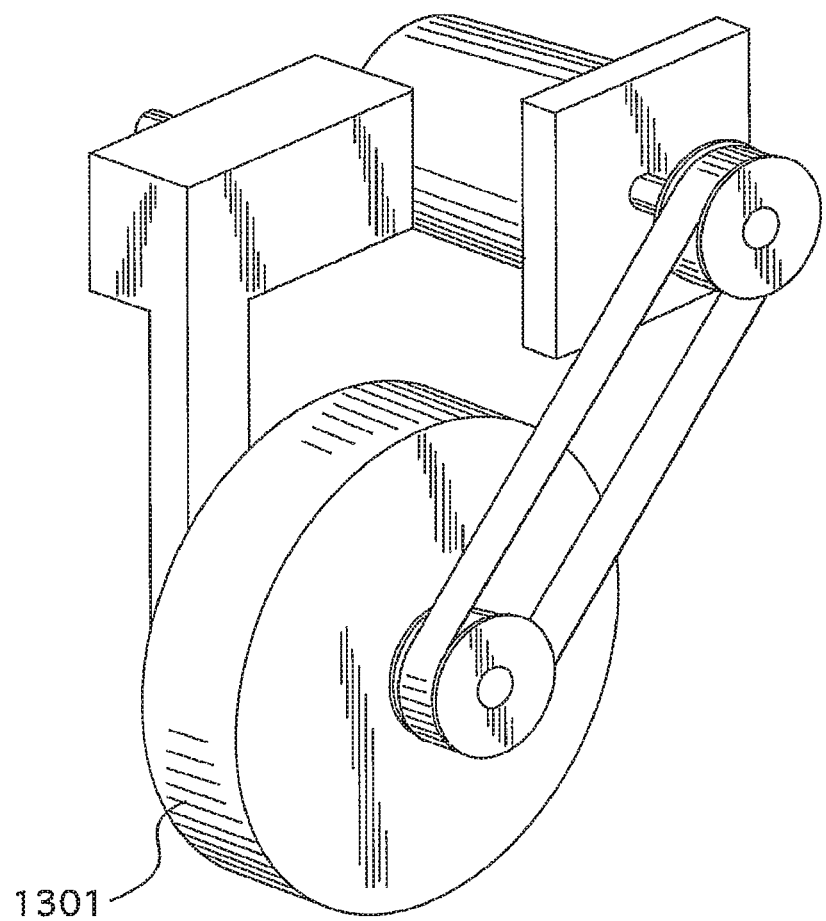
FIG. 13 is a diagram of a high-mass flywheel according to various embodiments of the present invention.

In embodiments using a low mass blade, such as described above, the low mass blade may be coupled to a high-mass flywheel 1301, as shown in FIG. 13. The high-mass flywheel 1301 may provide added momentum to the blade 14 to aid in cutting workpieces. When a dangerous condition is detected, the reaction system 32 may disengage a clutch that couples the flywheel 1301 to the blade drive. That way, the reaction system 32 can more easily stop, drop, or otherwise react the lightweight blade, and not have to additionally stop the high-mass flywheel 1301.

Figure 14:
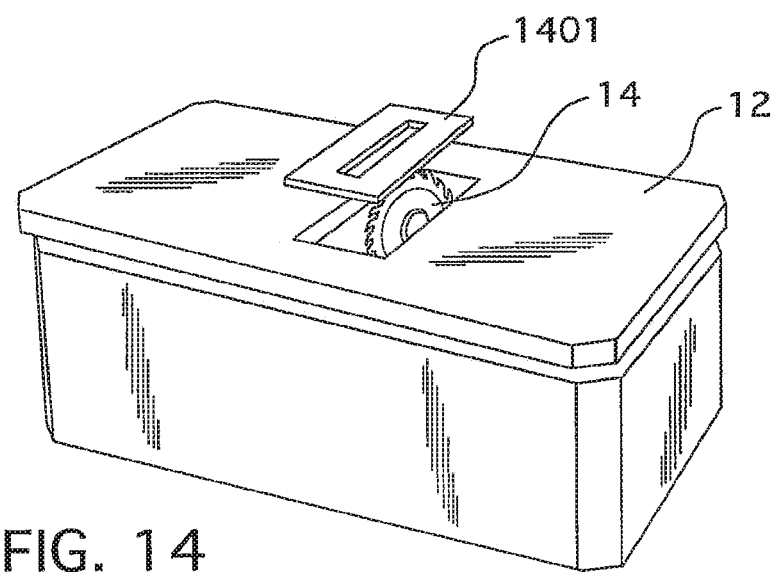
FIG. 14 is a diagram of a table saw with a moveable throat plate according to various embodiments of the present invention.

In another embodiment, as shown in FIG. 14, once a dangerous condition is detected, the reaction system 32 may cause a throat plate 1401, positioned around the blade 14 on the tabletop 12, to pop up. In such an embodiment, the throat plate 1401 may be caused to pop up by a number of suitable actuators under the throat plate 1401 that are actuated when the dangerous condition is detected, such as for example: pyrotechnic actuators; springs; solenoids; hydraulic actuators; pneumatic actuators; etc. By popping up, the throat plate 1401 may create a guard around the blade 14 and/or knock foreign objects out of the vicinity of the blade 14. The throat plate 1401 may be made from a thin piece of metal (e.g., steel or aluminum), wood, or plastic, for example. As such, it may take less energy to cause the throat plate 1401 to pop up than it might take to employ other types of reaction systems. In addition, the pop-up throat plate 1401 could be combined with other reaction systems, such as braking reaction systems or blade-drop reaction systems. In addition, according to various embodiments, one side of the throat plate 1401, such as the side at the back of the blade 14, may be pivotably connected to the tabletop 12. In such an embodiment, when the dangerous condition is detected, the other end (e.g., the front end or a side) of the throat plate 1401 may be popped up by the actuators causing the throat plate 1401 to rotate into the blade 14 and jam the blade 14, potentially making it stop spinning.

Figure 15:
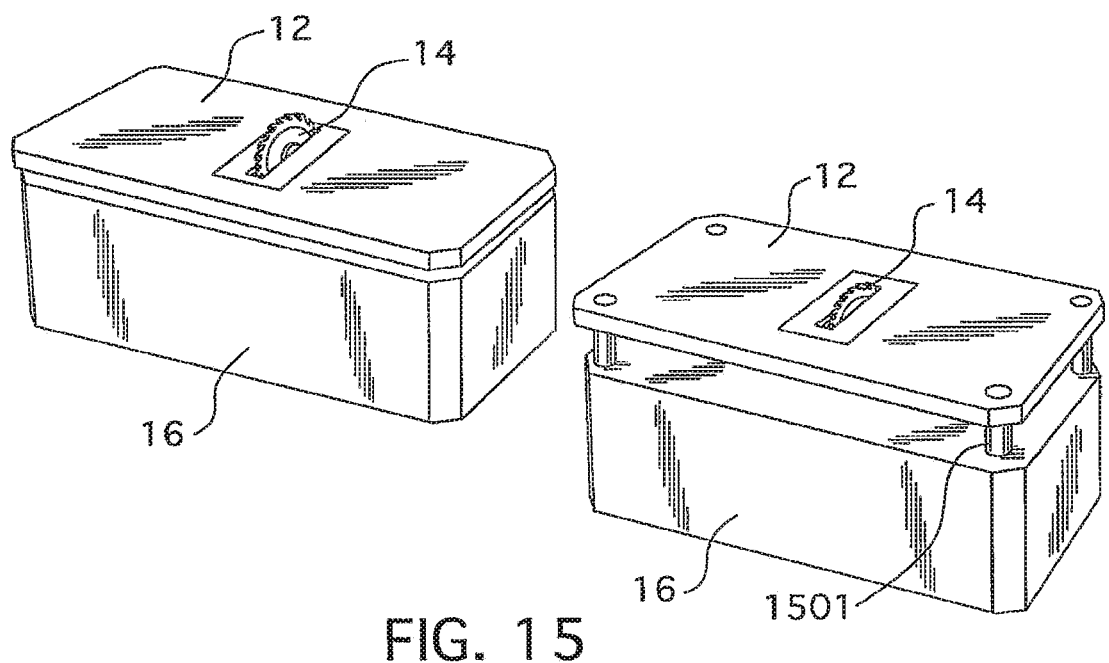
FIG. 15 is a diagram of a table saw with a tabletop that pops up according to various embodiments of the present invention.

In another embodiment, as shown in FIG. 15, when a dangerous condition is detected by the detection system 30, the tabletop 12 may pop up. Preferably, the tabletop 12 may be lifted or popped up to an elevation level that is the same as, close to, or greater than the elevation level of the top of the blade 14. That way, the tabletop 12 can remove objects from around the vicinity of the exposed blade 14. In one embodiment, the tabletop 12 may be actuated, for example, by pyrotechnic charges in response to detection of the dangerous condition by the detection system 30, although other suitable actuation means may be used, such as pneumatic actuators, hydraulic actuators, magnetic actuators (e.g., solenoids), etc. Preferably, the tabletop 12 is moveably connected to the remainder of the base 16 of the table saw 10 by connectors 1501 that prevent the tabletop 12 from coming loose from the base 16 when the tabletop is elevated in response to detection of a dangerous condition.

The number of actuators will depend on, among other things, the force supplied by each actuator, their placement, and the mass/size of the tabletop 12. In one embodiment, actuators are placed in each corner of the tabletop 12, near the connectors 1501. In other embodiments, the actuators are located in two corners of the tabletop 12, so that the tabletop 12 effectively hinges upward when the dangerous condition is detected. The pop-up tabletop 12 could be combined with other reaction systems, such as a dropping blade. Also, the pop-up tabletop 12 preferably is combined with a guard system that prevents the workpiece from flying away when the tabletop 12 pops up.

Figure 16:
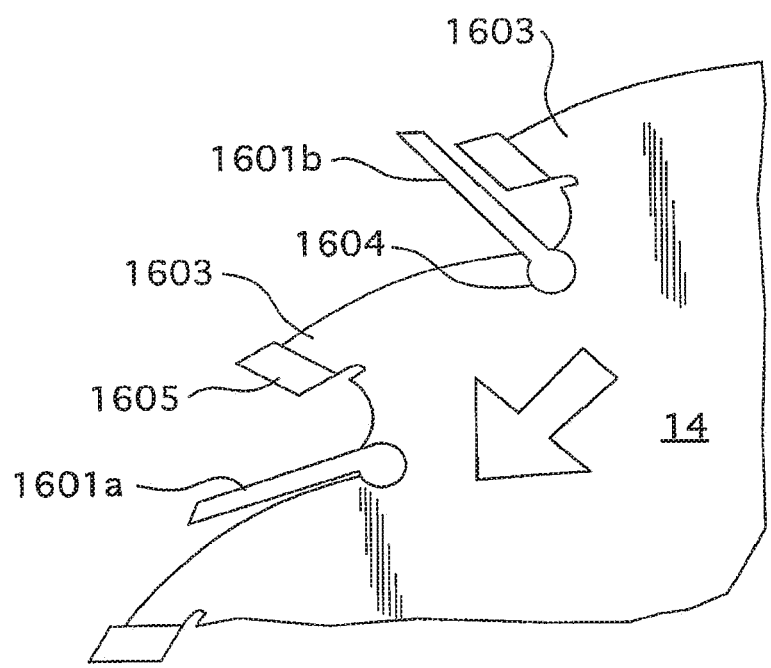
FIG. 16 is a diagram of a table saw blade with elongate, moveable members according to various embodiments of the present invention.

In another embodiment, the reaction system 32 may cause the geometry of the blade 14 to change in response to detection of a dangerous condition by the detection system 30. As shown in the example of FIG. 16, the blade 14 may comprise an elongate, moveable member 1601 between each tooth 1603 of the blade 14. The members 1601 may be connected at a pivot point 1604 to the blade 14, such that the members 1601 have one free end and one fixed, or pivoting, end. In normal operating conditions, the moveable member may be in the normal or stored position, as shown by moveable member 1601*a* in FIG. 16. In this position, the member 1601*a* is tucked behind the tooth 1603 in front of it so that the moveable member 1601 does not interfere with the cutting operation. When the dangerous condition is detected, the moveable member may transition to the deployed position, as shown by moveable member 1601*b* in FIG. 16. As can be seen in FIG. 16, the deployed moveable member 1601*b* may pivot about the pivot point 1604 to extend in front of, and preferably beyond, the cutting member 1605 of the tooth 1603 when deployed. That way, the deployed moveable member 1601*b* will reduce the impact of the cutting member 1605 relative to the object being cut by the blade 14.

In various embodiments, the moveable members 1601 may comprise a magnetic material or a shape memory material (or alloy). For an embodiment using magnetic moveable members 1601, when the dangerous condition is detected, the reaction system 32 may apply a magnetic field in the vicinity of the blade 14 to cause the magnetic moveable members 1601 to deploy. In an embodiment employing shape memory material moveable members 1601, the reaction system 32 may activate the shape memory moveable members 1601, such as through heat or electrical current, for example, to cause the moveable members 1601 to deploy. In other embodiments, the moveable members 1601 may have other actuating means, such as pyrotechnic charges, etc.

Figure 17:
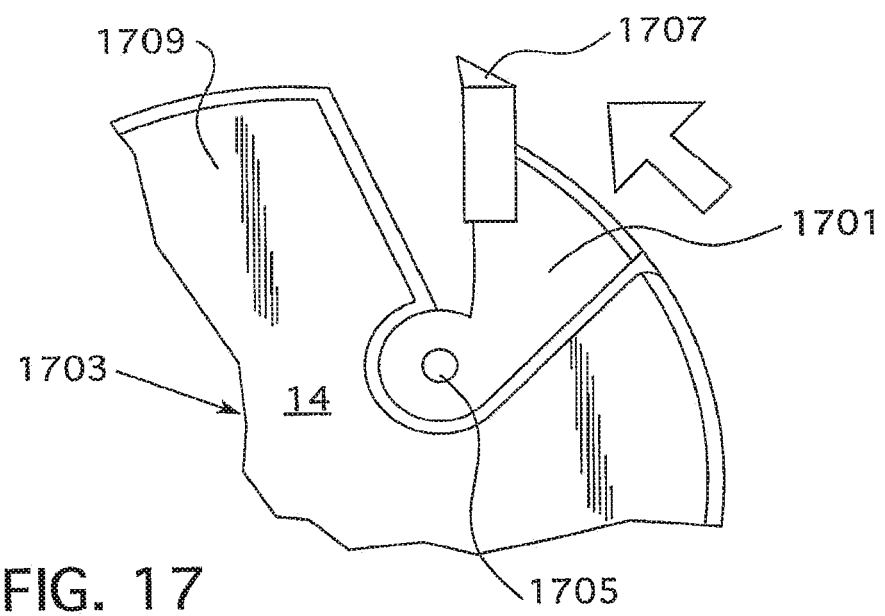
FIG. 17 is a diagram of a table saw blade with pivoting teeth members according to various embodiments of the present invention.

In another embodiment, as shown in FIG. 17, the blade 14 may comprise pivoting teeth members 1701. In such an embodiment, the pivoting teeth members 1701 may be connected to the blade interior 1703 at a pivot 1705. FIG. 17 shows a pivoting tooth member 1701 in the open or normal position. In this position, the cutting instrument 1707 on the tooth member 1701 can cut effectively a workpiece being fed to the blade 14. When a dangerous condition is detected, the pivoting tooth member 1701 pivots forward, counter-clockwise in FIG. 17, so that the cutting instrument 1707 is shielded completely or partially by the blade peripheral portion 1709 in front of the pivoting tooth member 1701. In this embodiment, therefore, the pivoting tooth member 1701 rotates in the direction that the blade 14 is spinning. In other embodiments, the pivoting teeth members 1701 could be configured to pivot or rotate in the direction opposite the direction of rotation of the blade 14.

The pivoting teeth members 1701 may be actuated by an electrical circuit, a pyrotechnic charge, or any other suitable means. In addition, in an embodiment where the blade 14 is braked, the stored rotational energy of the blade 14 may be sufficient to actuate the pivoting teeth members 1701. In any event, the pivoting teeth members 1701 preferably may be combined with another type of reaction system to mitigate the danger of the spinning blade 14, even if the teeth have retracted to a less dangerous position. For example, a blade braking system or a blade drop mechanism may also be employed.

Figure 18:
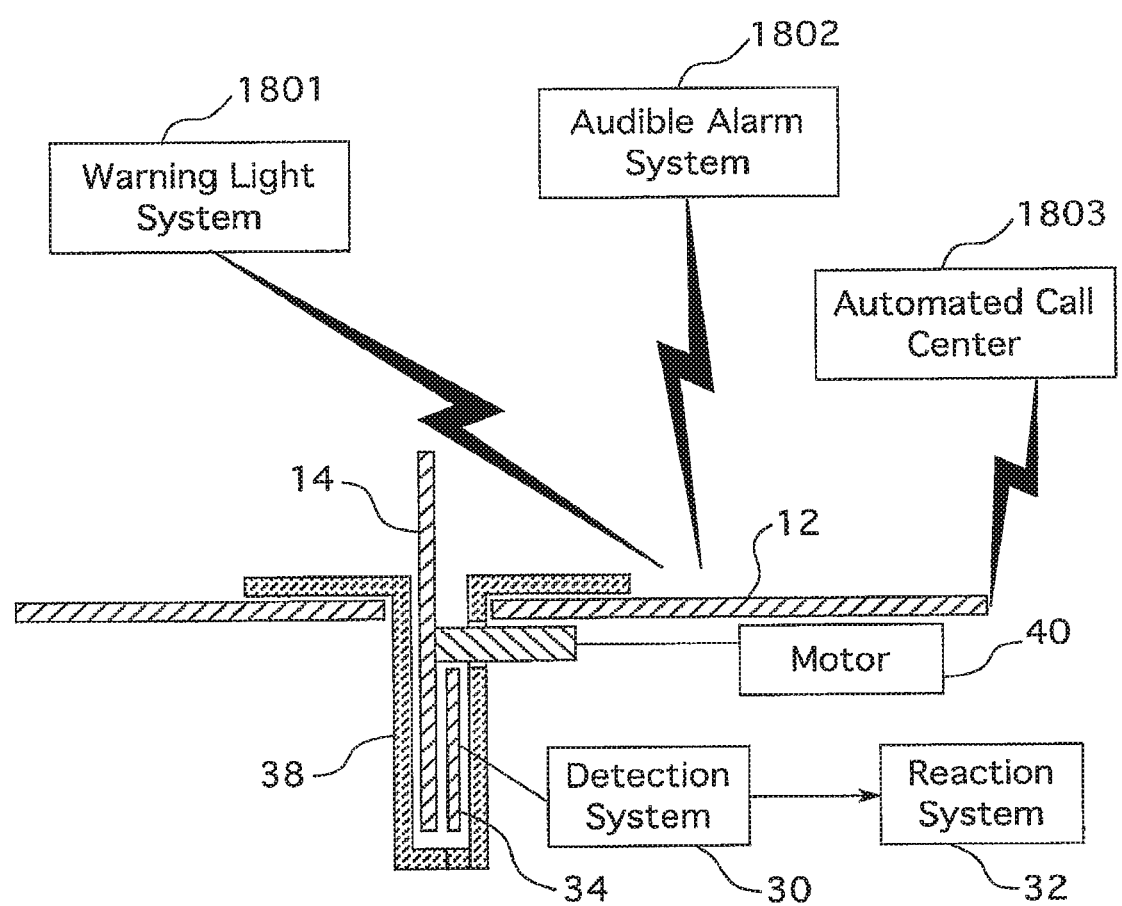
FIG. 18 is a block diagram of a table saw with remote warning systems according to various embodiments of the present invention.

In another embodiment, as shown in FIG. 18, the reaction system 32 may activate one or more visual and/or audible alarm systems when a dangerous condition is detected by the detection system 30. For example, the reaction system 32 may be in communication, via wired and/or wireless data links, to the alarm system(s). Example alarm systems may comprise warning light systems 1801 and audible alarm systems 1802 that are in the building where the table saw 10 is located and/or in the table saw 10 itself. The audible alarm system 1802 may comprise a speaker. The warning light system 1801 may comprise one or more illumination devices, such as LEDs or lamps. Where wireless data links are used, the data links between the reaction system 32 and the alarm systems 1801, 1802 may be, for example, rf or infrared data links. In one embodiment, the reaction system 32 may communicate with the alarm systems 1801, 1802 using, for example, Powerline communication (PLC), Wi-Fi, Ethernet, or some other suitable communication standard. In addition, the reaction system 32 may be in communication with an automated call center 1803, which may place an automated call when the dangerous condition is detected. For example, the automated call center may place an automated call to an emergency response center (i.e., 9-1-1), relevant supervisors, or employees of the shop where the power tool 10 is located, etc. In addition, automatic text messages, e-mails, instant messages, etc. may be placed to supervisors, etc. when the dangerous condition is detected, according to various embodiments.

Figure 19A:
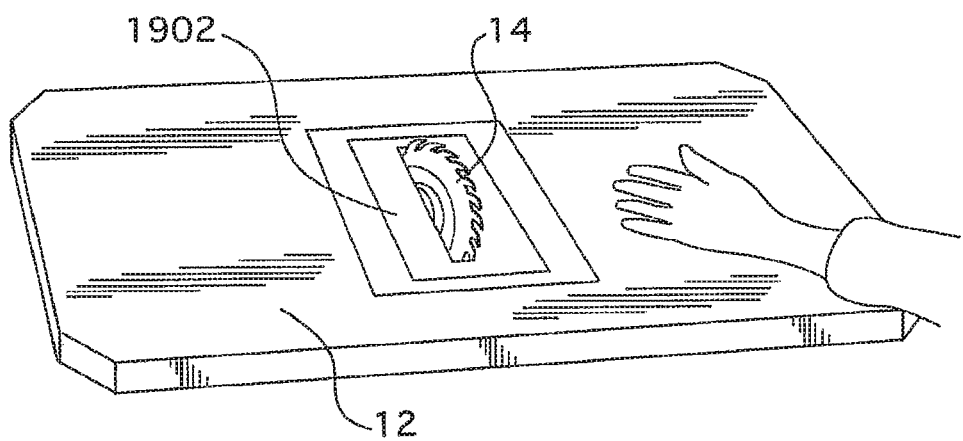
FIGS. 19A and 19B are diagrams illustrating a table saw blade with a reaction system that uses an air bag according to various embodiments of the present invention.
Figure 19B:
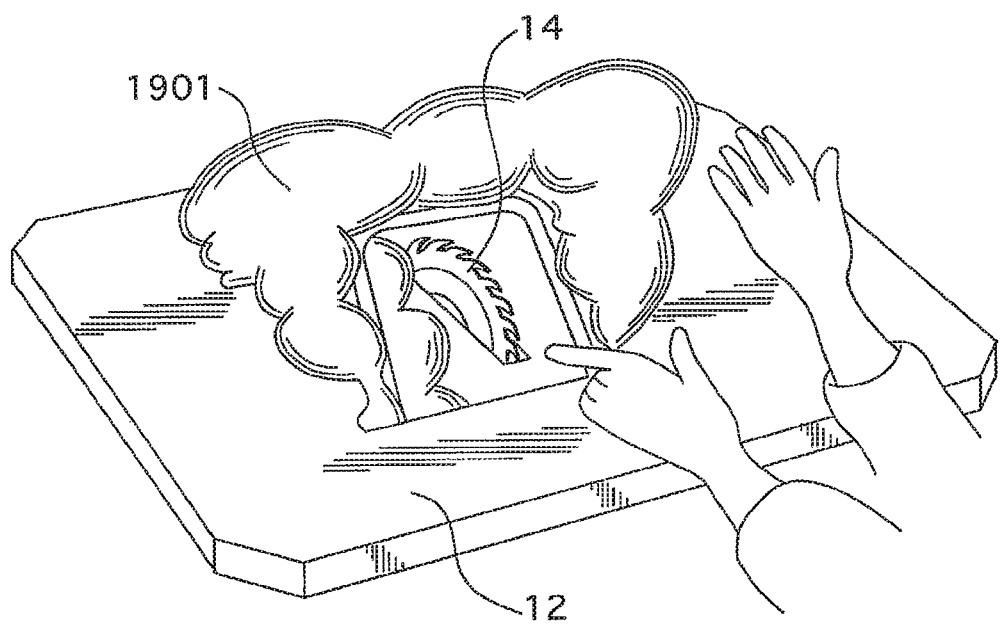

In another embodiment, the reaction system 32 may comprise an air bag 1901, as shown in FIGS. 19A-B. In one embodiment, the air bag, when it is in a non-deployed condition, may be stored in or under the throat plate 1902 that surrounds the blade 14 on the tabletop 12. When the dangerous condition is detected, the reaction system 32 may actuate the air bag 1901, as shown in FIG. 19B. The air bag 1901 may be inflated using, for example, a solid propellant that burns extremely rapidly to create a large volume of gas to inflate the bag 1901, much like an air bag in automobiles. In other embodiments, a canister of compressed gas may be used to inflate the air bag 1901 in response to detection of the dangerous condition. Activation of the air bag 1901 in response to detection of the dangerous condition may cause objects that are in the vicinity of the blade 14 to be knocked away from the blade 14. In addition or alternatively, an air bag could be positioned under the tabletop 12 at the side of the table saw 10 where an operator normally stands to operate the table saw 10. When activated in response to detection of the dangerous condition, such an air bag may push the operator away from the tabletop 12 and the blade 14. In addition or alternatively, the operator may wear an air bag, such as on a bracelet or belt, that is activated by the reaction system 32. In such embodiments, the wearable air bag may have a wired or wireless connection to the reaction system 32. Deployment of such a wearable air bag may knock the operator and attached extremities thereof away from the tabletop 12 and/or blade 14.

Figure 20:
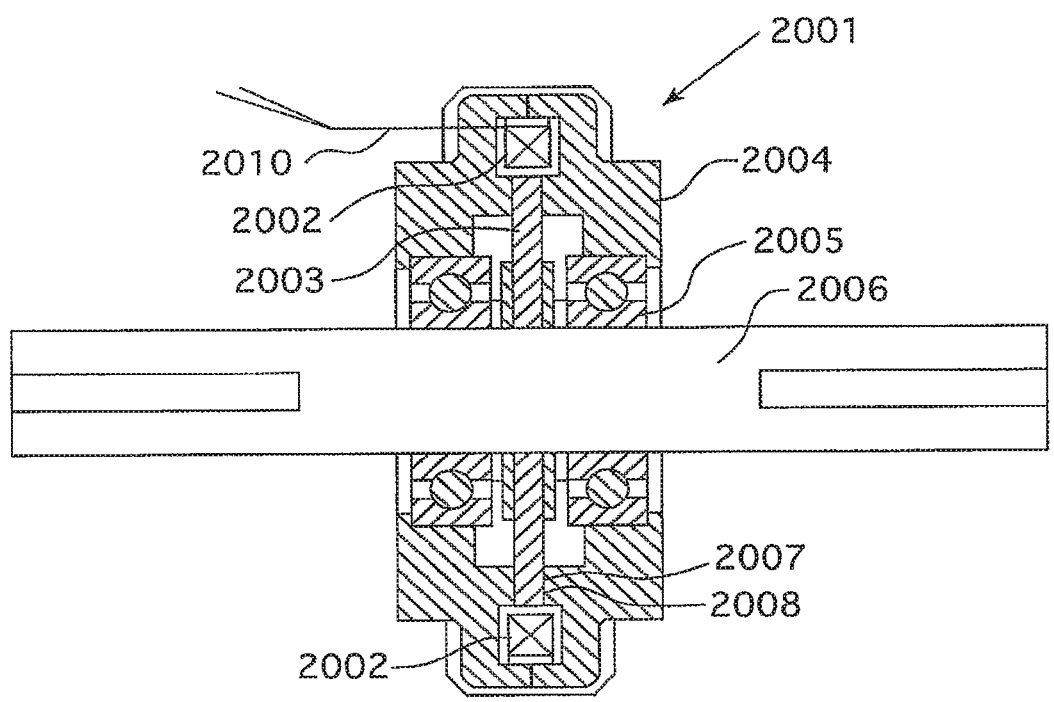
FIG. 20 is a block diagram of a magnetorheological brake for a table saw according to various embodiments of the present invention.

In another embodiment, as shown in FIG. 20, the reaction system 32 may comprise a magnetorheological (MR) rotary brake 2001 to brake the blade 14 in response to detection of a dangerous condition by the detection system 30. The MR rotary brake 2001, as shown in FIG. 20, may comprise a rotor 2003 fixed to the shaft 2006 that rotates the blade (not shown). The shaft 2006 is placed in a bearing 2005 and can rotate in relation to a housing 2004 for the MR rotary brake 2001. Wires 2010 are connected, and supply electrical current, to a coil 2002. Between the rotor 2003 and the housing 2004 there may be a spacing 2007 that is filled with MR fluid 2008. The MR fluid 2008 in the gap or spacing is physically near the coil 2002 such that when the coil 2002 is energized by electrical current from the wire 2010, in response to detection of a dangerous condition, the magnetic field from the coil 2002 causes the MR fluid to greatly increase its apparent viscosity to the point of becoming a viscoelastic solid, thereby braking the rotor 2003, which brakes the shaft 2006, which brakes the blade 14 (not shown) connected to the shaft 2006. That is, for example, when a dangerous condition is detected by the detection system 30, the detection system 30 may output a control signal to a current supply connected to the coil 2002. In response to the control signal from the detection system 30, the current supply may be coupled to the coil 2002 to energize the coil 2002. Such a MR brake reaction system could be combined, for example, with a blade drop mechanism.

In other embodiments, a MR clutch could be used to disengage the blade drive mechanism. For example, in normal operating conditions, the MR fluid in the clutch could be energized by an electromagnetic field to create a friction lock to couple the drive mechanism to the blade. When a dangerous condition is detected, the electromagnetic field is removed, causing the MR fluid to convert to its fluid state, effectively disengaging the drive mechanism from the blade.

In various embodiments, the table saw 10 may have numerous operating modes, including "on," "off," and "maintenance." An operator of the table saw 10 may transition between the modes using switches, such as one three-state switch for each of the modes, or a plurality of switches that provide similar functionality. According to various embodiments, the table saw 10 may undergo automated procedures, as shown in FIG. 21A, when the table saw transitions to various modes. If the table saw 10 transitions to the Off mode (e.g., the operator flips the on/off switch to the off position), the table saw may take the following actions automatically: (i) the blade 14 retracts below the tabletop 12; (ii) the power to the motor 14 is cut; and (iii) the reaction system 32 is turned off. These steps may be performed in various orders, although preferably the reaction system 32 should be turned off last. If the table saw 10 transitions to the On mode, the table saw may take the following actions automatically: (i) the power to the motor 40 is turned on; (ii) the reaction system 32 is turned on; and (iii) the blade 14 is raised. Again, these steps may be performed in various orders, although preferably the reaction system 32 is turned on prior to the raising of the blade. A processor-based controller 2120, as shown in FIG. 21B, may control and initiate these automatic reactions. An automated, motorized blade height adjustment system 2122 may be used to raise and lower the blade height in such table saws. If the table saw 10 transitions to the maintenance mode, such as if the operator hits the "maintenance" button or switch 2124 in order to change the blade, for example, the reaction system 32 is turned off. Also, the controller 2120 may output a signal to the motor control circuit 2130 to turn the motor 40 on or off. Other convenience and safety features may be provided or monitored in the maintenance mode. For example, a sensor may detect whether the nut holding on the blade is over-torqued or not. Also, in the maintenance mode, the blade drive shaft may be automatically locked to aid in the blade removal process.

As an alternative to automated blade height adjustment system, side panels in the tabletop 12 may rise automatically to surround the blade 14 when the saw is turned off. Also, the throat plate 13 (see FIG. 1) could rise automatically to surround the blade when the saw is turned off.

FIG. 22 shows an embodiment of a system that may be used to stop the blade 14 when the saw 10 is turned off. As shown in FIG. 22, the system may include a clutch 2201 that couples the motor 40 to the blade shaft 2202. The illustrated embodiment shows a direct drive for the blade 14, although a belt drive or gear drive could be used to power the blade 14 as well. The system also includes a brake system 2204 that, when actuated at turn off of the saw 10, grips an interior portion of the blade 14 to stop the blade 14 from spinning, preferably in a manner that is not destructive to the blade 14. That way, when the saw 10 is turned off, the clutch 2201 may disengage the motor 40 from the blade 14, and the brake system 2204 may stop the blade 14 from spinning. Such an embodiment effectively eliminates the need to detect whether the blade 14 is still spinning after the motor 40 is cut in order to keep the reaction system 32 enabled because the blade 14 is braked by the brake system 2204 immediately at turn-off. Alternatively, some of the blade spin-down detection mechanisms described herein could be used to detect blade spin down to keep the reaction system 32 active and armed, although spin down detection techniques based on the motor 40 will not be effective in such an embodiment because the power to the motor is cut.

According to various embodiments, it may be desirable to know the conductivity of the wood or other workpiece being cut by the table saw and adjust detection systems accordingly. For example, in a capacitive detection system the baseline current and/or voltage drawn from the blade 14 during normal operations (e.g., when the blade is in contact with the workpiece, but not in contact with a foreign object) may depend on the conductivity of the workpiece. Some other types of detection systems may also utilize the conductivity of the workpiece to determine when the blade has come into contact with a foreign object.

FIG. 23 illustrates one embodiment of a table saw 10 having a conductivity sensor 2302 for measuring the conductivity of a workpiece to be cut by the blade 14. The conductivity sensor 2302 may provide to the detection system 30 a signal indicative of the conductivity of the workpiece being cut (or to be cut). The detection system 30 may comprise one or more processors for receiving and processing the signal from the sensor 2302. The detection system 30 may process the conductivity data from the sensor 2302 in determining whether a foreign object has come into contact with the blade 14. For example, if the workpiece has a high conductivity, its electrical behavior in contact with the blade may be closer to that of a human body part. Accordingly, the detection system 30 may adjust its sensitivity and/or disable capacitive foreign object sensing. For example, the saw 10 may instead use other foreign object sensing mechanisms including, for example, those discussed herein below. In addition, the detection system may provide an alert (e.g., a visual or audible alert) to the user that the workpiece has a high conductivity.

The conductivity sensor 2302 may be physically embodied as one or more sensors that may be placed at various locations on the saw 10. For example, FIG. 24 illustrates one embodiment of the table saw 10 with a trailing edge sensor assembly 2408. The blade 14 of the table saw 10 is shown in contact with a workpiece 2406, which may be moved across the table saw 10 in the direction indicated by arrow 2404. After being cut by the blade 14, the workpiece 2406 may contact the sensor assembly 2408. The sensor assembly 2408 may include any suitable type of sensor for measuring the conductivity of the workpiece 2406. For example, the sensor assembly 2408 may include one or more probes made of a conductive material positioned to contact the workpiece 2406 after it has been cut and fed past the blade 14. The probes may be used to cause a current to flow through the workpiece 2406. The voltage drop across the workpiece 2406 may then be used to determine its conductivity. Any suitable assembly may be used to bring the sensors into operational contact with the workpiece 2406. For example, as illustrated in FIG. 24, the sensor assembly 2408 may comprise a wheel 2410 positioned behind the blade 14. The wheel 2410 may be slightly narrower than the kerf of the blade 14, allowing the wheel 2410 to fit within the cut to the workpiece 2406 made by the blade 14. The wheel 2410 may comprise spikes (or probes) 2412 that protrude towards the workpiece 2406. As the wheel 2410 passes through the cut in the workpiece 2406, the spikes 2412 may come into contact with the portion of the workpiece 2406 that has just been cut by the blade 14. The spikes 2412 may be, or may comprise, sensor leads for measuring the conductivity of the workpiece 2406. Sensing the conductivity of the workpiece 2406 within a fresh cut may give a reading that is indicative of the interior of the workpiece 2406.

FIG. 25 illustrates another embodiment of the table saw 10 where the conductivity sensor 2302 comprises a leading edge conductivity sensor assembly 2504 positioned at the front or leading edge of the blade 14. No workpiece is shown in FIG. 25. In use, however, a workpiece would be moved towards the front or leading edge of the blade 14 in the direction of arrow 2507. The sensor assembly 2504 is illustrated upstream of the blade 14. The sensor assembly 2504 may comprise one or more spiked wheels 2506. The wheels 2506 may be configured to rotate about an axis parallel to the arbor 38 of the blade 14. The spikes on the wheels 2506 may come into contact with the workpiece before it contacts the blade 14. The spikes may be, or may comprise, leads for conductivity sensors for sensing the conductivity of the workpiece. In some embodiments, the spikes may be sharp, allowing them to slightly puncture the exterior of the workpiece and provide a conductivity reading from below the surface of the workpiece. According to various embodiments, one or more wheels 2506 on the table saw 10 may be adjustable along their axis of rotation. This may allow an operator of the table saw 10 to adjust the wheels 2506 based on a width of the workpiece.

FIG. 26 illustrates one embodiment of the table saw 10 where the sensor 2302 comprises a sensing table top surface 2604. The surface 2604 may comprise a metallic or other conductive material. When the surface 2604 is in contact with a workpiece (not shown), a current may be passed through the workpiece to measure its conductivity. According to various embodiments, an operator of the table saw 10 may place the workpiece on the surface 2604, allowing the saw 10 to measure the conductivity of the workpiece prior to or during a cut. FIG. 27 illustrates one embodiment of the table saw 10 where the sensor 2302 comprises a sensing surface 2704 that is less than all of its table top 2706. The sensing surface 2704 may be positioned upstream of a blade 14 as shown in FIG. 27, or in other embodiments it could be located at different locations of the tabletop including at a trailing edge of the blade 14. The sensing surface 2704 may operate according to principles similar to that of the surface 2604 described above. In use, a workpiece (not shown) may be brought into contact or proximity with the sensing surface either as the workpiece is pushed towards the blade 14 or before a cut is begun. This sensing surface 2704 may sense the conductivity of the workpiece and adjust the operation of the detection system 30 and/or the reaction system 32 accordingly. The sensing surface 2704 may be electrically insulated from the rest of the tabletop 12.

According to various embodiments, the conductivity sensor 2302 may comprise all or a portion of a blade 14 of the table saw 10. In embodiments that monitor changes in the blade capacitance to determine whether a foreign object is in contact with the blade, it may not be desirable to use the entire blade 14 to detect the conductivity of a workpiece. FIG. 28 illustrates one embodiment of a segmented blade 2802 that may be used both to detect the conductivity of a workpiece and to capacitively detect foreign objects in contact with the blade. The blade 2802 in such embodiments may comprise conductive sensing teeth 2804 and capacitive sensing teeth 2808 at different regions of the blade 14. Although the respective teeth 2804, 2808 are shown in contiguous sections in FIG. 28, it will be appreciated that they may be interspersed around the blade 2802 in any suitable pattern. The conductive sensing teeth 2804 and capacitive sensing teeth 2808 may be electrically insulated from one another and placed in a separate circuit paths.

In use, the capacitive sensing teeth 2808 may be used by the detection system 30 to determine whether a foreign object is in contact with the blade 2802. For example, the detection system 30 may monitor a change in an electrical signal applied to the capacitive sensing teeth 2808 due to a change in capacitance in the teeth 2808 caused by contact with a foreign object. The conductive sensing teeth 2804 may be used as a conductivity sensor, or a portion thereof. For example, all or part of each conductive sensing tooth 2804 may serve as a probe. An additional probe (not shown) may be otherwise placed in contact with the workpiece. For example, the operator may secure the additional probe to the workpiece. In various embodiments, the additional probe may be embedded in the saw's table top. Also, according to various embodiments, an adjacent or other nearby conductive sensing tooth 2804 may serve as the additional probe. In use, a current may be passed from the first conductive sensing tooth 2804, through the workpiece and through the second conductive sensing tooth 2804. The voltage drop in the signal may be indicative of the resistance and/or conductivity of the workpiece. Because the blade 2802 may measure the conductivity of material that it is in contact with, it may be used to detect contact between the blade and a foreign object. For example, if the blade 2802 senses a large increase in the conductivity of the materials in contact with the blade 2802, it may indicate that a foreign object, such as a conductive body part, is in contact with the blade 2802. In such situations, the detection system 30 may trigger the reaction system 32.

In the embodiment described in FIG. 2, the blade 14 acts as one element of a capacitor. The excitation plate 34 is separated from the blade 14 by a dielectric (e.g., air) and serves as a second element of the capacitor. FIGS. 29 and 30, however, illustrate one embodiment of a blade 2900 that serves as a complete capacitor. The blade 2900 comprises a blade body 2902, a plate 2904, and a dielectric 2906. The blade body 2902 may comprise the teeth 2908 of the blade 2900, and may also define a hollow cavity 2910 for receiving the dielectric 2906 and the plate 2904. Within the cavity 2910, the dielectric 2906 may be positioned between the blade body 2902 and the plate 2904 and may cause electrical insulation of the body 2902 and plate 2904. In this way, the blade body 2902 and plate 2904 may serve as elements of a capacitor. When the blade 2900 is used in a detection system, such as the detection system 30 described above, the excitation plate 34 may be omitted. Instead, the excitation voltage may be driven onto the blade body 2902 via the capacitor plate 2904. The capacitor plate 2904 may be connected to a voltage drive source via a connection through the blade shaft that is insulated from the shaft and the blade body 2902. Because the blade 10 itself makes up the entire capacitor, its capacitance may be more easily set during manufacture. In contrast, the capacitance of the blade 14 and excitation plate 34 capacitor described above is dependent on various unpredictable environmental conditions, and therefore, its capacitance at any given time may be difficult to control or adjust. For example, the dielectric 2906 may be selected to achieve a desirable blade capacitance. Also, the surface area of the body 2902 and the plate 2904 may be manipulated. Manipulating the blade capacitance may lead to superior detection performance as well as an improved signal-to-noise ratio.

FIG. 31 illustrates one embodiment of a blade 3100 comprising a plurality of blade whiskers 3102 radiating generally from the center of the blade 3100. The blade 3100 may be used with any saw having a detection system, such as the saw described in FIG. 2 above. The blade whiskers 3102 may extend radially from the blade 3100, creating a contact radius beyond the teeth 3104. In one example embodiment, the whiskers 3102 may extend up to about 1 mm beyond the teeth 3104. In this way, a foreign object contacting the blade 3100 may contact the whiskers 3102 before contacting the teeth 3104. The whiskers 3102 may be short enough to avoid wrapping around a foreign object, such as the finger of an operator, and thus pulling it into the blade 3100. According to various embodiments, the whiskers 3102 may be electrically conductive and electrically coupled to all or a portion of the blade 3100. When the foreign object contacts the whiskers 3102, the capacitance, and thus the signal drawn from the blade 3100, may begin to change. Because this change begins to occur before the foreign object contacts the teeth 3104 of the blade 3100, the effective reaction type of the saw may be improved. According to various embodiments, the length of the whiskers 3102 may be selected based on the reaction type of the detection and reaction systems of the saw 10. For example, if the typical reaction time of the saw 10 without the whiskers 3102 results in a cut 0.6 mm in depth, then the whiskers may be 0.6 mm or longer to prevent any cut in the event of a foreign object contacting the blade.

When the blade 3100 is used to cut a workpiece, the whiskers 3102 may be designed to bend or retract out of the path of the teeth 3104. In this way, the teeth 3104 may cut the workpiece without interference from the whiskers 3102. The whiskers 3102 may be made, for example, from a metal wire (e.g., steel, aluminum, etc.). Also, for example, the whiskers 3102 may be made from a conductive carbon composite or other electrically conductive material. According to various embodiments, the whiskers 3102 may comprise a non-capacitive sensor. For example, each whisker 3102 may comprise one or more probes for measuring the conductivity of materials in contact with the blade 3100. Also, according to various embodiments, the blade 3100 may include a mechanism for replenishing the length of the whiskers 3102. In use, individual whiskers 3102 may be broken or torn as they contact the workpiece. Accordingly, one or more of the whiskers 3102 may comprise a reel (not shown) of additional whisker material. The reel may be actuated by centripetal force to extend additional whisker material when its corresponding whisker 3102 is lost or shortened.

FIG. 32 illustrates a diagram of one embodiment of a segmented blade 3200 that may be used with the saw embodiment shown in FIG. 2. The blade 3200 is shown in the process of cutting a workpiece 3210. Arrow 3212 indicates the direction of movement of the workpiece 3210 relative to the blade 3200. Arrow 3214 indicates the rotation direction of the blade 3200. In FIG. 32, the blade 3200 is shown with four electrically insulated segments 3202, 3204, 3206, 3208. Each of the segments 3202, 3204, 3206, 3208 may form a capacitor (e.g., in conjunction with an excitation plate 34 and/or utilizing a laminate design such as described above with respect to FIGS. 29 and 30). Because the segments are electrically insulated, each capacitor (e.g., each blade segment 3202, 3204, 3206, 3208) may be capable of being separately monitored by the detection system 30.

As the blade spins, each of the segments 3202, 3204, 3206, 3208 is alternately in contact with a leading portion of the workpiece 3210 (in FIG. 32, segment 3204), a trailing portion of the workpiece 3210 (in FIG. 32, segment 3202) and no portion of the workpiece (in FIG. 32, segments 3206 and 3208). The capacitance of each segment (e.g., as measured by an excitation current and/or voltage) may reflect the properties of the material in contact with the respective segment. This may enable a variety of useful features. For example, the segmented blade 3200 may enable the detection system 30 to re-calibrate on-the-fly. Portions of the blade cycle where a given segment 3202, 3204, 3206, 3208 is not in contact with the workpiece 3210 may be used as baseline measurements for recalibration of the segment. Also, for example, the detection system 30 may be able to track whether the saw is at the beginning, middle, or end of a cut. This may allow the detection system 30 to calibrate its sensitivity accordingly. Also, use of the blade 3200 may allow the detection system to compare differences in properties between the leading portion and the trailing portion of the workpiece 3210.

FIG. 33 illustrates one embodiment of the table saw 10 having an overhead sensor assembly 3304. The overhead sensor assembly 3304 may comprise one or more sensors, which may be active or passive. For example, an active sensor may comprise an emitter as well as a receiver. Sensors that are passive may not comprise an emitter. According to various embodiments, the transmitter and receiver may be separate, with one or both of them located on the saw 10 at a location different from the overhead sensor assembly 3304. When the saw 10 is in use, its blade 3302 and a workpiece 3308 may be in the field of view of at least one of the sensors of the sensor assembly 3304.

According to various embodiments, the sensor assembly 3304 may comprise a radar sensor. A radar sensor may comprise an emitter that generates electromagnetic waves (e.g., radio waves, microwaves, etc.) and directs the electromagnetic waves toward the blade 3302. The waves may reflect off of the blade 3302, the workpiece 3308 and any foreign objects that may be present. A receiver may sense the reflected waves and provide an output signal to a processor-based detection system 30. The detection system 30 may glean various information from the input signal about the reflected waves. For example, the reflected waves may provide an indication of the direction and speed with which the workpiece 3308 is moving relative to the blade. If the workpiece 3308 reverses its motion, that may indicate a kickback event, which may cause the detection system 30 to activate the reaction system 32. If a foreign object is detected within a predetermined distance from the blade 3302, then a reaction system 32 may be activated. For example, if a foreign object is detected between the blade 3302 and the sensor assembly 3304, the reaction system 32 may be activated by the detection system 30. More details regarding a radar sensing system may be found in U.S. Pat. No. 7,421,932, which is incorporated herein by reference in its entirety.

According to various embodiments, the sensor assembly 3304 may comprise an infrared (IR) receiver. The IR receiver may sense the IR signature of the blade 3302, the workpiece 3308, and any foreign objects present in its field-of-view. The IR signature of the blade 3302 and workpiece 3308 may be distinguishable from the IR signature of a body part or other foreign object that may inadvertently come near the blade. The detection system 30 may monitor the output of the IR receiver. If the IR receiver indicates that a foreign object is within a predetermined distance from the blade 3302, a reaction system may be activated. For example, if a foreign object is detected between the blade 3302 and the sensor assembly 3304, the reaction system 32 may be activated.

In other embodiments, the sensor assembly 3304 may include emitters and receivers for measuring backscatter off of the blade 3302, the workpiece 3308 and any foreign objects that may be present near-by. Any suitable frequency of electromagnetic radiation may be used to measure backscatter. According to various embodiments, however, a frequency or frequencies may be selected based on the difference in backscatter profiles between typical workpieces 3308 and typical foreign objects, such as human body parts. In use, backscatter techniques may be able to differentiate between workpieces 3308 and foreign objects. For example, a foreign object, such as the skin on a body part, may scatter back a first quantity of radiation, while a workpiece 3308 of the same surface area may scatter back a second quantity of radiation. This may allow the detection system 30 to differentiate between the two. If a foreign object is detected within a predetermined distance of the blade 3302 (e.g., if the foreign object is over the blade 3302 or between the blade 3302 and the sensor assembly 3304), then the reaction system 32 may be activated by the detection system 30, which is in communication with the sensor assembly 3304.

In some embodiments, the sensor assembly 3304 may include an optical camera (e.g., a CCD camera). The optical camera may have a resolution fine enough to allow it to determine a distance between a foreign object and the blade 3302. If the distance is less than a predetermined amount, the reaction system 32 may be triggered by the detection system 30. Various image processing algorithms may be used by the detection system 30 to distinguish the blade, a typical workpiece, and a foreign object.

In various embodiments, the sensor assembly 3304 may include an emitter and receiver for measuring differential reflection. Differential reflection may be a measure of difference in reflection between surfaces. For example, a foreign object may reflect more or less electromagnetic radiation as compared to a typical workpiece 3308 and/or the blade 3302. The emitter for differential reflection may be any suitable emitter of electromagnetic waves including, for example, a laser. The detection system 30 is in communication with the sensor assembly 3304 and determines whether the reaction system 32 should be triggered based on the differential reflection detected by the sensor assembly 3304.

FIGS. 34-42 illustrate embodiments utilizing downstream safety members (e.g., safety members that are positioned near the trailing or rear edge of the blade 14). A downstream safety member is a component of a table saw that is positioned parallel to and downstream from the blade 14. Specific examples of downstream safety members include riving knives and splitters. Different downstream safety members may serve different purposes, for example, as described herein. Generally, a downstream safety member may serve to steady a workpiece and/or to mitigate the risk of a kickback event by preventing a cut from closing around the blade 14.

Figure 34:
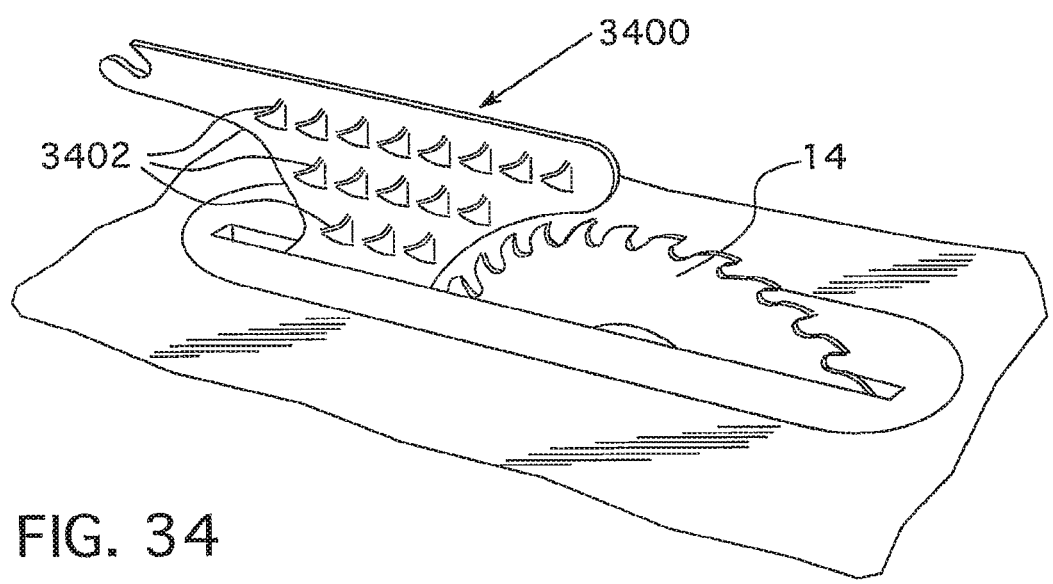
Figure 35:
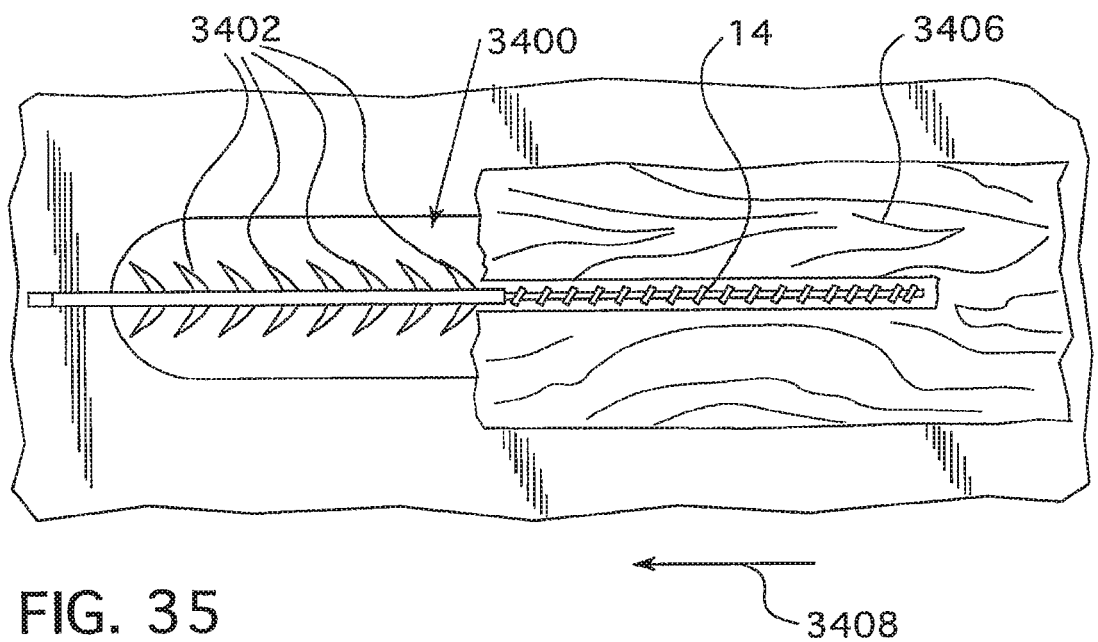

FIG. 34 illustrates one embodiment of a downstream safety member 3400 having directional snells 3402. The snells 3402 may extend outwardly at an angle from the downstream safety member 3400. The snells 3402 may be configured so that a workpiece may smoothly pass over the snells 3402 in the downstream direction, but is impeded if the workpiece is kicked-back in the upstream direction. FIG. 35 illustrates a top view of the downstream safety member 3400. A workpiece 3406 is illustrated being pushed downstream, as indicated by arrow 3408. When the workpiece 3406 contacts the snells 3402 moving downstream, it may slide along the snells 3402 without significant resistance because the snells are pointed generally away from the blade and in the direction that the workpiece is being fed. In the event of a kickback, however, the workpiece 3406 may be thrust upstream. In this case, the snells 3402 may dig into the workpiece 3406, either preventing the workpiece from moving upstream or impeding its upstream motion.

The snells 3402 may take any suitable form and may be made of any suitable material (e.g., steel, another suitable metal, engineered plastic, etc.). For example, in various embodiments, the snells 3402 may be flexible flaps formed into or secured to the downstream safety member 3400. When the workpiece 3406 passes in the downstream direction, the flaps may flex, allowing the workpiece 3406 to pass. When the workpiece is thrust upstream, the flaps may not flex and may instead dig into the workpiece 3406, impeding its upstream movement. According to various embodiments, the snells 3402 may be actuatable by the reaction system 32. For example, each snell 3402 may be extendible from a rest position, where the workpiece 3406 is allowed to pass without significant resistance, to an extended position, where the motion of the workpiece 3406 is impeded. When a kickback condition is detected, the reaction system 32 may extend the snells 3402 to prevent the workpiece 3406 from being thrust back towards the operator and/or the blade 14. The snells 3402 may be actuated according to any suitable mechanism. For example, a mass of nitinol or another shape memory allow may be actuated to lift each snell 3402 to the extended position. In other embodiments, each snell 3402 may be spring loaded from the rest position to the extended position. In still other embodiments, the snells 3402 may be extended using solenoids, pneumatics, hydraulics, magnets, pyrotechnics, or any other suitable method.

Figure 36:
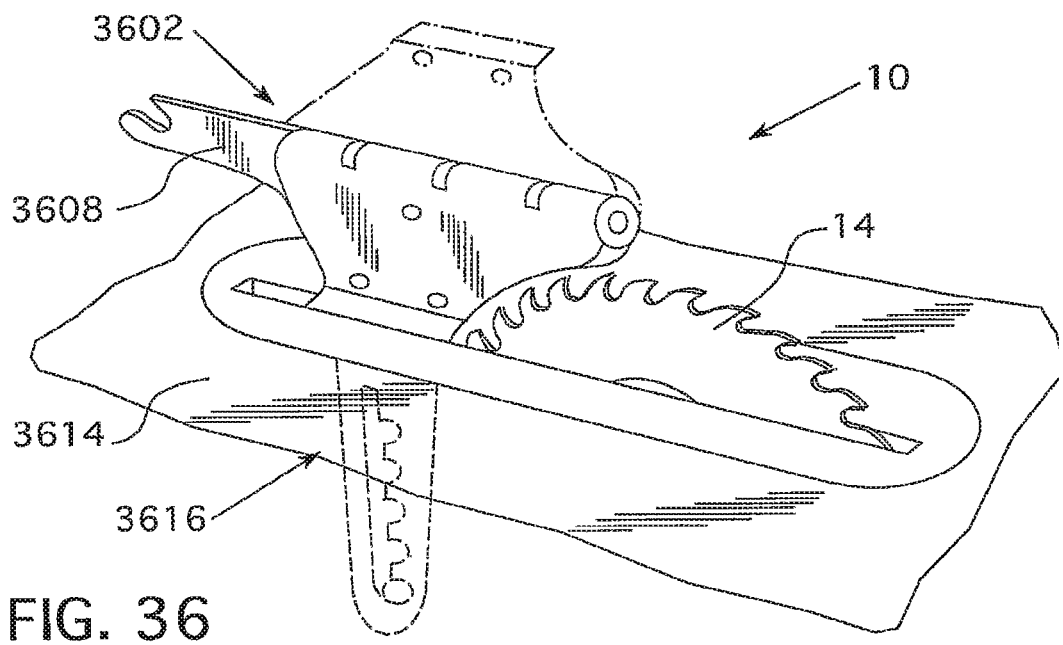
Figure 37:
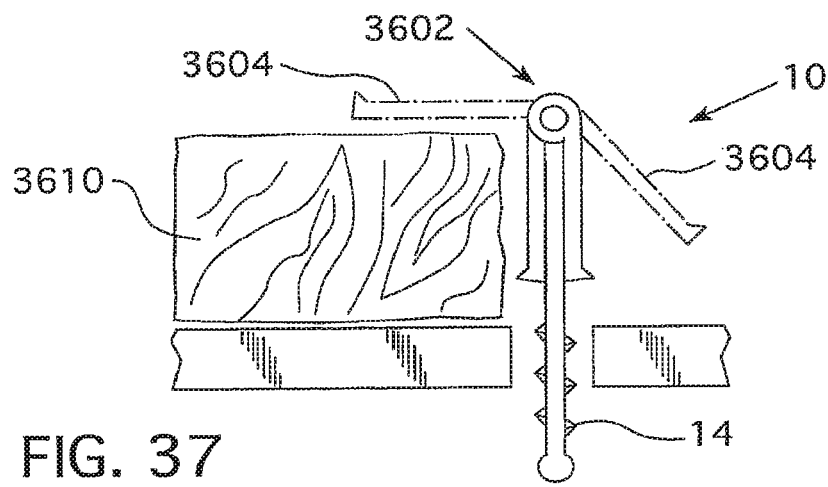
Figure 38:
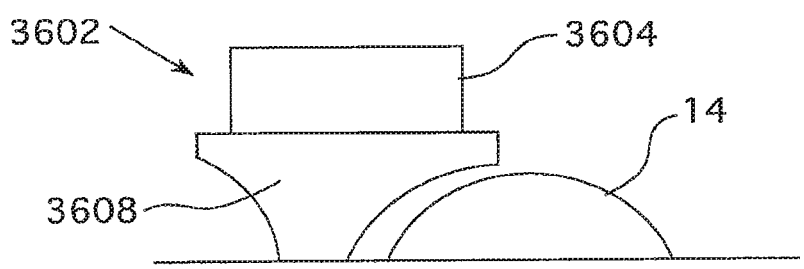

FIGS. 36-38 illustrate one embodiment of the table saw 10 including a downstream safety member 3602 comprising one or more wing members 3604. The wing members 3604 may extend roughly parallel to the table surface 3614 and roughly perpendicular to a body 3608 of the downstream safety member 3602. A workpiece 3610 being acted upon by a blade 14 may pass under the wing members 3604 when extended. In this way, the wing members 3604 may serve to prevent the workpiece 3610 from lifting off of the table surface. This may prevent and/or mitigate a kickback event. During a typical kickback event, the motion of the workpiece 3610 relative to the blade 14 is stopped or slowed (e.g., when the blade 14 contacts a knot or hard portion of the workpiece 3610, by a pinching off of the cut behind the blade 14, etc.). When the workpiece 3610 is stopped or slowed, the motion of the blade 14 pushes the workpiece 3610 up, where it contacts the top of the blade 14 and is thrust back towards the operator. Wing members 3604 may prevent or mitigate a kickback event by preventing the workpiece 3610 from riding upwards relative to the blade 14.

According to various embodiments, the wing members 3604 may be movable from a resting position to a deployed position when triggered, such as by turn-on of the motor/blade. In the resting position, the wing members 3604 may be parallel to a body 3608 of the downstream safety member 3602. In some embodiments, the combined width of the body 3608 and the wing member or members 3604 may be less than the kerf of the blade 14, allowing the downstream safety member 3602 to pass through the cut in the workpiece formed by the blade 14 if the wing members 3604 are in the resting position. Normally, the wing members 3604 are deployed when the saw is being operated. FIGS. 36 and 37 illustrate one embodiment where the wing members 3604 fold down against the body 3608 of the downstream safety member 3602 when in the resting position. FIG. 38 illustrates another embodiment where the wing members 3604 fold upwards when in the resting position. In such an embodiment, the wing members 3604 may transition to the deployed position, parallel to the tabletop when triggered by a kickback detection system. According to various embodiments the downstream safety member 3602 may comprise a height adjustment mechanism 3616 for raising and lowering the downstream safety member 3602. This may allow an operator to adjust the height of the wing members 3604 based on the height of the workpiece 3610.

According to various embodiments, the downstream safety member 3602 may be actuated from the resting position to the deployed position by the reaction system 32 upon detection of a kickback event by the detection system 30. The kickback event may be sensed according to any suitable method including, for example, those described herein below. Upon detection of the kickback event, the reaction system 32 may cause the wing members 3604 to be transitioned, such as from the upright resting position shown in FIG. 38, to the deployed position using any suitable mechanism or method. For example, the wing elements 3604 may be actuated by a spring element, solenoids, pneumatics, hydraulics, pyrotechnics, etc.

Figure 39:
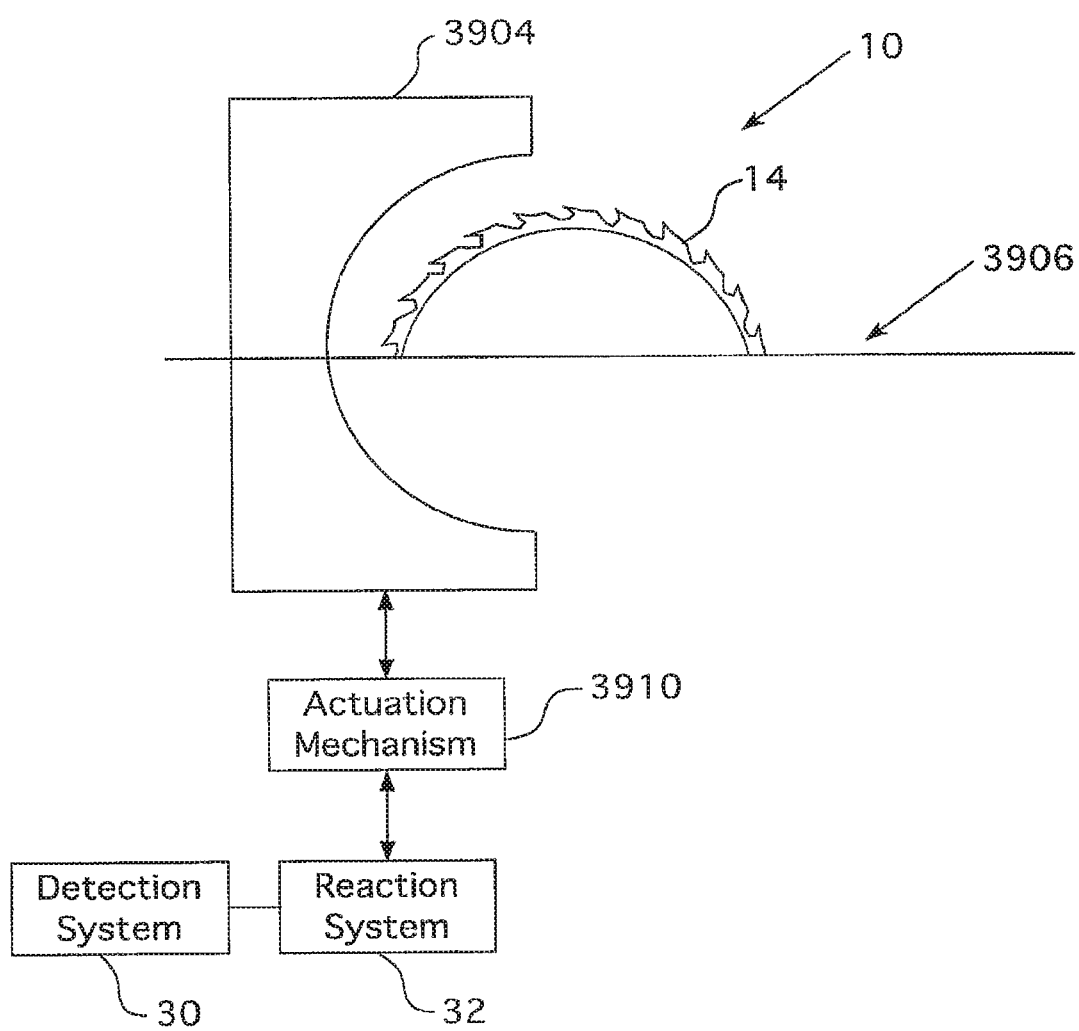
Figure 40:
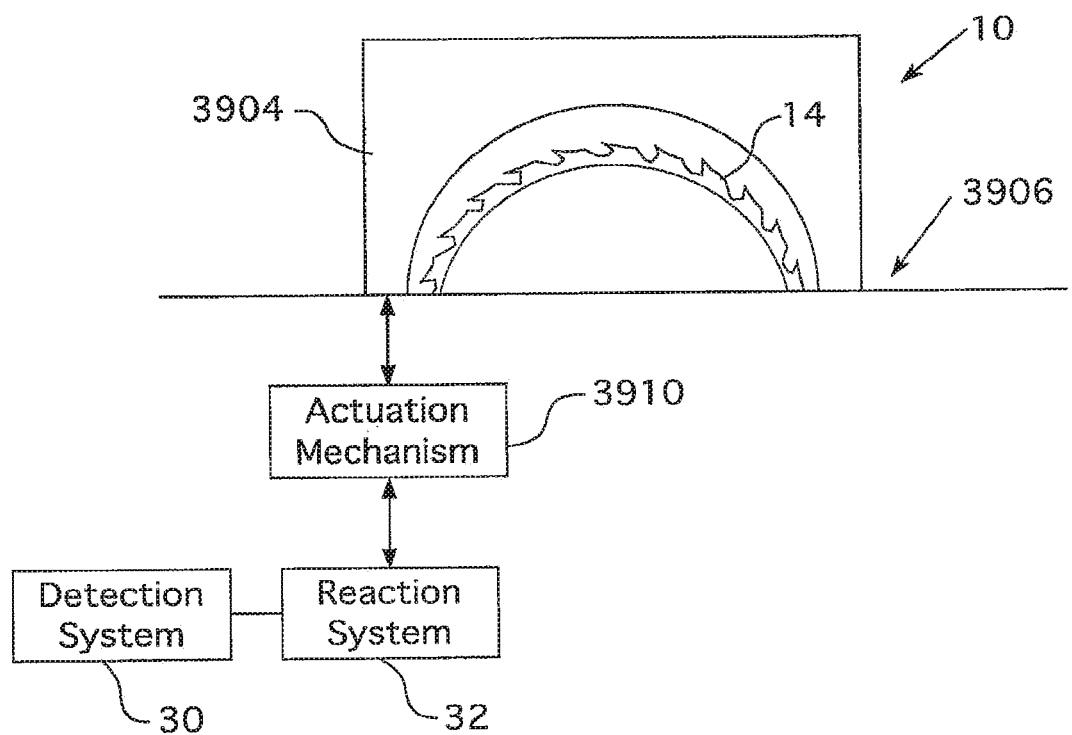

According to various embodiments, a downstream safety member can be used as a component of the reaction system 30. For example, the downstream safety member may be used to cover the exposed portion of the blade 14 or otherwise prevent or stop contact between the blade 14 and a foreign object. FIGS. 39 and 40 illustrate one embodiment of the table saw having a downstream safety member 3904. The downstream safety member 3904 has a resting position, shown in FIG. 39, and a deployed position, shown in FIG. 40. In the resting position, a portion of the downstream safety member 3904 may extend above the table top 3906 and serve as a standard downstream safety member, such as a splitter.

The detection system 30 may detect a dangerous condition according to techniques described herein, including contact between the blade 14 and a foreign object or proximity of the foreign object to the exposed portion of the blade 14. When the condition is detected, the detection system 30 may trigger the reaction system 32. The reaction system 32 may, in turn, trigger an actuating mechanism 3910, which may rapidly transition the downstream safety member 3904 from the resting position, shown in FIG. 39, to the deployed position, shown in FIG. 40. In this way, the safety member 3904 may prevent the foreign object from contacting the blade 14, or if the foreign object has already contacted the blade 14, the safety member 3904 may push or knock the foreign object away from the blade 14.

The downstream safety member 3904 may be transitioned from the resting position to the deployed position according to any suitable actuation mechanism or method. In some embodiments, the saw may include tracks (not shown) for directing the downstream safety member 3904 from the resting position to the deployed position. The actuating mechanism 3910 may comprise any suitable mechanism for moving the safety member 3904 along the tracks including, for example, spring loading, pneumatics, hydraulics, explosive charges, etc. Also, in some embodiments, the downstream safety member 3904 may be directed from the resting position to the deployed position by a series of pivotable bar members (not shown). In these embodiments, the actuating mechanism 3910 may be configured to pivot the downstream safety member 3904 about the bars again using any suitable mechanism (e.g., spring loading, pneumatics, hydraulics, pyrotechnics, etc.).

Figure 41:
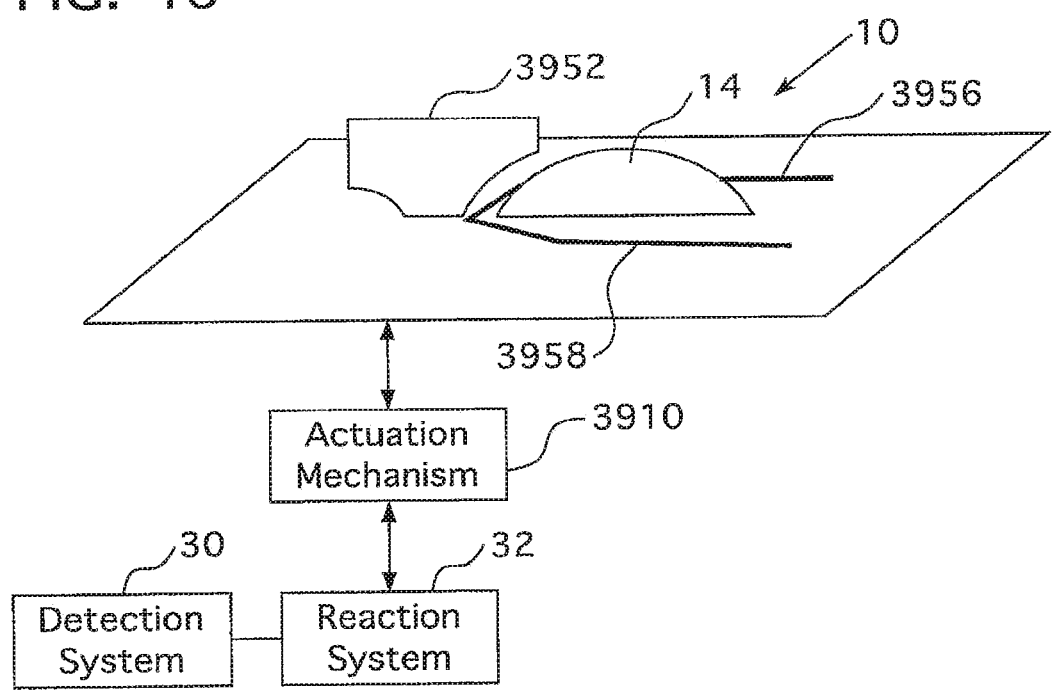

FIG. 41 illustrates another embodiment of the saw 10 having a downstream safety member 3952 that may be used as part of a reaction system 32. Upon detection of a triggering condition involving a foreign object and the blade 14 by the detection system 30, the downstream safety member 3952 may be split into two or more sections. The actuating mechanism 3910 may propel a first section along track 3958, and a second section along track 3956. As shown in FIG. 41, the tracks may run generally parallel to the blade 14 on opposite sides of the blade 14. In this way, the downstream safety member 3952 may cover the blade 14 to prevent and/or mitigate contact between the blade 14 and a foreign object. In some embodiments, the downstream safety member 3952 may not split in two, but instead the entire downstream safety member 3952 may be propelled down a track on one side of the blade 14. The actuating mechanism 3910 may utilize any suitable propelling mechanism including, for example, spring loading, pyrotechnics, solenoids, pneumatics, hydraulics, etc.

Figure 42:
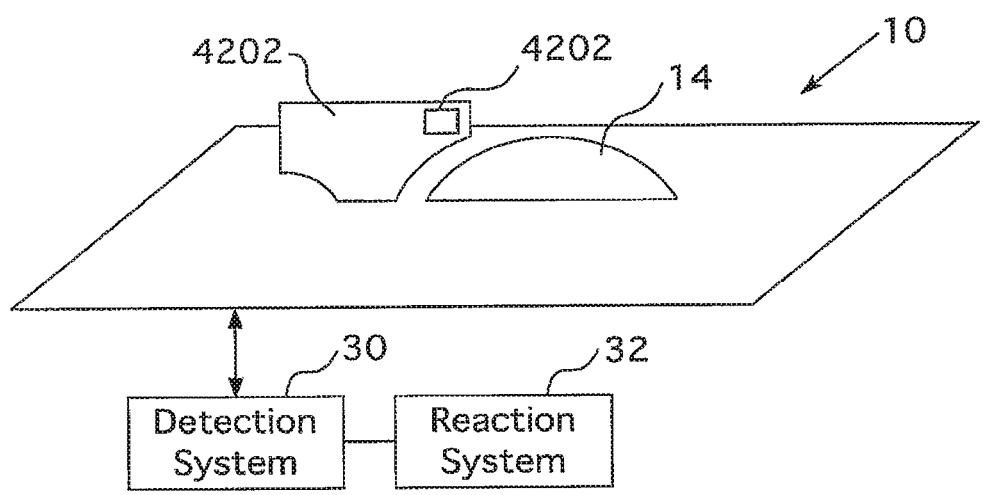

FIG. 42 illustrates one embodiment of a saw 10 having a downstream safety member 4202 with a material sensor 4204 thereon. The material sensor 4204 may be any suitable type of sensor for sensing a property of a workpiece (not shown). For example, the sensor 4204 may be a conductivity sensor for sensing the conductivity of the workpiece which, as described above, may be an indicator of its moisture content. The sensor 4204 may be positioned at any suitable location on the downstream safety member 4202, and may take any suitable physical form. For example, the sensor 4204 may include probes that extend perpendicularly from the downstream safety member 4202 to contact material within a cut on a workpiece created by the blade 14. The sensor 4204 may be in communication with the detection system 30 in a manner similar to that described above with respect to FIG. 23.

In some table saws, the blade height is manually adjustable, such as by using a crank. An operator of the table saw may adjust the blade height to match the height of the workpiece being cut. Many operators, however, neglect to adjust the blade height for each cut. Instead, operators sometimes set the blade to a height that is high enough to allow them to cut a number of workpieces. As a result, the blade is sometimes too high for certain cuts, creating a potentially unsafe condition. FIG. 43 illustrates a block diagram of a table saw 4300 with an automatically adjustable blade 14. The blade 14 may be adjustable with a mechanical adjustment mechanism 4320. The mechanism 4320 may be any suitable type of mechanism including, for example, known manual blade height adjustment mechanisms. The mechanism 4320 may be powered by an actuating mechanism 4321, such as a stepper motor or other suitable device. A height sensor 4324 may be used to sense the height of the workpiece currently being cut by the blade 14. The sensor 4324 may be any suitable type of sensor including, for example, an optical sensor. The sensor 4324 may be positioned so that it can measure the height of workpieces at a location in front of the leading edge of the blade 14. The height sensor 4324 may provide an output signal indication of the height of the workpiece to a processor-based height adjustment circuit 4322. From the output signal of the sensor 4324, the circuit 4322 may determine the height of the workpiece and whether the blade height needs to be adjusted or not given the height of the workpiece. The circuit 4322 may then signal the actuating mechanism 4321 to adjust the mechanism 4320 to raise or lower the blade 14 based on the height of the workpiece. For example, the blade 14 may be raised such that its top is a predetermined distance above the top of the workpiece. In some embodiments, the blade height adjustment mechanism 4320 may also raise or lower the motor 40 as well.

FIGS. 44-46 illustrate one embodiment of the table saw 10 according to other embodiments. The blade 14 and table top surface 4304 are shown in FIGS. 44-46. The height sensor 4324 may comprise a fan emitter 4308 and a detector array 4306 (shown in FIG. 44). The fan emitter 4308 may emit a laser or other electromagnetic beam across the table top 4304 and workpiece 4307 towards the detector array 4306. The beam may be 'fanned' or shaped to disperse vertically. When the workpiece 4307 breaks the beam, a portion of the beam may be prevented from reaching the sensor array 4306. Based on the portion of the beam that reaches the detector array 4306, the height adjustment circuit 4322 may determine the height of the workpiece and send appropriate signals/instructions to the actuating mechanism 4321. FIGS. 45 and 46 illustrate the operation of the saw 10 with two workpieces, 4307' and 4307". As shown in FIG. 45, the workpiece 4307' has a first height. In FIG. 45, the blade 14 is shown relative to the table top 4304 at a height roughly corresponding to that of the workpiece 4307'. As shown in FIG. 46, the workpiece 4307" has a second height that is greater than that of the workpiece 4307'. Accordingly, FIG. 46 shows the blade 14 at a greater height relative to the tabletop than is shown in FIG. 45. The height of the blade 14 relative to the tabletop in FIG. 46 may roughly correspond to the height of the workpiece 4307".

Various embodiments of the present invention are also directed to retrofitting existing table saws with detection and reaction systems. FIG. 47 illustrates one embodiment of the saw 10 with a retrofit package 4702 installed. The retrofit package 4702 may comprise a detection system 30, a reaction system 32 and a power system 4704. The detection system 30 may be any suitable type of detection system including, for example, those described herein. For example, in one embodiment, the retrofit package 4702 may comprise an excitation plate 34 that is installed next to the blade 14, as shown. The detection system 30 may drive a signal onto the excitation plate and monitor changes in the resulting blade current or signal due to changes in the capacitance between the blade 14 and the plate 34 to detect contact between the blade 14 and a foreign object. In some embodiments, the blade 14 may be replaced with a blade that does not require an excitation plate such as, for example, blade 2900 described herein. Other non-capacitive detection systems 30 may be used including, for example, the radar, backscatter, and/or video-based embodiments described herein.

The reaction system 32 may comprise any suitable type of reaction mechanism. According to various embodiments, however, reaction systems 32 requiring a minimum of modification to the saw 10 may be selected. Examples of such systems include those utilizing actuatable throat plates, actuatable table tops, airbags, changes to the blade shape, blade brakes, etc. The reaction system 32 and detection systems 30 of the retrofit package 4702 may be powered by a power system 4704. The power system 4704 may comprise a connection to a power source of the saw 10. According to various embodiments, the power system 4704 may comprise a blade-driven generator, such as those described with reference to FIGS. 5-6. In this way, the reaction and detection systems 32, 30 may continue to operate until the blade 14 completely spins down.

Operators of table saws sometimes use push sticks to guide or feed the workpieces towards the blade. Use of a push stick may allow the operator to keep their hands farther away from the blade 14 when feeding a workpiece toward the blade 14. FIGS. 48 and 49 illustrate one embodiment of a push stick 4802 according to various embodiments of the present invention. The push stick 4802 may comprise a handle and an end effector, separated by a shaft. The operator may grasp the push stick 4802 by the handle and use the end effector to push the workpiece, as shown in FIG. 49. FIG. 50 illustrates a block diagram of the push stick 4802 in communication with an example saw 4820. According to various embodiments, the push stick 4802 may comprise one or more accelerometers 4810. The accelerometer(s) 4810 may be in communication with a transmitter 4824, which may transmit signals indicative of the acceleration of the push stick 4802 to the saw 4820 (e.g., via receiver/detector 4822). The detection system 30 of the saw 4820 may monitor the acceleration of the push stick 4802, as this may be indicative of the acceleration of the workpiece 4804 and/or the operator's hand. If the acceleration of the push stick 4802 falls outside of acceptable bounds, the detection system 30 may trigger the reaction system 32. For example, the acceleration of the push stick may be outside of acceptable bounds if the stick accelerates too quickly in the direction of the blade 14. In addition, a sudden acceleration away from the blade 14 may indicate a kick back condition. The push stick 4802 may also comprise devices and/or sensors allowing the detection system 30 to estimate its location. For example, the push stick 4802 may comprise a Radio Frequency (RF) transmitter 4812 that may periodically transmit RF pulses. The saw 4820 (e.g., via the detector/receiver 4822) may receive the RF pulses. Based on the strength of the RF pulses, the detection system 30 may estimate the distance between the push stick 4802 and the blade 14. In some embodiments, the push stick 4802 may comprise an infrared (IR) pulse generator. The IR pulses may be received by the saw 4820. For example, the saw 4820 may comprise a plurality of IR receivers positioned at different locations on the saw 4820. These may allow the saw to use triangulation to estimate the position of the push stick 4802 relative to the blade, for example.

FIG. 51 is a top view of a table saw 10 with a suction feed assembly 5102 for feeding workpieces towards the blade 14 according to various embodiments of the present invention. The suction feed assembly may comprise a plurality of suction elements 5104 located on the table at the leading edge of the blade 14. Each suction element 5104 may comprise one or more suction generated devices. When actuated, the suction generating devices may create a vacuum between the section element 5104 and any object in contact with the section element 5104 (e.g., the workpiece). Each suction element 5104 may reciprocate towards and away from the blade, for example, as shown by arrows 5106. Adjacent section elements 5104 may reciprocate 180° out of phase. Accordingly, the suction elements 5104 may be selectively actuated and de-actuated to move a workpiece towards or away from the blade 14. In this way, it may not be necessary for an operator to place their hand near the blade 14. Instead, the suction elements 5104 may feed the workpiece toward the blade 14. The state of the feedback from the suction elements 5104 can be used to detect hazardous conditions.

FIG. 52 illustrates a top-down view of one embodiment of a kick back detection mechanism 5200. As shown in the illustrated embodiment, the blade 14 and arbor 38 may be mounted in a kick back frame 5202 that is pivotable relative to the remainder of the table saw about the joint 5204. Arrow 5208 indicates the direction of movement of a workpiece. The kick back mechanism 5200 may serve a variety of purposes. For example, many kickback conditions occur when a cut is pinched or otherwise knocked out of alignment, causing the cut portion of a workpiece to contact a rear portion of the blade 14. Because the kick back mechanism 5200 allows the blade 14 some freedom of motion around the pivot 5204, it may prevent many kickback conditions. In some embodiments, the kick back mechanism 5200 may comprise a sensor (not shown) positioned to sense movement of the kick back frame 5202 about the joint 5204. The sensor may be in communication with the detection system 30. Movement of the kick back frame 5202 about the joint 5204 may indicate a kickback condition. Accordingly, when the detection system 30 receives a signal from the sensor indicating that greater than a predetermined amount of motion has occurred about the joint 5204, it may trigger a reaction system 32. FIG. 53 illustrates an alternative embodiment of the kick back mechanism 5200'. With the mechanism 5200', the blade 14 and arbor 38 are mounted to a four-bar linkage frame 5210, which is shown rigidly mounted to a portion 5214 of the saw. The four-bar linkage frame 5210 may allow the blade 14 to move from side-to-side, as illustrated by arrow 5216. This may serve to prevent kickback conditions, as described above. Also, for example, a sensor may be positioned to sense movement of the linkage frame 5210, which, if greater than a predetermined threshold, may indicate a kickback condition. The sensor (not shown) may be positioned at any location allowing it to sense movement of the frame 5210, but may be positioned at one of the joints 5212 of the frame 5210. In another embodiment, strain measurements, from a strain sensor, on the kickback frame 5202 can be used to detect a kickback condition, without having to use a pivot.

FIG. 54 illustrates one embodiment of the saw 10 having torque-based kick back detection mechanism. When a kickback event occurs, the workpiece may come into contact with a trailing or rear portion of the blade 14. This may increase the torque that the motor 40 must produce to maintain a constant rotation of the blade 14. Accordingly, in such embodiments, the saw 10 comprises one or more torque sensors 5402 mounted on a shaft between the motor 40 and the blade 14. For example, the torque sensor 5402 may be mounted on the arbor shaft to which the blade 14 is secured, or some other drive shaft between the motor 40 and the blade 14. The detection system 30 may be in communication with the torque sensor(s) 5402. If the torque sensor(s) 5402 indicates that the torque on the shaft has increased by more than a predetermined amount, it may indicate that a kickback condition has occurred. Accordingly, the detection system 30 may trigger the mitigating reaction of the reaction system 32. Any suitable torque sensor 5402 may be used, such as strain gauge torque sensors or surface acoustic wave (SAW) torque sensors.

According to various embodiments, embodiments of the present invention are directed to a table saw that comprises: a cutting surface; a motor-driven, rotatable blade for cutting a workpiece on the cutting surface, wherein a portion of the blade is extendable above the cutting surface; a kickback detection system for detecting kickback of the workpiece during cutting of the workpiece; and reaction means in communication with the kickback detection system for taking a mitigating reaction in response to detection of kickback of the workpiece during cutting of the workpiece. According to various implementations, the kickback detection system comprises: an acoustic sensor; and a processor in communication with the acoustic sensor, wherein the processor is programmed to recognize a condition indicative of kickback of the workpiece during cutting of the workpiece based on input from the acoustic sensor. The processor may be further programmed to determine whether the blade is rotating based on input from the acoustic sensor, and, when it is determined that the blade is rotating, maintain the reaction means in an armed state. In addition, the kickback detection system may comprise: a torque sensor mounted on the rotatable blade shaft; and a processor in communication with the torque sensor, wherein the processor is programmed to recognize a condition indicative of kickback of the workpiece during cutting of the workpiece based on input from the torque sensor. In other embodiments, the table saw further comprises: a motor positioned below the cutting surface; a rotatable blade shaft positioned below the cutting surface on which the blade is mounted; a clutch coupled to the blade shaft, such that when the clutch is engaged and the motor is running, the blade shaft is rotated; a brake system for braking the blade; and a motor shut-down circuit connected to the clutch and the brake system, wherein the motor shut-down circuit disengages the clutch and actuates the brake system to brake the blade when the motor is turned off.

According to other embodiments, the table saw comprises: a cutting surface; a motor-driven, rotatable blade for cutting a workpiece on the cutting surface, wherein a portion of the blade is extendable above the cutting surface; detection means for detecting a dangerous condition relative to the blade; reaction means in communication with the detection means for taking a reaction in response to detection of the dangerous condition; and a blade-spin detection system for detecting whether the blade is rotating based on energy from the blade, wherein the blade-spin detection system is in communication with the reaction means and provides an output to arm the reaction means when the blade-spin detection system detects that the blade is spinning. In various implementations, the blade-spin detection system comprises a static electricity charge sensor in proximity to the blade for sensing the static electricity build-up on the blade. In other implementations, the blade-spin detection system comprises: a transmitter proximate to the blade for transmitting radio signals; a passive electronic circuit on the blade that transmits responsive radio signals when passively energized by the radio signals transmitted by the transmitter; and a receiver, proximate to the blade, for detecting the responsive radio signals from the passive electronic circuit. In yet other implementations, the blade-spin detection system comprises: an acoustic sensor; and a processor in communication with the acoustic sensor, wherein the processor is programmed to determine whether the blade is rotating based on input from the acoustic sensor. In yet other implementations, the blade-spin detection system comprises: an airflow sensor that senses airflow generated by the plurality of off-center holes of the blade when the blade spins; and a processor in communication with the airflow sensor, wherein the processor is programmed to determine whether the blade is rotating based on input from the acoustic sensor. In yet other implementations, the blade-spin detection system comprises: one or more magnets mounted on the blade; and an inductor proximate to the blade, wherein the magnets, when spinning with the blade, induce a voltage across the inductor, wherein the reaction means is connected to the inductor. In addition, the table saw may further comprise a power converter having an input connected to the inductor for converting the voltage across the inductor to an output voltage used to power the reaction means and/or the detection means.

According to various implementations, the blade comprises a plurality of off-center holes that extend through the blade. In addition, the table saw may further comprise an electrical generator connected by one or more gears to the rotatable blade shaft, wherein the electrical generator is further connected to the reaction means and generates electricity when the shaft rotates to power the reaction means and/or the detection means. In addition, the reaction means may comprise: a clutch coupled to the blade shaft, such that when the clutch is engaged and the motor is running, the blade shaft is rotated, and wherein the clutch is disengaged when the detection means detects the dangerous condition; and a brake system for braking the blade when the detection means detects the dangerous condition. Additionally, the blade may comprise an outer peripheral portion that comprises a first material, an inner portion that comprises a second material that is different from the first material, wherein the first material is denser than the second material. In addition, the table saw may further comprise: a flywheel that rotates in a direction that is the same as a direction of rotation for the blade, wherein the flywheel is coupled to the rotatable shaft by a clutch, and wherein the reaction means disengages the clutch when the dangerous condition is detected. In addition, the table saw may further comprise kickback mitigation means downstream from the blade for mitigating kickback of the workpiece and/or a suction feed assembly that feeds the workpiece to the blade for cutting.

According to other embodiments, the table saw comprises: a cutting surface; a motor-driven, rotatable blade that is partially extendable above the cutting surface for cutting a workpiece positioned on the cutting surface; and a sensor connected to the cutting surface for sensing a characteristic of the workpiece during cutting of the workpiece. In various implementations, the table saw further comprises a blade height adjustment mechanism for adjusting a height of the blade relative to the cutting surface, the sensor comprises a height sensor for sensing a height of the workpiece relative to the cutting surface, and the table saw further comprises a height adjustment circuit that receives an input signal from the height sensor indicative of the height of the workpiece relative to the cutting surface and outputs a signal to the blade height adjustment mechanism to adjust the height of the blade based on the height of the workpiece sensed by the height sensor. In other implementations, the sensor comprises a workpiece conductivity sensor on the cutting surface that detects electrical conductivity of the workpiece. In such an implementation, the table saw may further comprise: contact detection means for detecting contact with the blade by an object other than the workpiece, wherein the contact detection means receives an input from the workpiece conductivity sensor and detects contact with the blade by the object based on the input from the workpiece conductivity sensor; and reaction means in communication with the contact detection system for taking a mitigating reaction in response to detection of contact with the blade by the object. The workpiece conductivity sensor may comprise a wheel positioned adjacent to a trailing and/or leading edge of the blade, wherein the wheel comprises one or more probes that extend into the workpiece to sense the electrical conductivity of a portion of the workpiece after cutting of the portion by the blade.

According to other embodiments, the table saw comprises: a cutting surface; a motor-driven, rotatable blade for cutting a workpiece on the cutting surface, wherein a portion of the blade is extendable above the cutting surface; a contact detection system for detecting contact with the blade by an object other than the workpiece; and reaction means in communication with the contact detection system for taking a mitigating reaction in response to detection of contact with the blade by the object. The blade comprises: a first electrically conductive blade portion; a second electrically conductive blade portion; and a dielectric between the first and second electrically conductive blade portions. The contact detection system is connected to the first electrically conductive blade portion and drives the first electrically conductive blade portion with a drive signal, and wherein the contact detection system comprises a processor for detecting contact with the blade by the object based on an electrical signal from the first electrically conductive blade portion. For example, the contact detection system may detect contact with the blade by a foreign object based on the current drawn by the first electrically conductive blade portion.

According to other embodiments, the table saw comprises: a cutting surface; a motor-driven rotatable shaft positioned below the cutting surface; a blade for cutting a workpiece on the cutting surface, wherein the blade is mounted on the shaft, and wherein a portion of the blade is extendable above the cutting surface; a detection system for detecting a dangerous condition relative to the blade; a reaction system in communication with the detection system for taking a reaction in response to detection of the dangerous condition, wherein the reaction system comprises a magnetorheological rotary brake connected to the shaft that brakes the shaft to thereby brake the blade in response to detection of the dangerous condition by the detection system. In various implementations, the magnetorheological rotary brake comprises: a rotor fixed to the shaft; a housing, wherein the housing and the rotor define a spacing; magnetorheological fluid in the spacing; and a magnetic field-producing coil that is energized in response to detection of the dangerous condition by the detection system to produce a magnetic field that causes the magnetorheological fluid to increase its viscosity to brake the rotor, thereby braking the shaft, thereby braking the blade.

While various embodiments of the present invention have been shown and described, it should be understood that other modifications, substitutions and alternatives are apparent to one of ordinary skill in the art. Such modifications, substitutions, and alternatives can be made without departing from the spirit and scope of the invention, which should be determined from the appended claims.

What is claimed is:

1. A table saw comprising:
a table with an upper cutting surface;
a motor-driven rotatable shaft positioned below the table;
a blade for cutting a workpiece on the cutting surface, wherein:
the blade is extendable at least partially above the cutting surface to cut the workpiece on the cutting surface; and
the blade spins when the shaft rotates;
a detection system for detecting a dangerous condition relative to the blade;
a reaction system in communication with the detection system for taking a reaction in response to detection of the dangerous condition by the detection system; and
a sensor for sensing a characteristic of the workpiece, wherein:
an output signal from the sensor is provided to the detection system for use by the detection system in detecting the dangerous condition; and
the detection system adjusts a sensitivity for detection of a dangerous condition relative to the blade based on the output signal from the sensor.

2. The table saw of claim 1, wherein the sensor is on the upper cutting surface.

3. The table saw of claim 2, wherein the sensor comprises a leading edge sensor that senses the characteristic of the workpiece prior to being cut.

4. The table saw of claim 2, wherein the sensor comprises a trailing edge sensor that senses the characteristic of the workpiece after being cut.

5. The table saw of claim 1, wherein:
the detection system comprises a capacitive blade-contact detection system for sensing contact by a foreign object with the blade; and
the sensor comprises a conductivity sensor for sensing an electrical conductivity of the workpiece.

6. The table saw of claim 5, wherein the conductivity sensor comprises a moving component that moves with the workpiece.

7. The table saw of claim 5, wherein the conductivity sensor is stationary.

8. The table saw of claim 5, wherein the conductivity sensor comprises a leading edge conductivity sensor that senses the conductivity of the workpiece prior to being cut.

9. The table saw of claim 5, wherein the conductivity sensor comprises a trailing edge conductivity sensor that senses the conductivity of the workpiece after being cut.

10. The table saw of claim 5, wherein the conductivity sensor comprises at least one electrically conductive probe for contacting the workpiece to sense the conductivity of the workpiece.

11. The table saw of claim 10, wherein the at least one electrically conductive probe is for puncturing the workpiece to sense the conductivity of an interior of the workpiece.

12. The table saw of claim 10, wherein the conductivity sensor comprises a rotatable wheel and the at least one electrically conductive probe extends from the wheel.

13. The table saw of claim 10, wherein the conductivity sensor comprises a leading edge conductivity sensor that senses the conductivity of the workpiece prior to being cut.

14. The table saw of claim 10, wherein the conductivity sensor comprises a trailing edge conductivity sensor that senses the conductivity of the workpiece after being cut.

15. The table saw of claim 1, further comprising:
kickback detection means for detecting kickback by the workpiece; and
kickback mitigation means downstream from the blade for mitigating kickback of the workpiece.

16. The table saw of claim 1, further comprising a blade spin detection system for detecting spinning movement by the blade, wherein the reaction system is armed when the blade spin detection system detects that the blade is spinning.

17. The table saw of claim 1, further comprising:
a height sensor for sensing a height of the workpiece relative to the cutting surface;
a blade height adjustment mechanism for adjusting a height of the blade relative to the cutting surface; and
a height adjustment circuit that receives an input signal from the height sensor indicative of the height of the workpiece relative to the cutting surface and outputs a signal to the blade height adjustment mechanism to adjust the height of the blade based on the height of the workpiece sensed by the height sensor.

18. The table saw of claim 1, wherein the detection system comprises a proximity detection system that detects when a foreign object is in close proximity to the blade.

19. The table saw of claim 1, wherein:
the blade comprises:
a first electrically conductive blade portion;
a second electrically conductive blade portion that comprises teeth for cutting the workpiece; and
a dielectric between the first and second electrically conductive blade portions, and
the reaction system is connected to the first electrically conductive blade portion and drives the first electrically conductive blade portion with a drive signal; and
the reaction system comprises a processor for detecting contact with the blade by a foreign object based on an electrical signal from the first electrically conductive blade portion.

20. The table saw of claim 1, further comprising an electrical generator connected by one or more gears to the rotatable shaft, wherein the electrical generator generates electricity when the shaft rotates to power at least one of the reaction system and the detection system.

21. A table saw comprising:
a table with an upper cutting surface;
a motor-driven rotatable shaft positioned below the table;
a blade for cutting a workpiece on the cutting surface, wherein:
the blade is extendable at least partially above the cutting surface to cut the workpiece on the cutting surface; and
the blade spins when the shaft rotates;
a detection system for detecting a dangerous condition relative to the blade;
a reaction system in communication with the detection system for taking a reaction in response to detection of the dangerous condition by the detection system; and
a conductivity sensor for sensing a conductivity of the workpiece, wherein:
the conductivity sensor comprises at least one electrically conductive probe for puncturing the workpiece to sense the conductivity of an interior of the workpiece; and
an output signal from the sensor is provided to the detection system for use by the detection system in detecting dangerous condition.

22. A table saw comprising:
a table with an upper cutting surface;
a motor-driven rotatable shaft positioned below the table;
a blade for cutting a workpiece on the cutting surface, wherein:
the blade is extendable at least partially above the cutting surface to cut the workpiece on the cutting surface; and
the blade spins when the shaft rotates;
a detection system for detecting a dangerous condition relative to the blade;
a reaction system in communication with the detection system for taking a reaction in response to detection of the dangerous condition by the detection system; and
a conductivity sensor for sensing a conductivity of the workpiece, wherein:
the conductivity sensor comprises a rotatable wheel with at least one electrically conductive probe that extends from the wheel for contacting the workpiece to sense the conductivity of the workpiece; and
an output signal from the sensor is provided to the detection system for use by the detection system in detecting dangerous condition.

\* \* \* \* \*